United States Patent
Romein et al.

(10) Patent No.: US 11,299,924 B1
(45) Date of Patent: Apr. 12, 2022

(54) POWER-ACTUATED JEEP WRANGLER FABRIC TOP AND ASSOCIATED METHODS

(71) Applicants: Daniel Romein, St. Augustine, FL (US); Timothy Romein, St. Augustine, FL (US)

(72) Inventors: Daniel Romein, St. Augustine, FL (US); Timothy Romein, St. Augustine, FL (US)

( * ) Notice: Subject to any disclaimer, the term of this patent is extended or adjusted under 35 U.S.C. 154(b) by 250 days.

(21) Appl. No.: 16/569,285

(22) Filed: Sep. 12, 2019

Related U.S. Application Data

(60) Provisional application No. 62/730,853, filed on Sep. 13, 2018.

(51) Int. Cl.
| | |
|---|---|
| *B60J 3/00* | (2006.01) |
| *E05F 15/605* | (2015.01) |
| *B60J 7/06* | (2006.01) |
| *E05D 15/26* | (2006.01) |

(52) U.S. Cl.
CPC ............. *E05F 15/605* (2015.01); *B60J 3/002* (2013.01); *B60J 7/062* (2013.01); *E05D 15/26* (2013.01); *E05Y 2900/542* (2013.01)

(58) Field of Classification Search
CPC ............. B60J 3/002; B60J 7/062; B69J 7/062
USPC .................................................. 296/107.07
See application file for complete search history.

(56) References Cited

U.S. PATENT DOCUMENTS

| | | | | |
|---|---|---|---|---|
| 6,196,616 B1 * | 3/2001 | Muszynski | ................ | B60J 7/04 296/107.13 |
| 6,669,201 B1 * | 12/2003 | Guillez | .................... | B60J 7/047 296/220.01 |
| 7,320,499 B2 * | 1/2008 | MacNee, III | ............ | B60J 7/061 296/107.19 |
| 8,474,899 B2 * | 7/2013 | Moran | ................... | B60J 7/1265 296/100.18 |

* cited by examiner

*Primary Examiner* — Joseph D. Pape
(74) *Attorney, Agent, or Firm* — Ashkan Najafi

(57) ABSTRACT

A power-actuated fabric top for a vehicle includes a fabric top section configured to be adapted between a folded position and an unfolded position, guide rails statically affixed to an existing frame of the vehicle, and a power-actuated displacement mechanism for retracting and advancing the fabric top section between the folded position and the unfolded position. Such a power-actuated displacement mechanism is operably coupled to the guide rails. The fabric top section is configured to have a substantially horizontal travel path along an anterior portion of the guide rails and thereby does not pivot up and away from the guide rails. The fabric top section is operably coupled to the guide rails and responsive to an operating mode of the power-actuated displacement mechanism. The folded position of the fabric top section is piled up inside the existing tailgate portion of the existing vehicle.

16 Claims, 68 Drawing Sheets

POWER-ACTUATED JEEP WRANGLER FABRIC TOP AND ASSOCIATED METHODS

CROSS REFERENCE TO RELATED APPLICATIONS

This is a non-provisional patent application that claims the benefit of co-pending U.S. provisional patent application No. 62/730,853 filed Sep. 13, 2018, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to convertible soft tops for JEEP® (WRANGLER AND WRANGLER UNLIMITED) vehicles and, more particularly, to a specially designed power-actuated JEEP® (WRANGLER AND WRANGLER UNLIMITED) (JW/JWU) fabric top that is selectively deployed between various configurations (e.g., bikini configuration, fully-down configuration, etc.) wherein the fabric body travels along a substantially horizontal path (e.g., not upwardly arcuate path) along a top portion of the JW/JWU for use in space-limited areas. The embodiments of the present disclosure are retrofitted to fit both 2-door and 4-door versions of the aforementioned JEEP®, without restriction to a model type (e.g., JK, JL, etc.).

Prior Art

Automotive vehicles, such as sport utility vehicles ("SUVs"), have experienced a substantial increase in popularity in recent years. With the increase in popularity has come an increased demand for many of the amenities that were generally only found on other types automotive vehicles, such as convertible roof systems. Convertible roof systems designed for other automotive vehicles, such as passenger cars, are not, however, readily adaptable for use with SUVs because of the significant design differences between the two types of vehicles.

For example, many SUVs have a rear storage compartment that is an extension of and accessible from the passenger compartment, whereas in passenger cars the storage compartment is typically separate from the passenger compartment. This connected passenger and storage compartment, however, provides a large roof area. Furthermore, conventional Jeep® brand vehicles present a challenge as to how and where to store the manually retractable convertible top when the top is fully retracted without unnecessarily using up valuable storage and seating space, and they detract from the aesthetic qualities of the vehicle when retracted.

Additionally, conventional retracting roof tops are manually actuated and/or swing in an upward and rearward direction, which is prohibits the use of roof racks (e.g., ski racks, luggage racks, etc.).

Accordingly, a need remains for a power-actuated fabric top for a JEEP® (WRANGLER AND WRANGLER UNLIMITED) in order to overcome at least one of the above-noted shortcomings. The exemplary embodiment(s) satisfy such a need by a specially designed power-actuated JEEP® (WRANGLER AND WRANGLER UNLIMITED) (JW/JWU) fabric top that is convenient and easy to use, lightweight yet durable in design, versatile in its applications, and designed to be selectively deployed between various configurations (e.g., bikini configuration, fully-down configuration, etc.) wherein the fabric body travels along a substantially horizontal path (e.g., not upwardly arcuate path) along a top portion of the JW/JWU for use in space-limited areas.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a specially designed power-actuated JEEP® (WRANGLER AND WRANGLER UNLIMITED) (JW/JWU) fabric top that is selectively deployed between various configurations (e.g., bikini configuration, fully-down configuration, etc.) wherein the fabric body travels along a substantially horizontal path (e.g., not upwardly arcuate path) along a top portion of the JW/JWU for use in space-limited areas. The embodiments of the present disclosure are retrofitted to fit both 2-door and 4-door versions of the aforementioned JEEP®, without restriction to a model type (e.g., JK, JL, etc.).

These and other objects, features, and advantages of the non-limiting exemplary embodiment(s) are provided by a power-actuated vehicle fabric top including a fabric top section configured to be reciprocated between a folded position and an unfolded position along an entire roof portion and a rear frame portion of an existing vehicle, a plurality of guide rails statically affixed to the entire roof portion and the rear frame portion of the existing vehicle and extended from an existing front windshield portion to an existing tailgate portion of the existing vehicle, and a power-actuated displacement mechanism configured to facilitate retraction and extraction of the fabric top section between the folded position and the unfolded position relative to the entire roof portion and the rear frame portion of the existing vehicle. Such a power-actuated displacement mechanism is operably coupled to the guide rails and supported by the rear frame portion of the existing vehicle. Advantageously, the fabric top section is configured to have a substantially horizontal travel path along an anterior portion of the guide rails and thereby does not pivot up and away from the guide rails along the entire roof portion and the rear frame portion of the existing vehicle. Advantageously, the fabric top section is operably coupled to the guide rails and is responsive to an operating mode of the power-actuated displacement mechanism. In this manner, the folded position of the fabric top section is advantageously evenly piled together at the existing tailgate portion of the existing vehicle when retracted to the folded position.

In a non-limiting exemplary embodiment, the fabric top section includes a fabric body spanning across an entire width of the entire roof portion and having a plurality of transparent windows portions, a plurality of flexible cords connected to the fabric body and contiguously positioned within and along a longitudinal length of each the guide rails, respectively, and a header coupled to the fabric body and configured to extend along a major width of the fabric body. Advantageously, the flexible cords are selectively egressed and ingressed from a posterior portion of the guide rails, respectively, when the fabric body is displaced between the folded position and the unfolded position, respectively.

In a non-limiting exemplary embodiment, each of the guide rails includes a plurality of grooves continuously looped from the anterior portion to the posterior portion of the guide rails, respectively. Advantageously, such grooves are annular (circular) and entirely located within the guide rails, respectively, for facilitating reciprocation between the folded position and unfolded position.

In a non-limiting exemplary embodiment, the power-actuated displacement mechanism includes a plurality of driven chain brackets, and a plurality of flexible driven chains dynamically seated within the grooves, respectively, and statically engaged with the driven chain brackets, respectively. Advantageously, axially opposed ends of the header are secured to the driven chain brackets, respectively. Advantageously, the driven chain brackets remain disposed exterior of the guide rails and travel therealong between the anterior portion and the posterior portion of the guide rails.

In a non-limiting exemplary embodiment, the guide rails further include a plurality of bearings rotatably engaged to the posterior portion of the guide rails, respectively, and at least one washer positioned adjacent to each of the bearings and configured to guide the flexible cords into and out from the grooves without snagging the fabric body during reciprocation between the folded position and the unfolded position. Advantageously, the flexible cords are configured to travel within the grooves and between the bearings to facilitate smooth displacement of the fabric body into and out from the guide rails when the fabric top section is reciprocated between the folded position and the unfolded position, respectively.

In a non-limiting exemplary embodiment, the power-actuated displacement mechanism further includes a plurality of motor assemblies operably coupled to the guide rails. Each of the motor assemblies includes a motor having a worm gear rotatably coupled thereto, a sprocket rotatably connected to the worm gear wherein the sprocket has a driven shaft registered transverse to the worm gear and provided with a "D" cross-section aligned with an associated one of the guide rails, and a rectilinear timing rod having axially opposed ends in operable communication, via a coupling, with the flexible driven chains at the guide rails, respectively. Advantageously, each of the flexible driven chains is driven by an associated one of the motors and maintained in rotational sync by the timing rod. Advantageously, when the driven chains rotate, the timing rod is rotated about a fulcrum axis registered parallel to the header and disposed between the guide rails.

In a non-limiting exemplary embodiment, each the posterior portion of the guide rails is split into a primary section and an auxiliary section configured to facilitate tension calibration of each the flexible chain. Advantageously, each posterior section of the guide rails includes a chain tension adjustment mechanism including a plurality of fasteners in threaded communication with the auxiliary section such that an adjustable gap is selectively shortened and lengthened between the primary section and the auxiliary section when tightening and loosening the driven chains, respectively.

In a non-limiting exemplary embodiment, the timing rod is in synchronous rotatable communication with each of the couplings and flexible driven chains, respectively, and spaced from the fabric body.

In a non-limiting exemplary embodiment, the timing rod is hidden behind an existing interior trim of the existing vehicle and spans across a major width of the entire roof portion of the existing vehicle.

In a non-limiting exemplary embodiment, the driven chain brackets are statically attached to an associated one of the driven chains, respectively, as well as the header. Advantageously, the flexible cords travel within the grooves of the guide rails, respectively, and thereby reciprocates the fabric body between the unfolded position and the folded position, respectively.

In a non-limiting exemplary embodiment, each driven chain bracket travels in sync with an associated one of the flexible driven chains along a longitudinal length of the guide rails and thereby evenly displaces the header and the fabric body between the folded position and unfolded position, respectively.

In a non-limiting exemplary embodiment, the header includes a plurality of header brackets statically affixed to the header and an anterior portion of the existing vehicle, respectively. Advantageously, the header brackets are configured to frictionally and slidably engage and disengage each other when the fabric top section is reciprocated between the folded position and the unfolded position, respectively. In this manner, the header is securely abutted with the anterior portion of the existing vehicle when the header brackets and engaged together.

In a non-limiting exemplary embodiment, the axially opposed ends of the timing rod are operably connected to the couplings (preferably at an anterior portion of the guide rails), respectively, and thereby maintain synchronous rotational movement of the flexible chains. Advantageously, the timing rod is rotationally configured to facilitate even reciprocation of the header and the fabric body between the folded position and the unfolded position, respectively.

In a non-limiting exemplary embodiment, at least one awning is located exterior of the guide rails. The at least one awning is selectively extracted away from and transverse to the longitudinal lengths of the guide rails relative to the entire roof portion of the existing vehicle. Such an awning may be rotatably wound in a stored position and rotatably unwound to a deployed position, as needed.

In a non-limiting exemplary embodiment, the existing vehicle includes at least one of a JEEP WRANGLER® and a JEEP WRANGLER UNLIMITED®.

The present disclosure further includes a power-actuated vehicle fabric top, which includes a fabric top section configured to be reciprocated between a folded position and an unfolded position along an entire roof portion and a rear frame portion of an existing vehicle; a plurality of guide rails statically affixed to the existing vehicle, and a power-actuated displacement mechanism operably coupled to the guide rails and supported by the rear frame portion of the existing vehicle. Advantageously, the fabric top section is configured to have a substantially horizontal travel path along an anterior portion of the guide rails and thereby does not pivot up and away from the guide rails along the entire roof portion and the rear frame portion of the existing vehicle. Advantageously, the fabric top section is operably coupled to the guide rails and is responsive to an operating mode of the power-actuated displacement mechanism. Advantageously, the folded position of the fabric top section is piled together at the existing tailgate portion of the existing vehicle when retracted to the folded position.

The present disclosure further includes a method of utilizing a power-actuated fabric top for a vehicle. Such a method includes the steps of: providing an existing vehicle;

providing a fabric top section configured to be reciprocated between a folded position and an unfolded position along an entire roof portion and a rear frame portion of an existing vehicle; providing and statically affixing a plurality of guide rails to the existing vehicle; providing and operably coupling a power-actuated displacement mechanism to the guide rails such that the power-actuated displacement mechanism is supported by the rear frame portion of the existing vehicle; operably coupling the fabric top section to the guide rails so that the fabric top section is responsive to an operating mode of the power-actuated displacement mechanism.

The method further includes the steps of: reciprocating the fabric top section between a folded position and an unfolded position along the entire roof portion and the rear frame portion of the existing vehicle such that the fabric top section is reciprocated along a substantially horizontal travel path along an anterior portion of the guide rails and thereby does not pivot up and away from the guide rails along the entire roof portion and the rear frame portion of the existing vehicle; and retracting the fabric top section to the folded position and thereby piling together the folded position of the fabric top section at the existing tailgate portion of the existing vehicle.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 32:
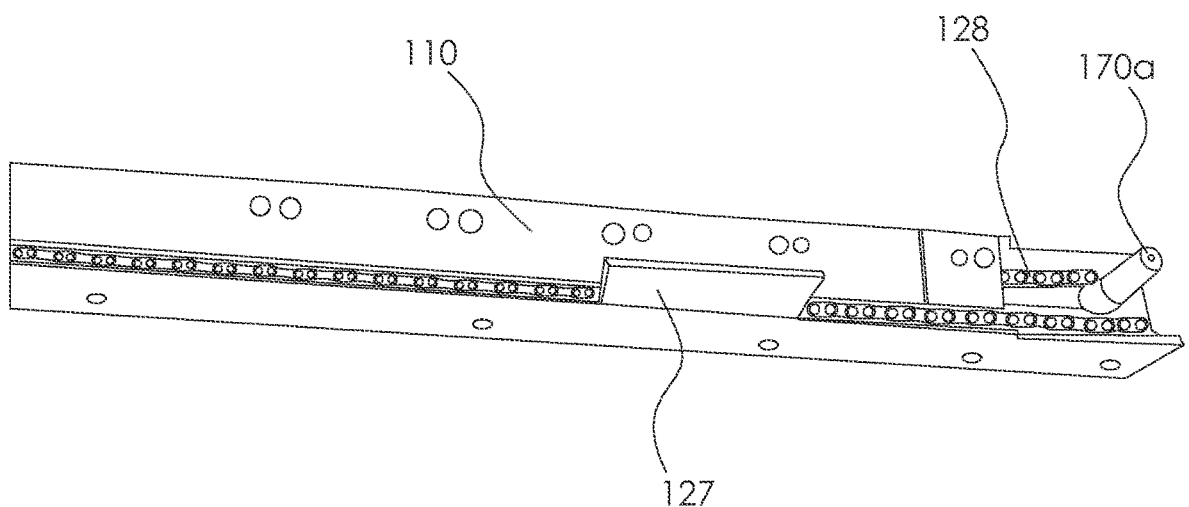
FIG. 32 is a perspective view of a drive chain and associated bracket dynamically seated within a groove of a guide rail and held in place via a face plate.
Figure 32A:
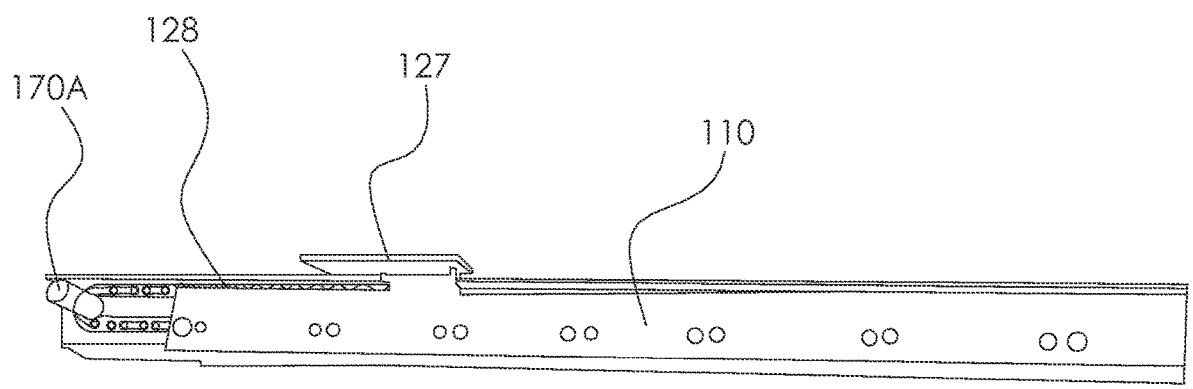
Figure 33:
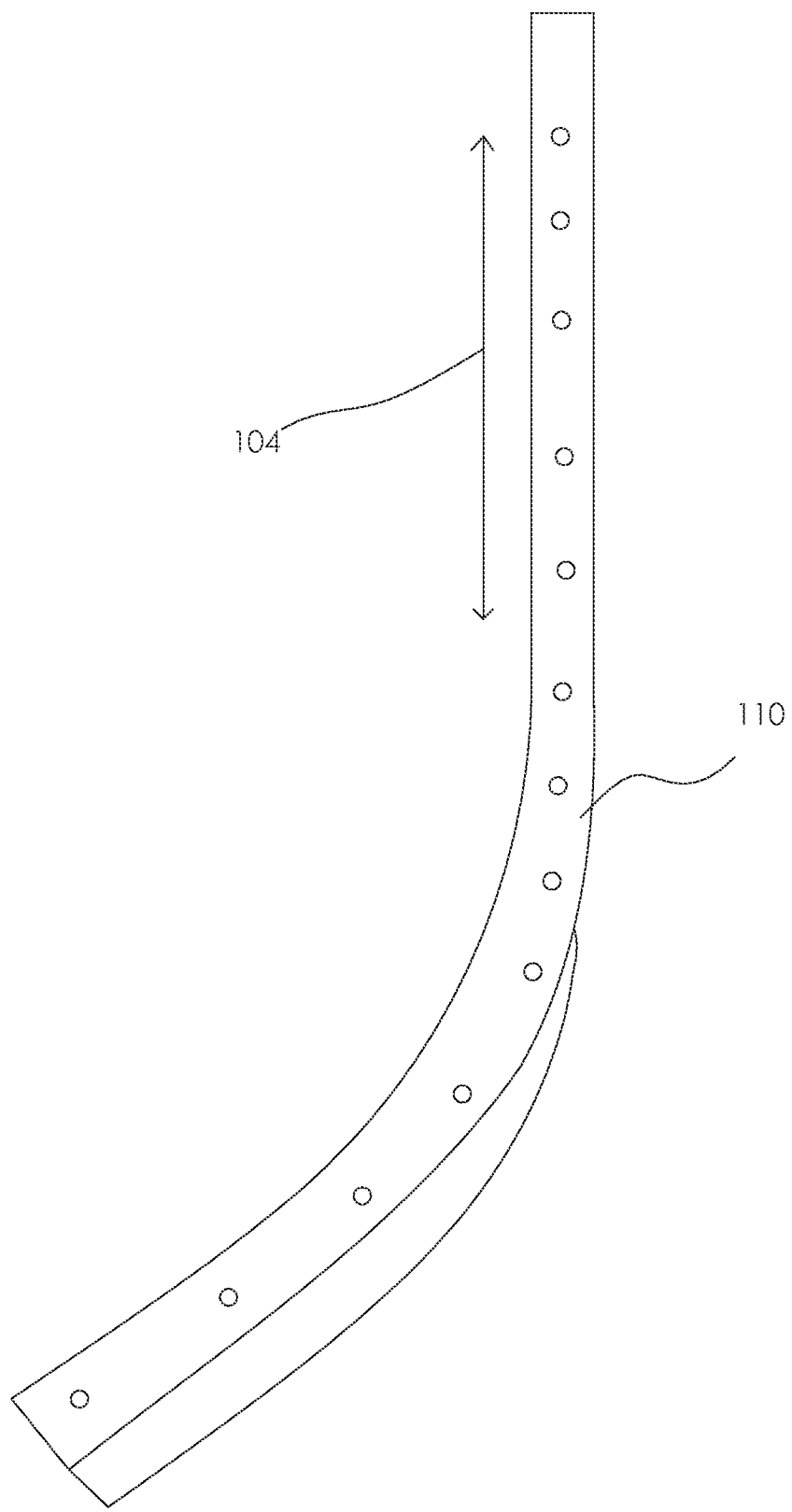
Figure 33A:
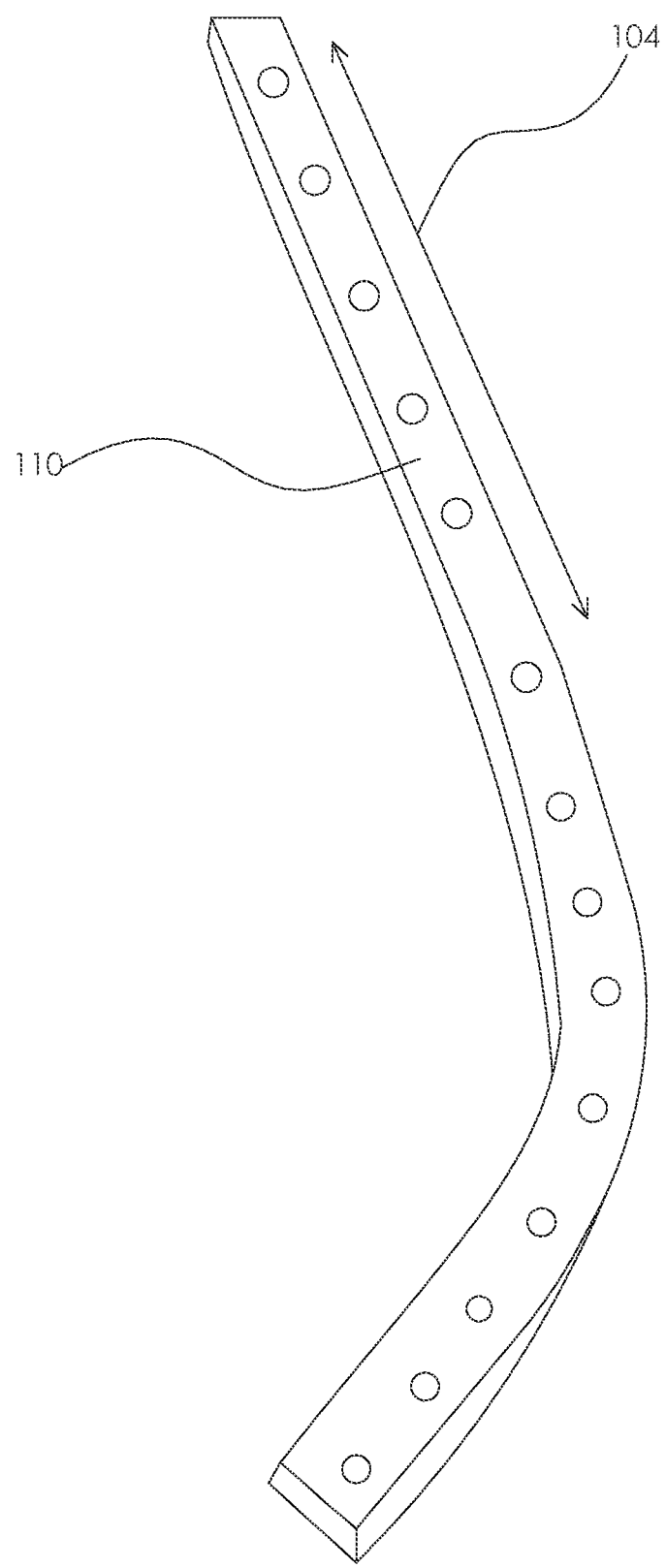
Figure 34:
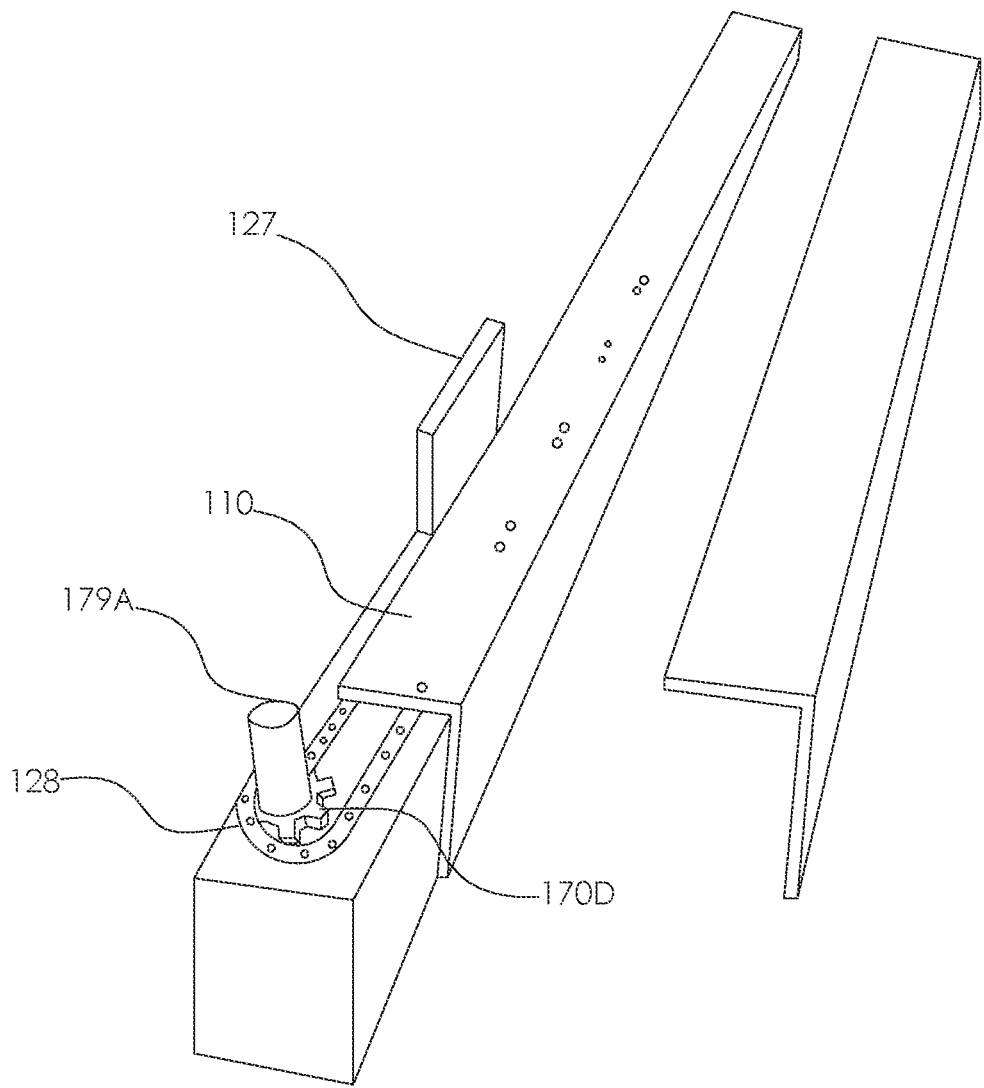
Figure 35:
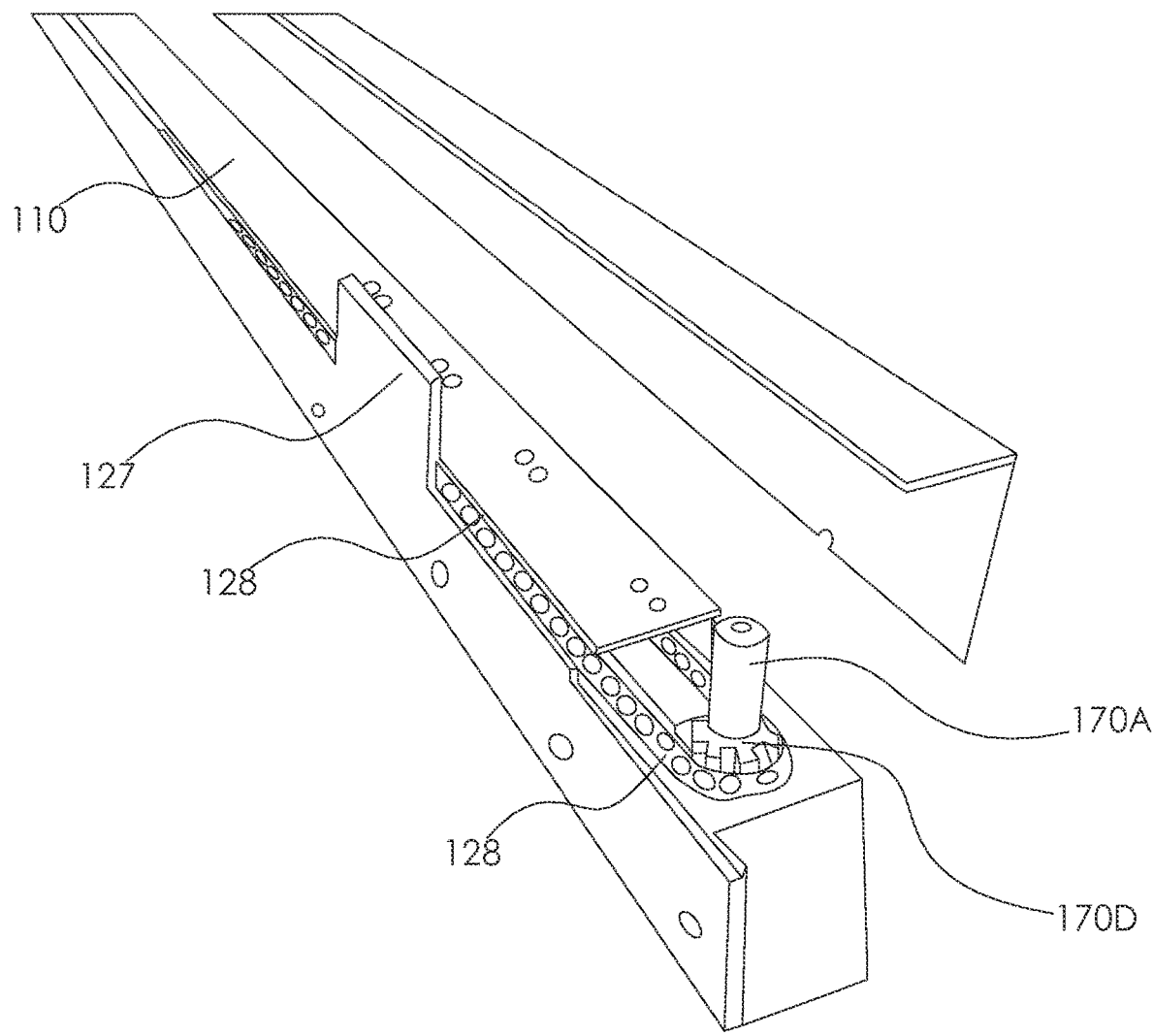
Figure 36:
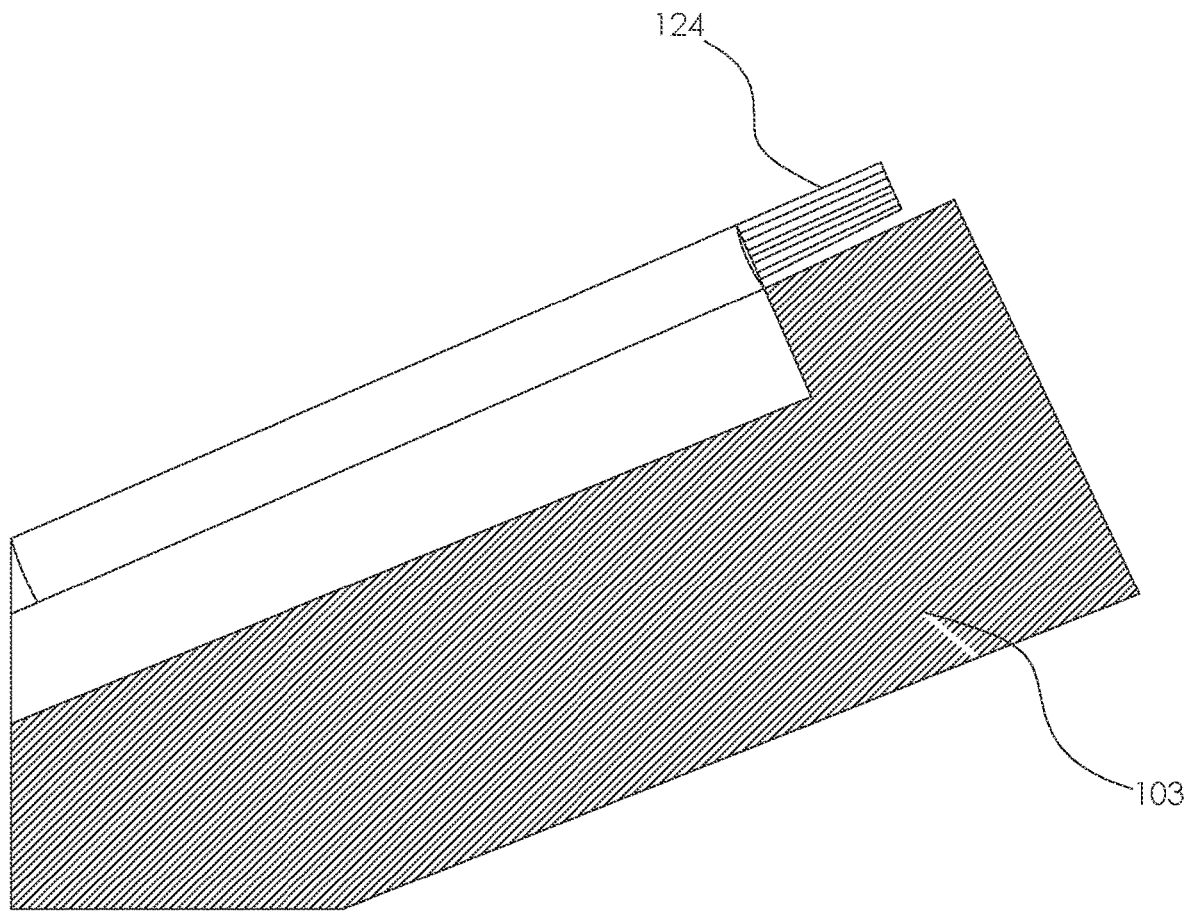
Figure 36A:
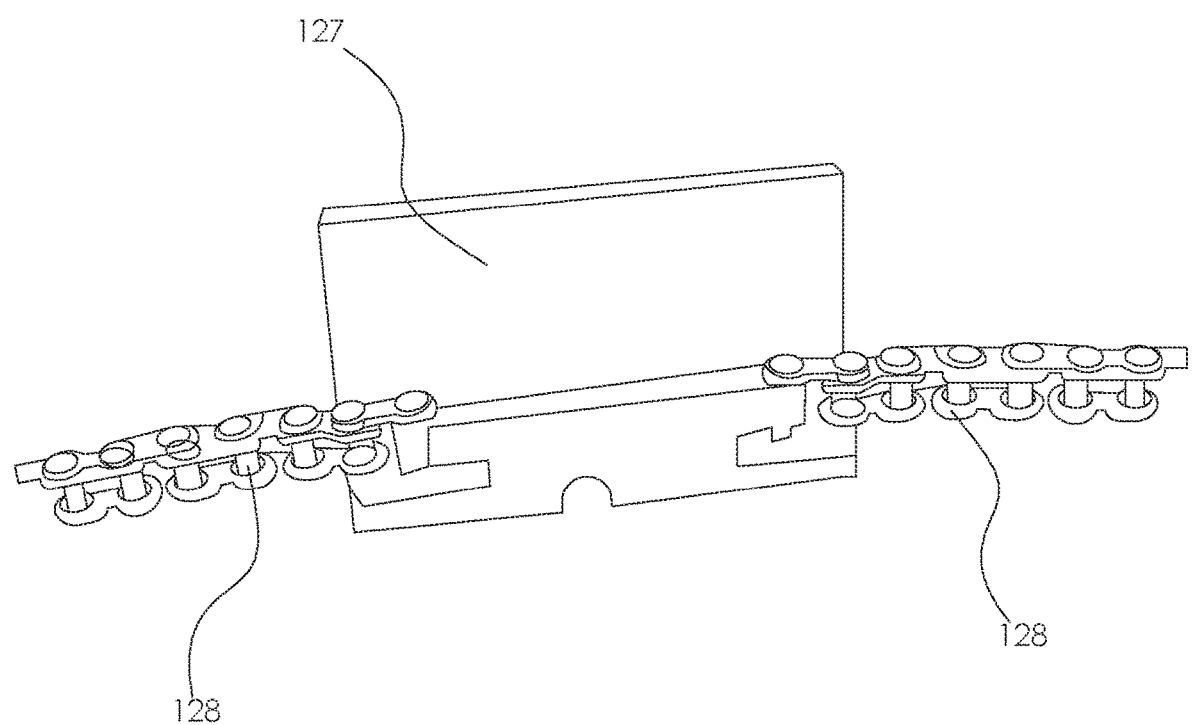
Figure 37:
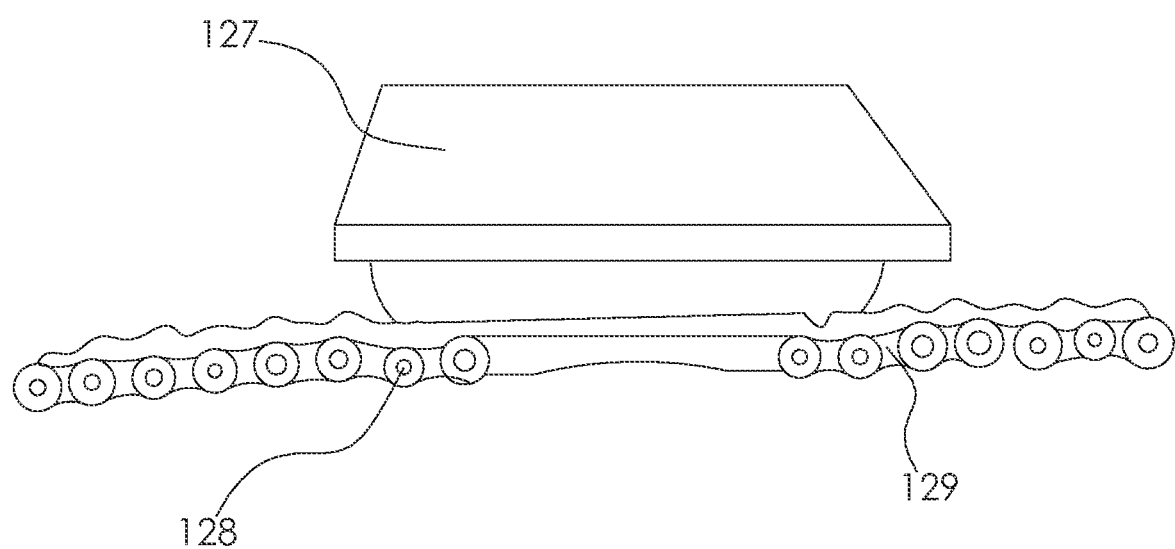
Figure 38:
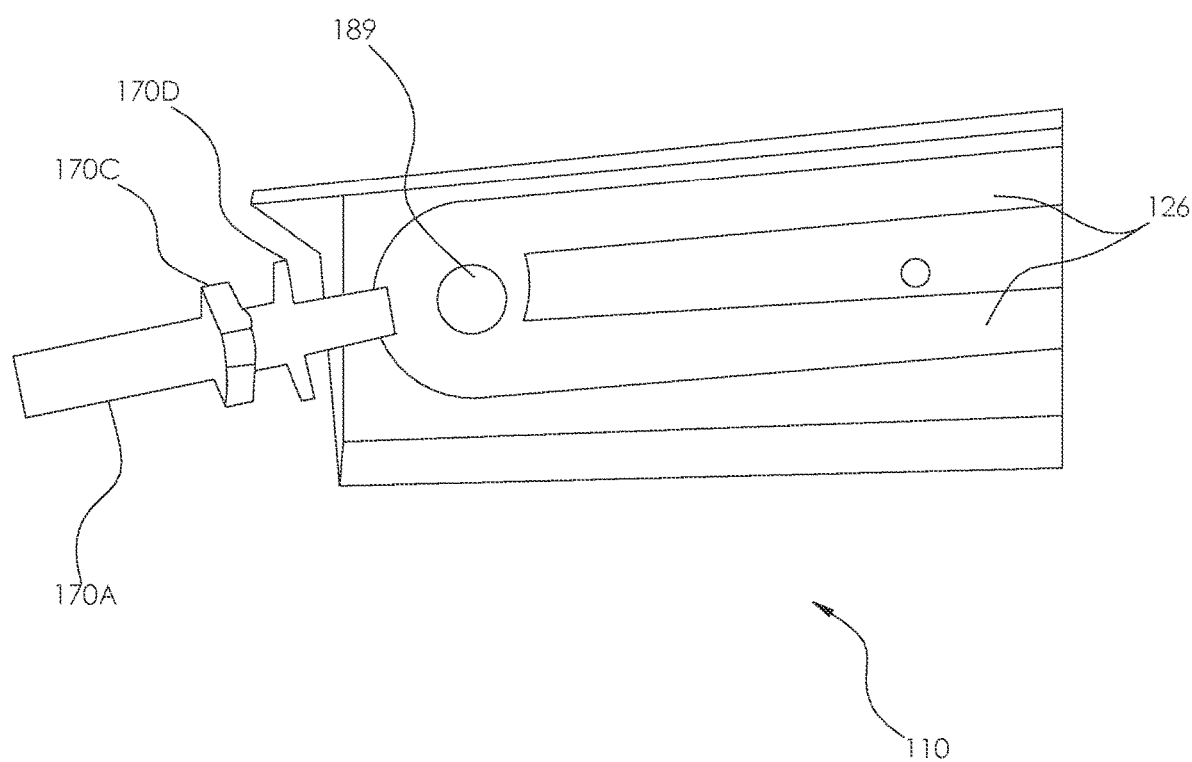
Figure 39:
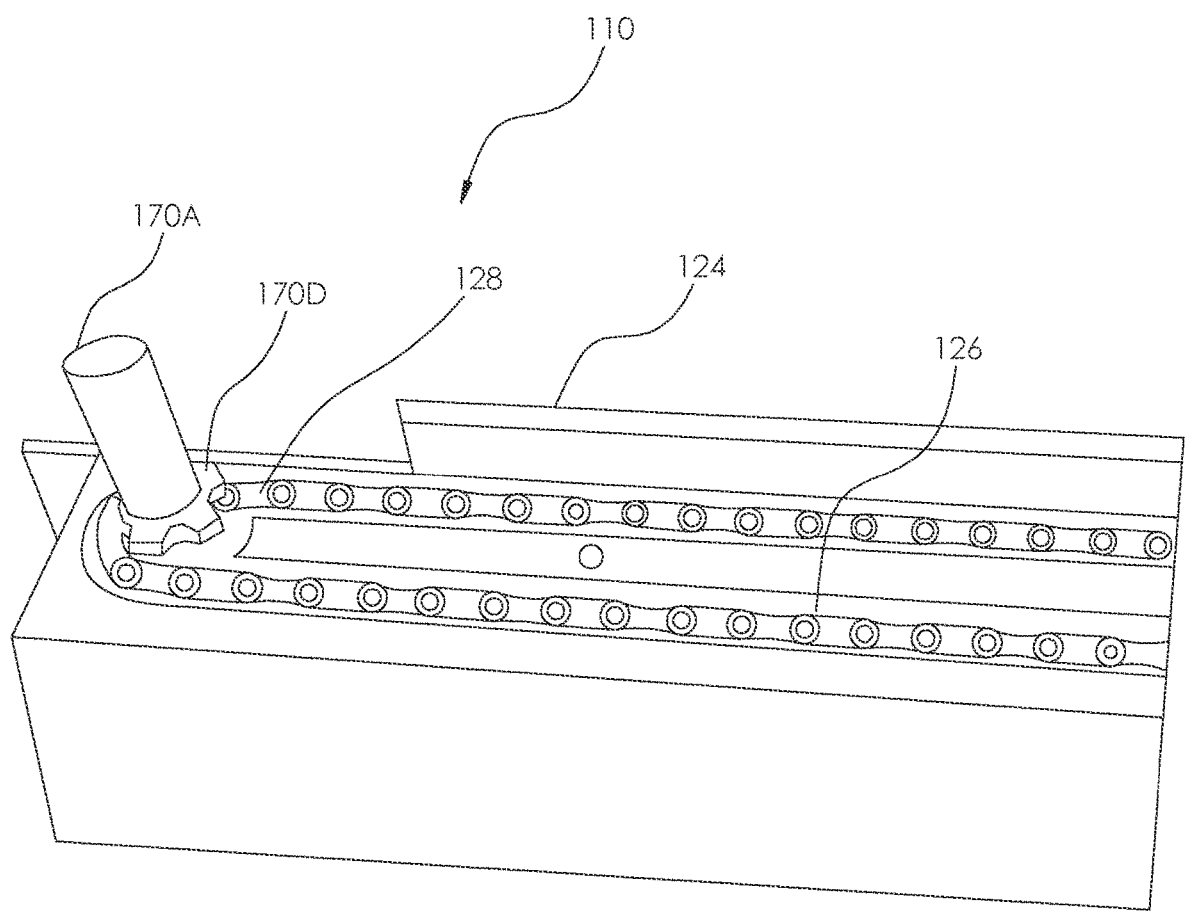
Figure 40:
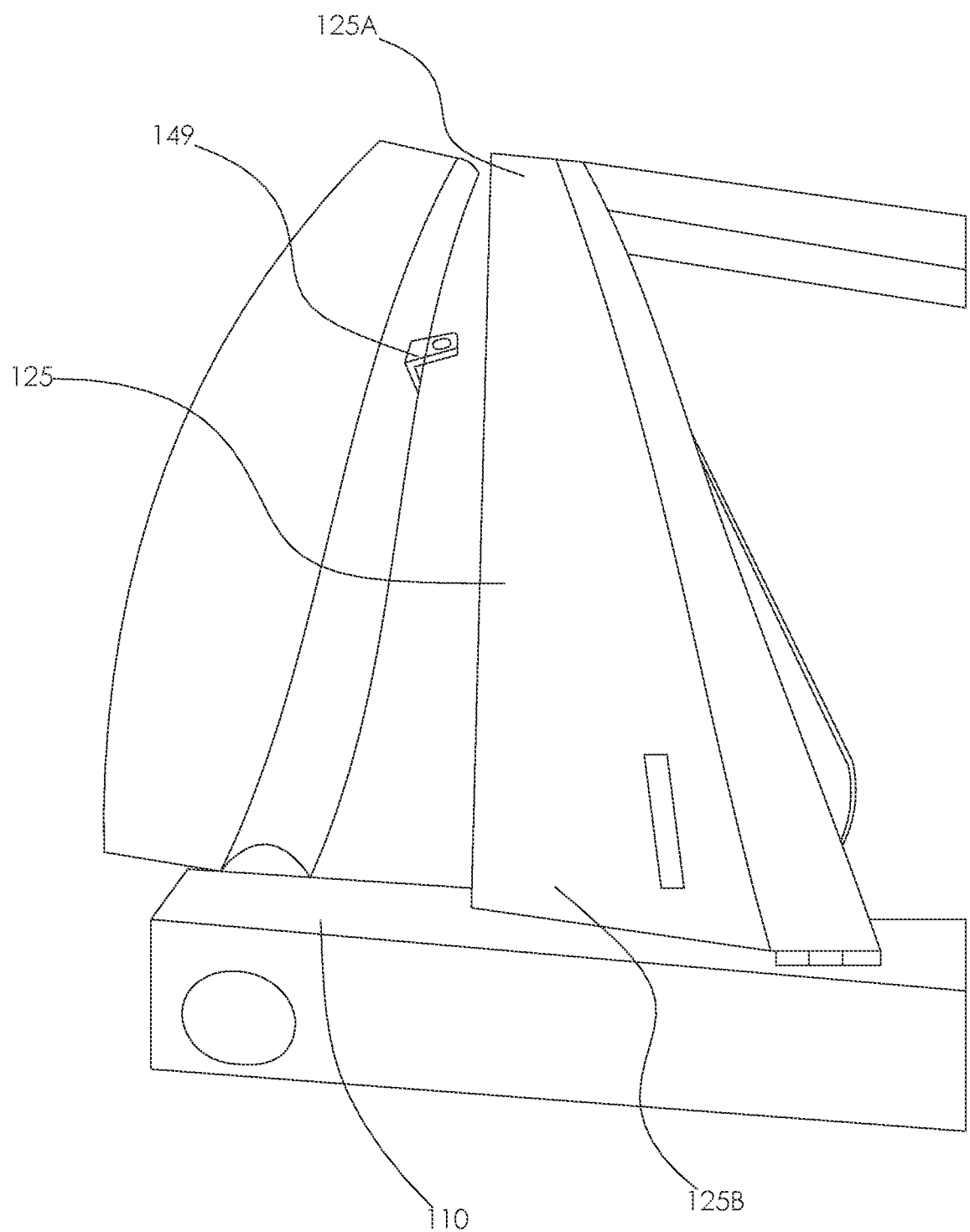
Figure 41:
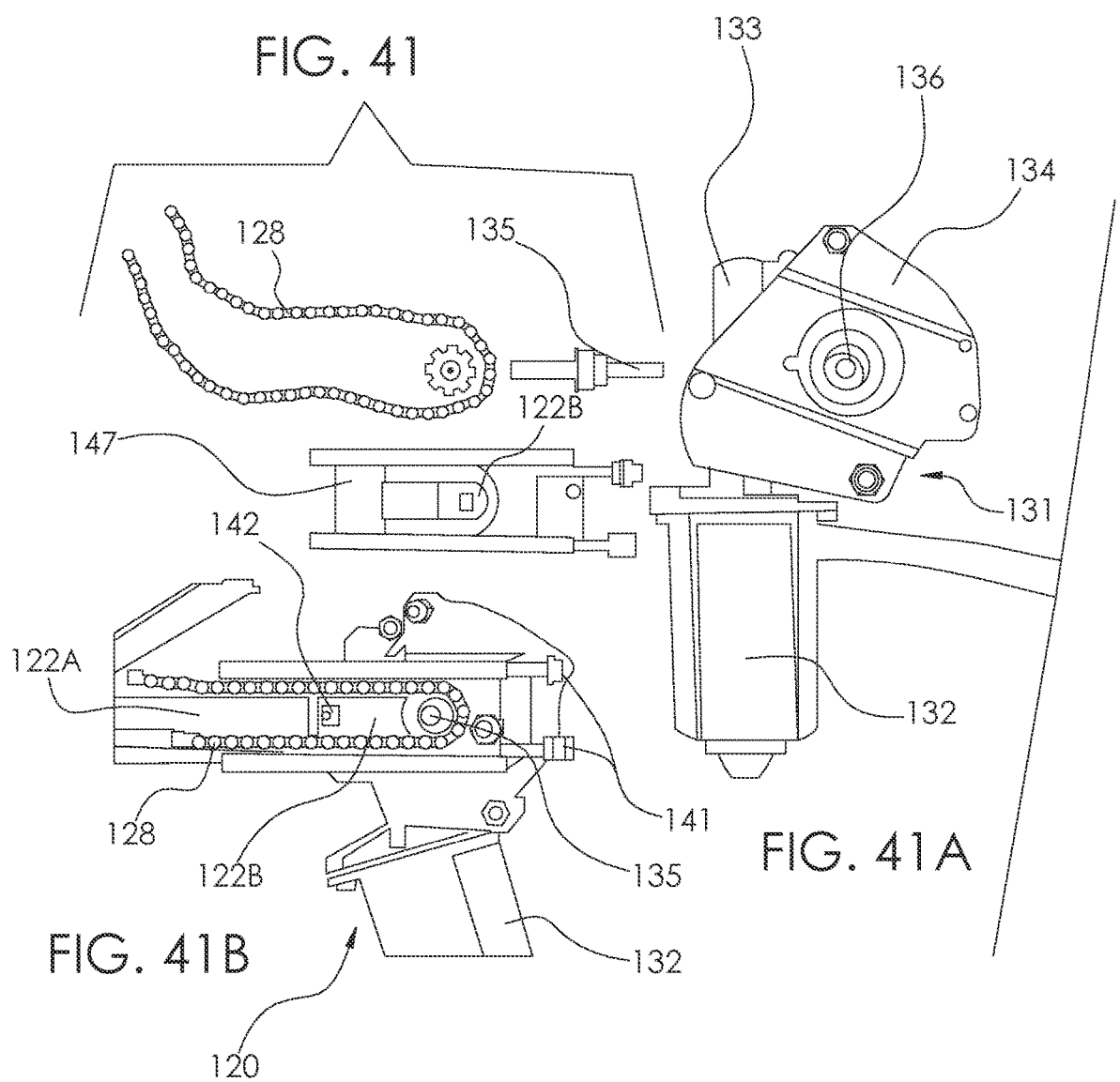
Figure 42:
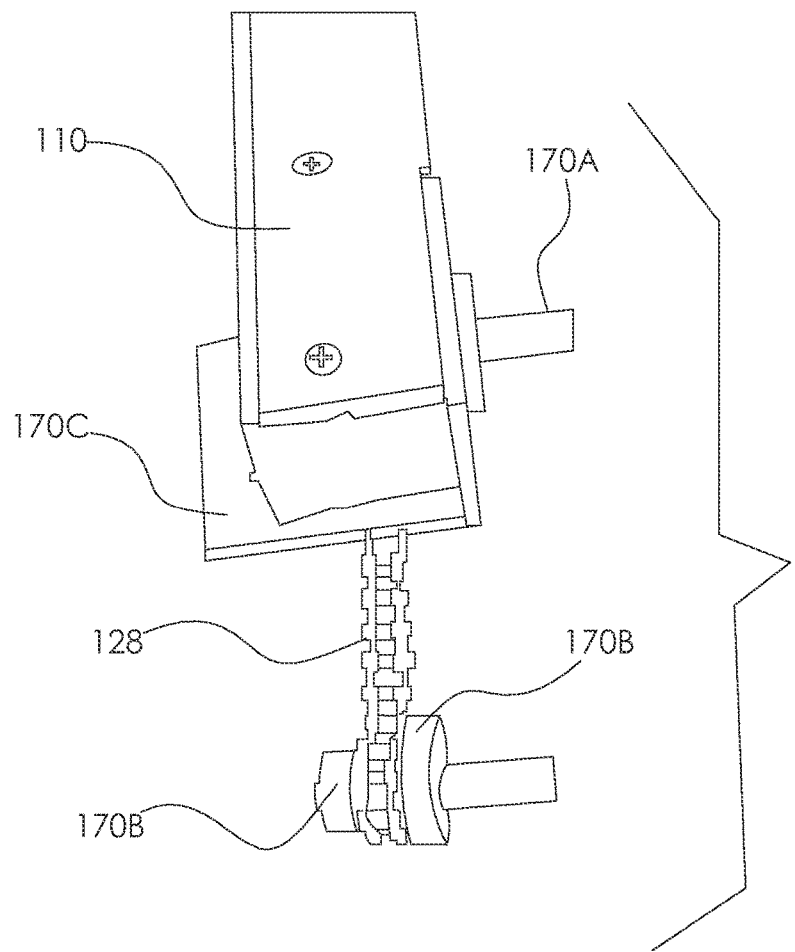
Figure 42A:
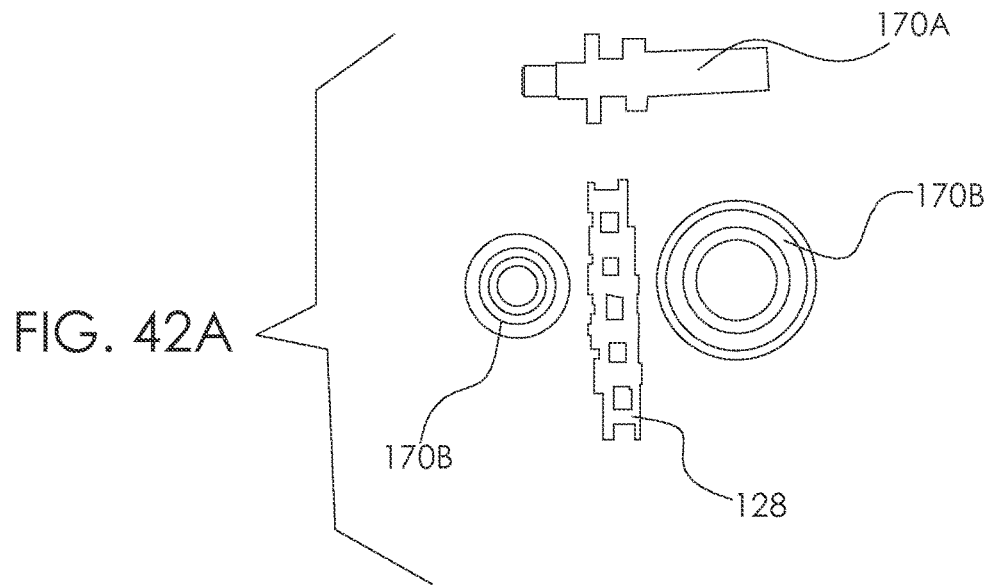
Figure 43:
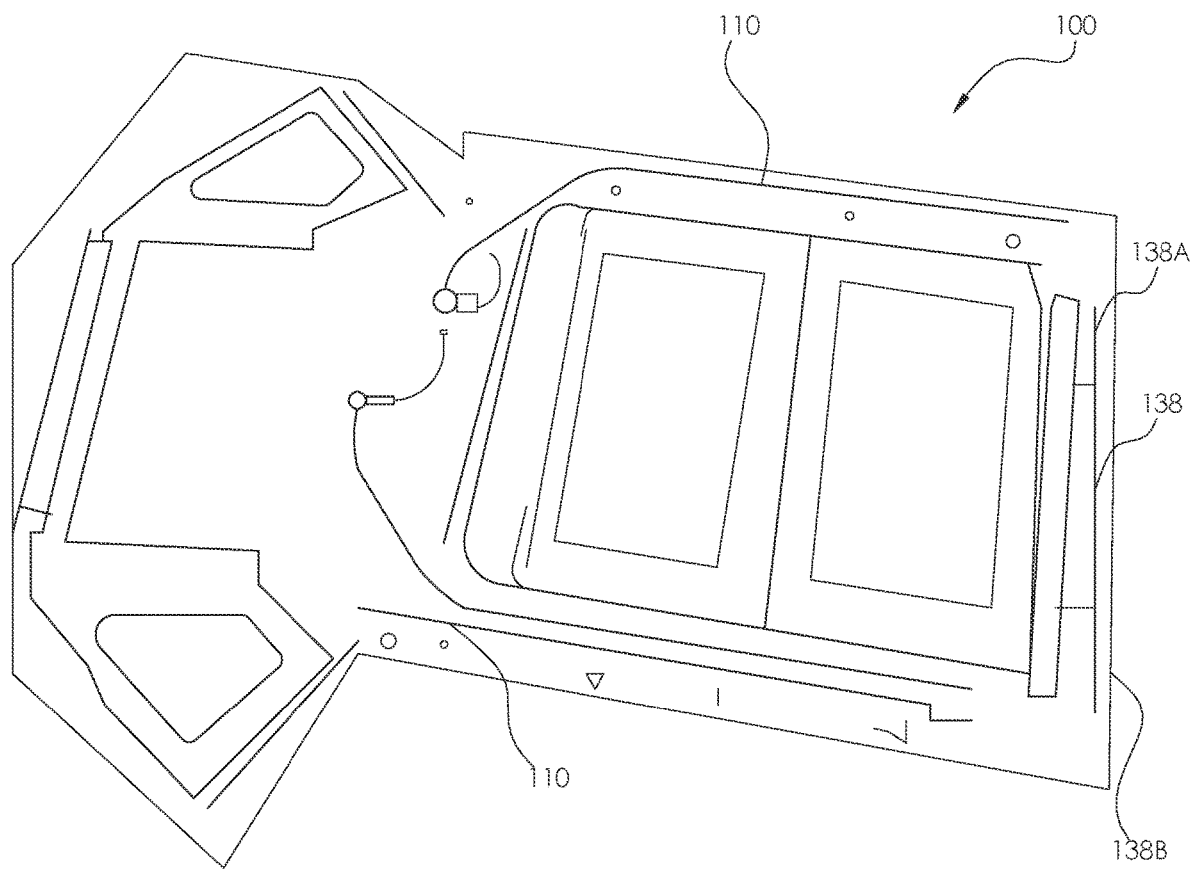
Figure 44:
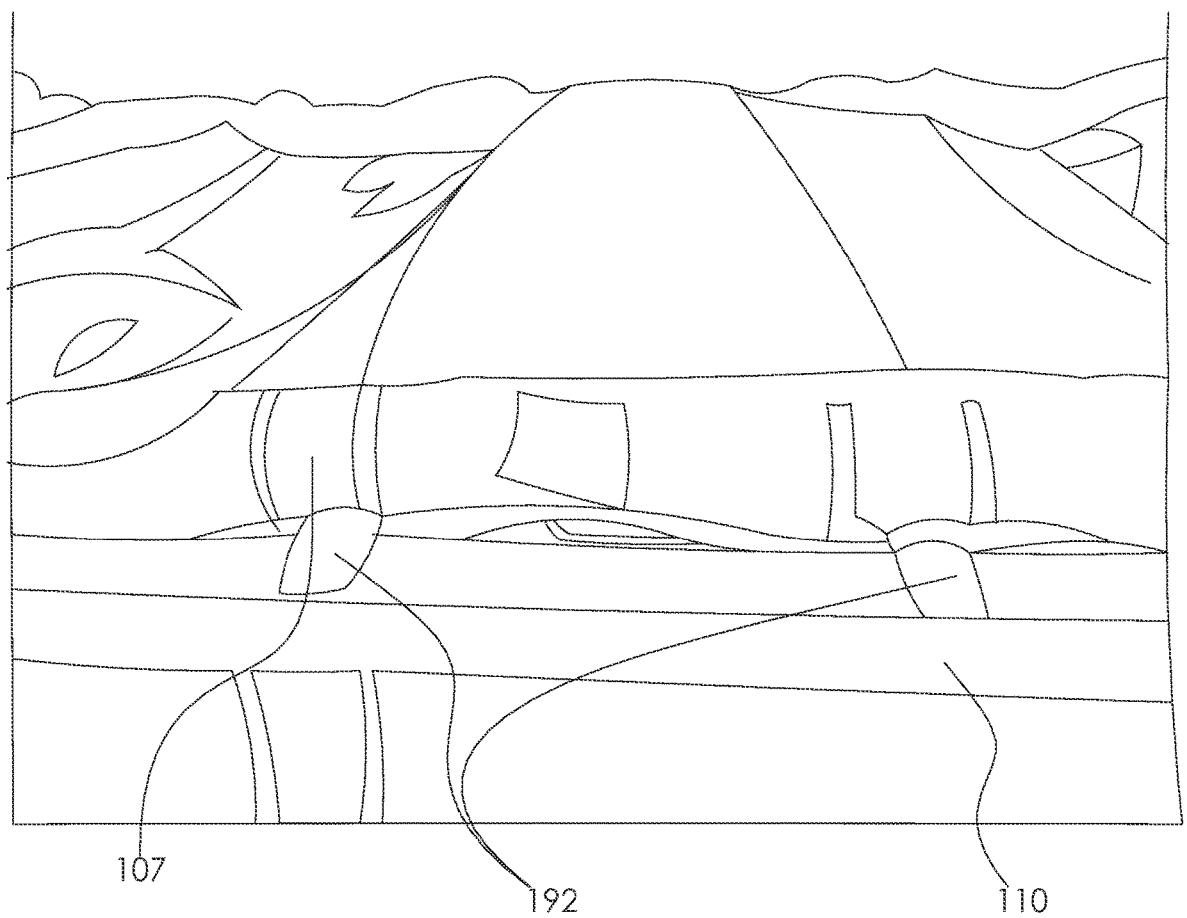
Figure 45:
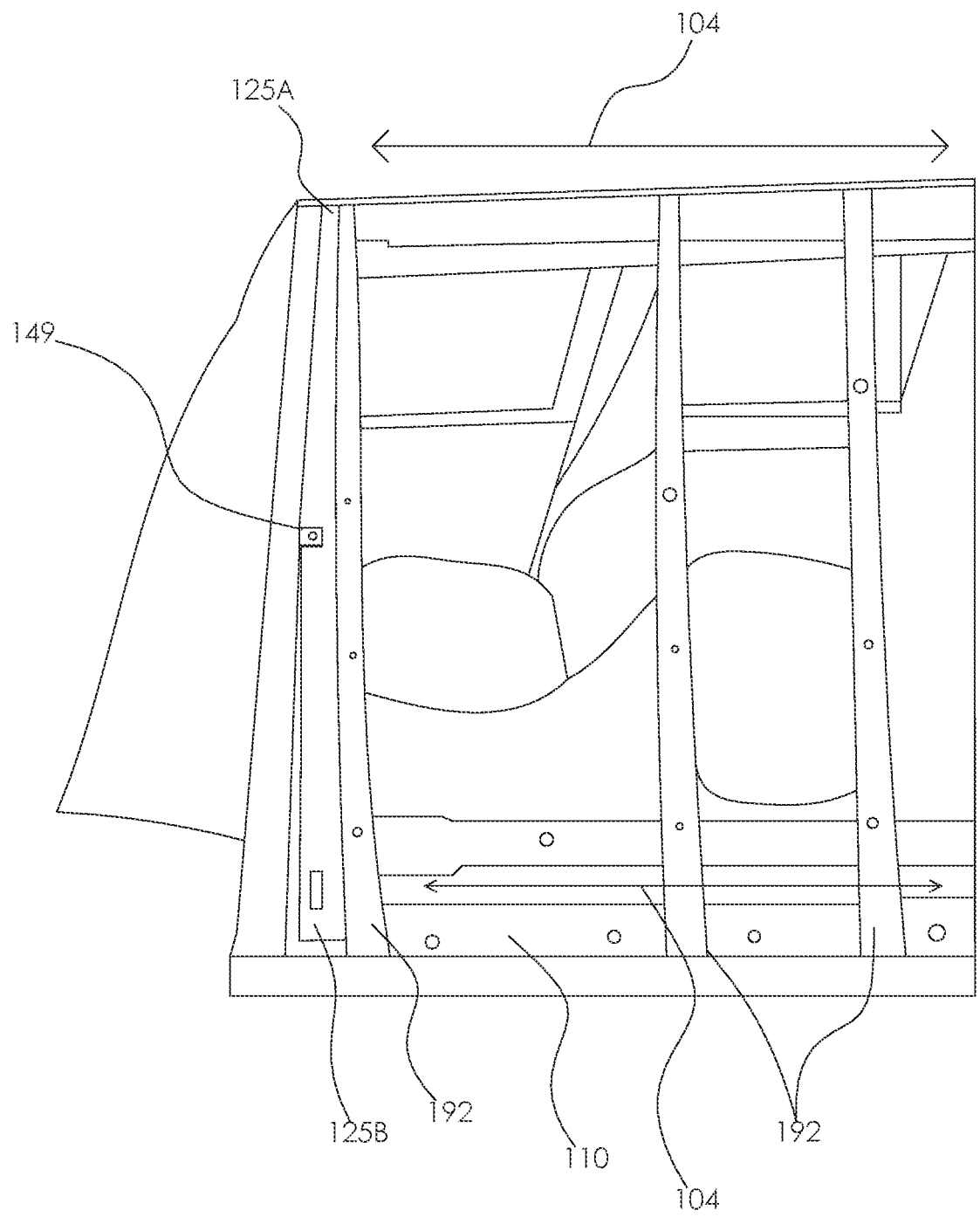
Figure 46:
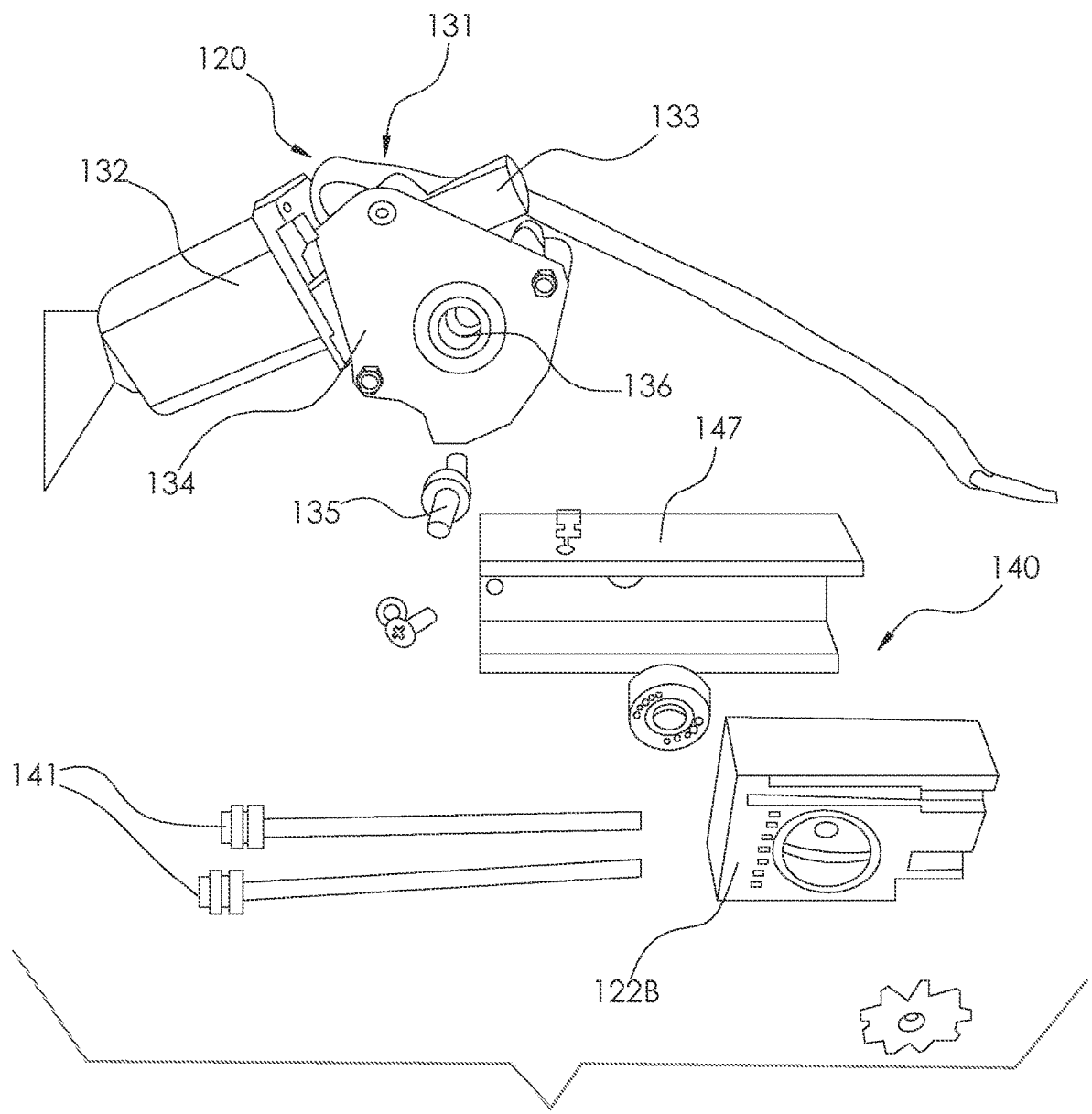
Figure 47:
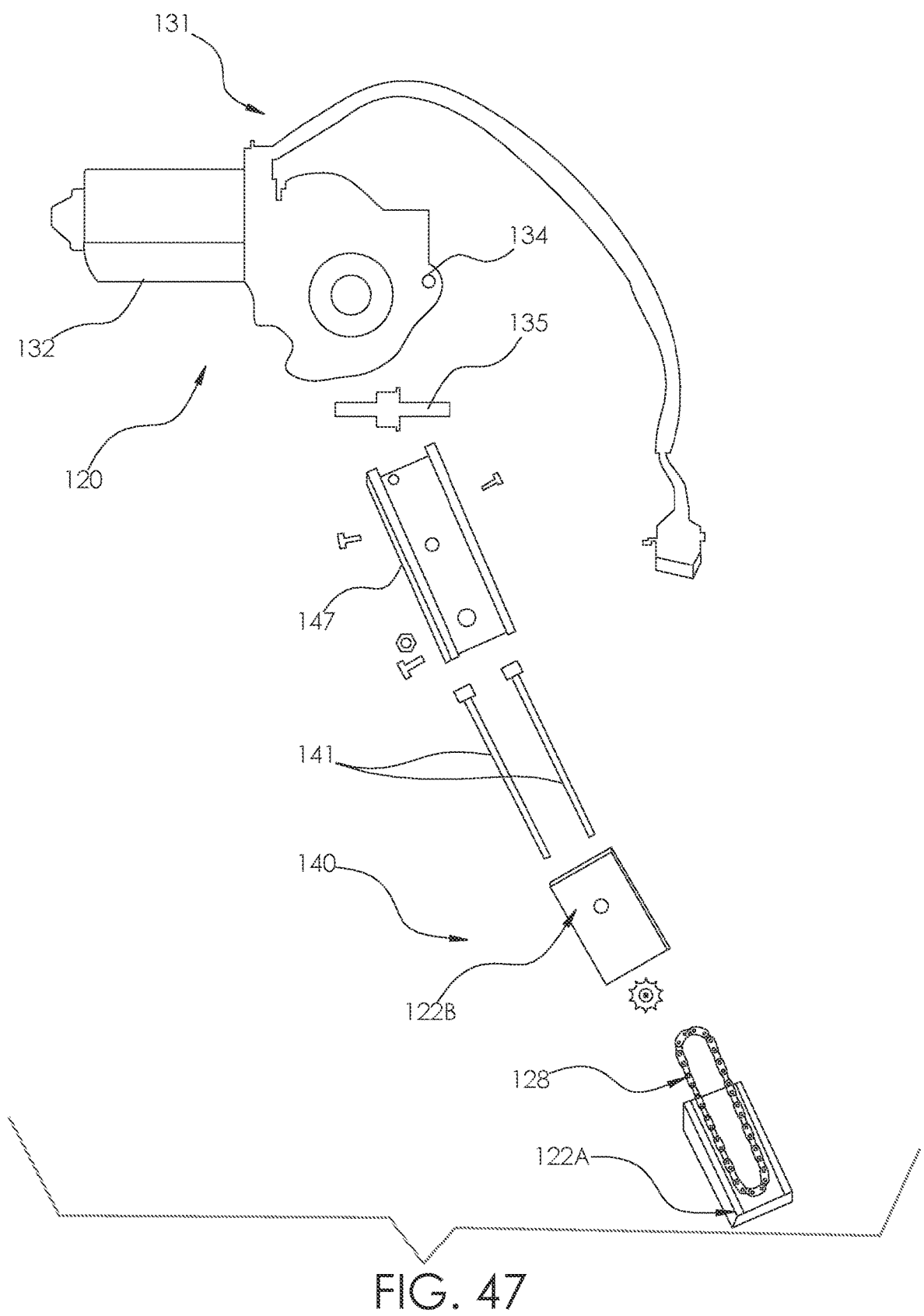
Figure 48:
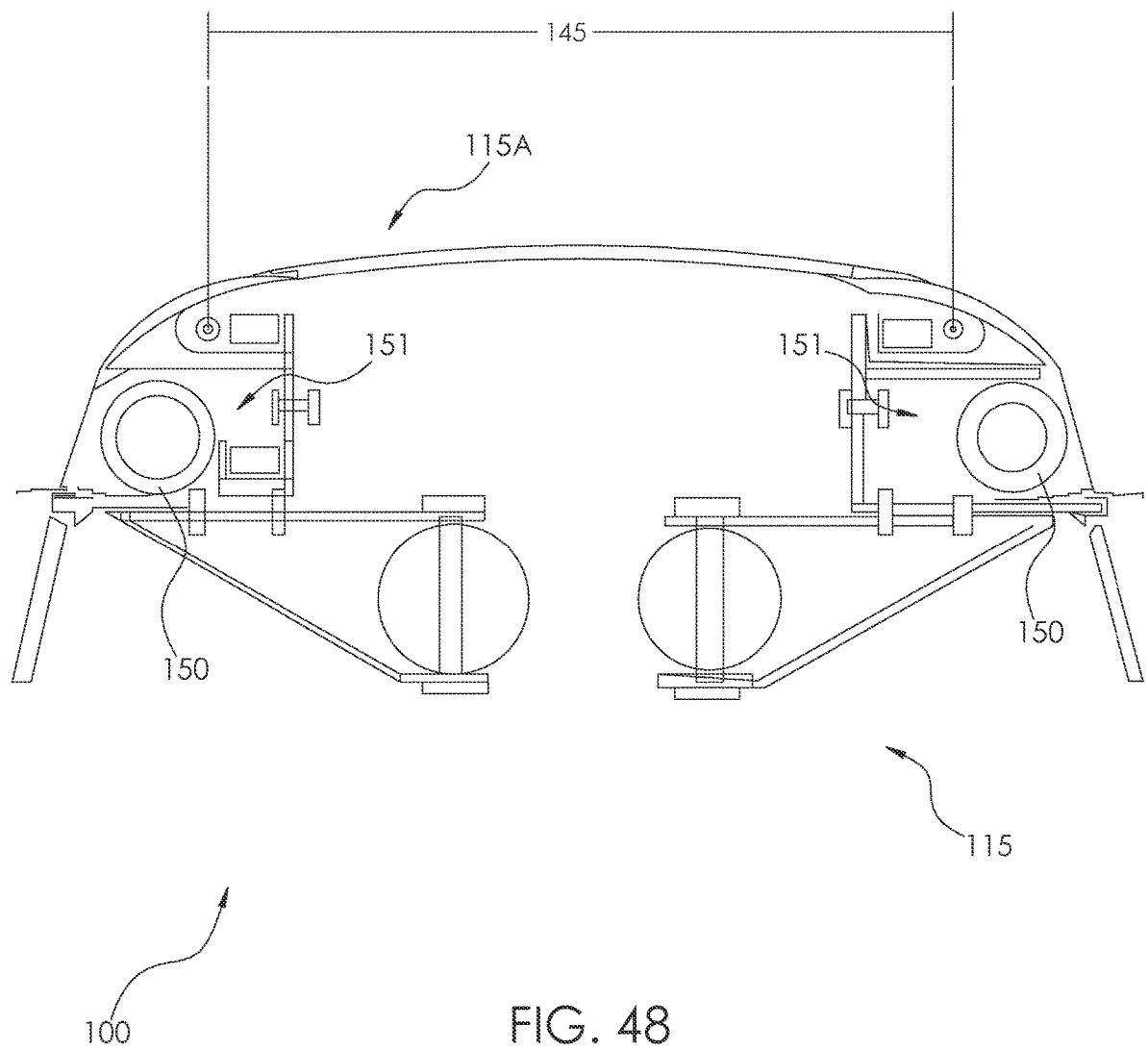
Figure 49:
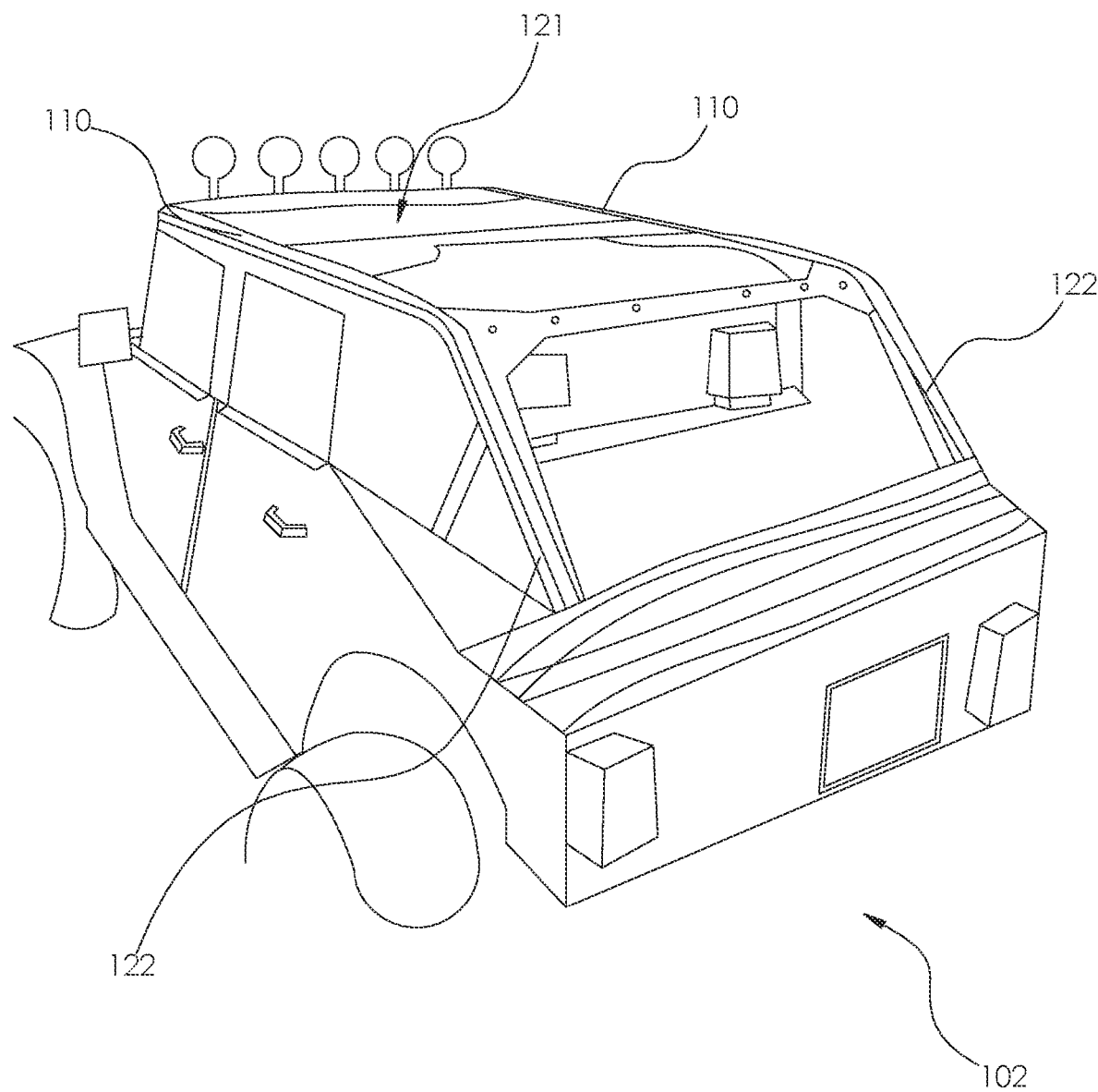
Figure 50:
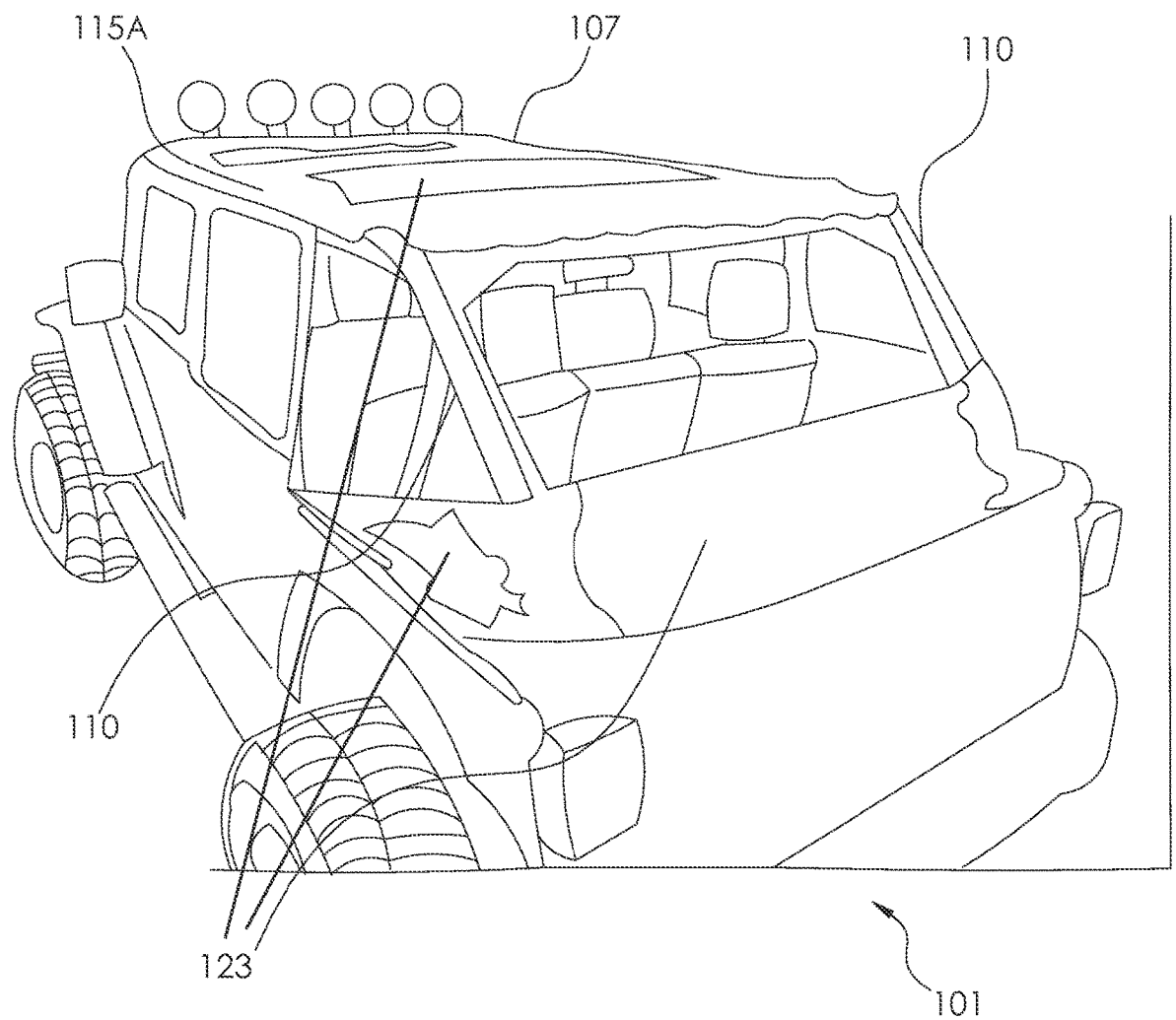
Figure 51:
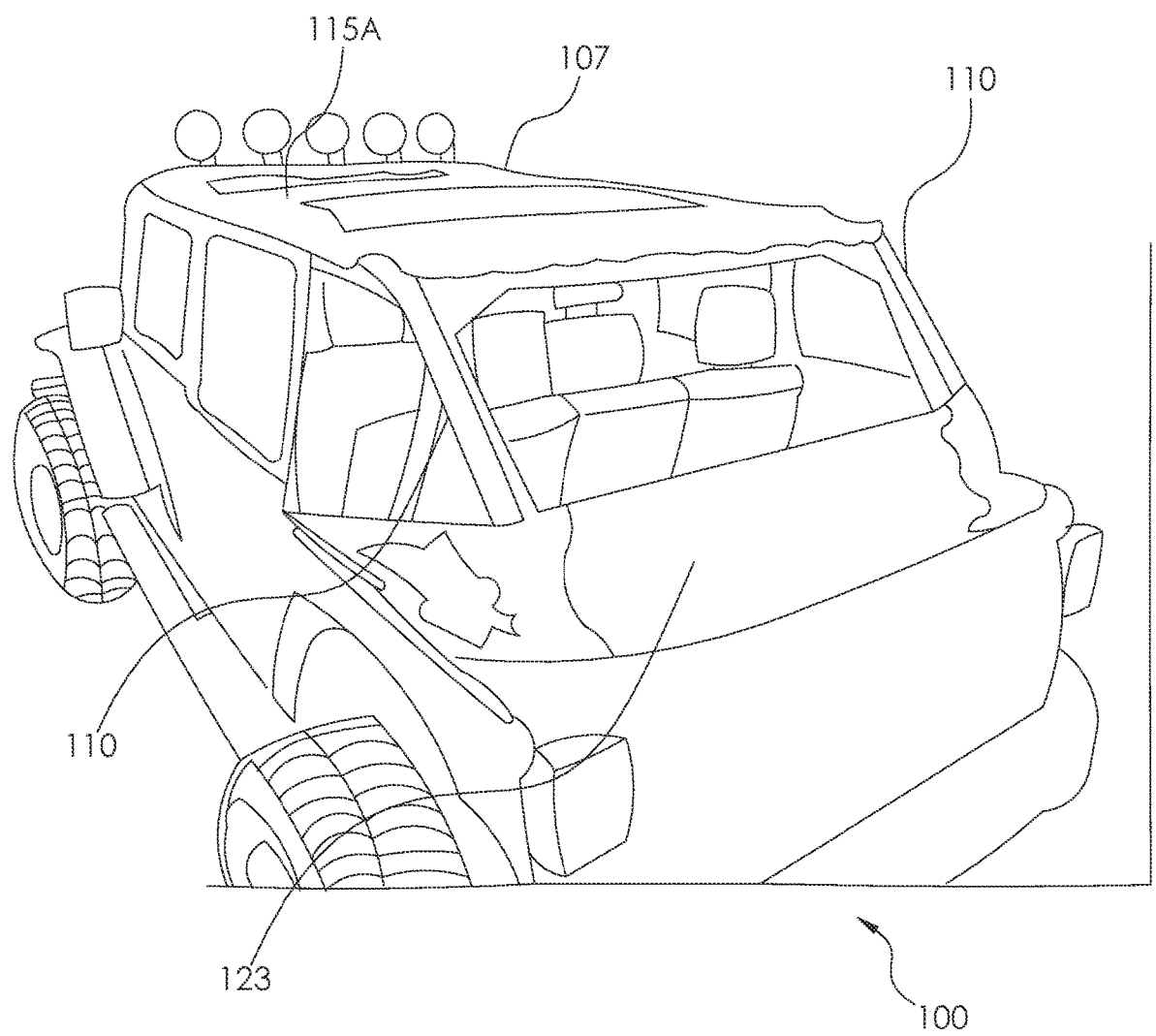
Figure 52:
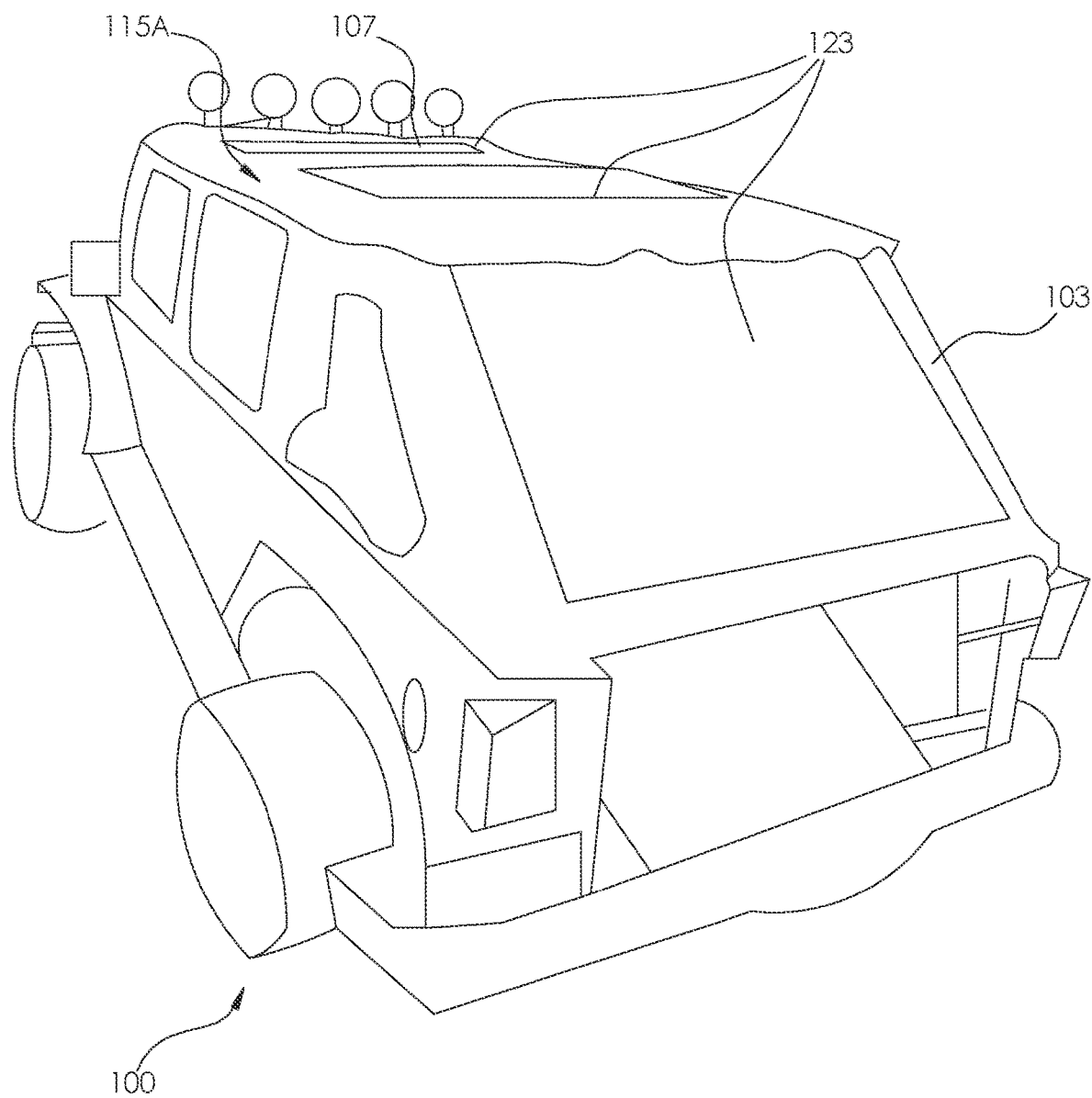
Figure 53:
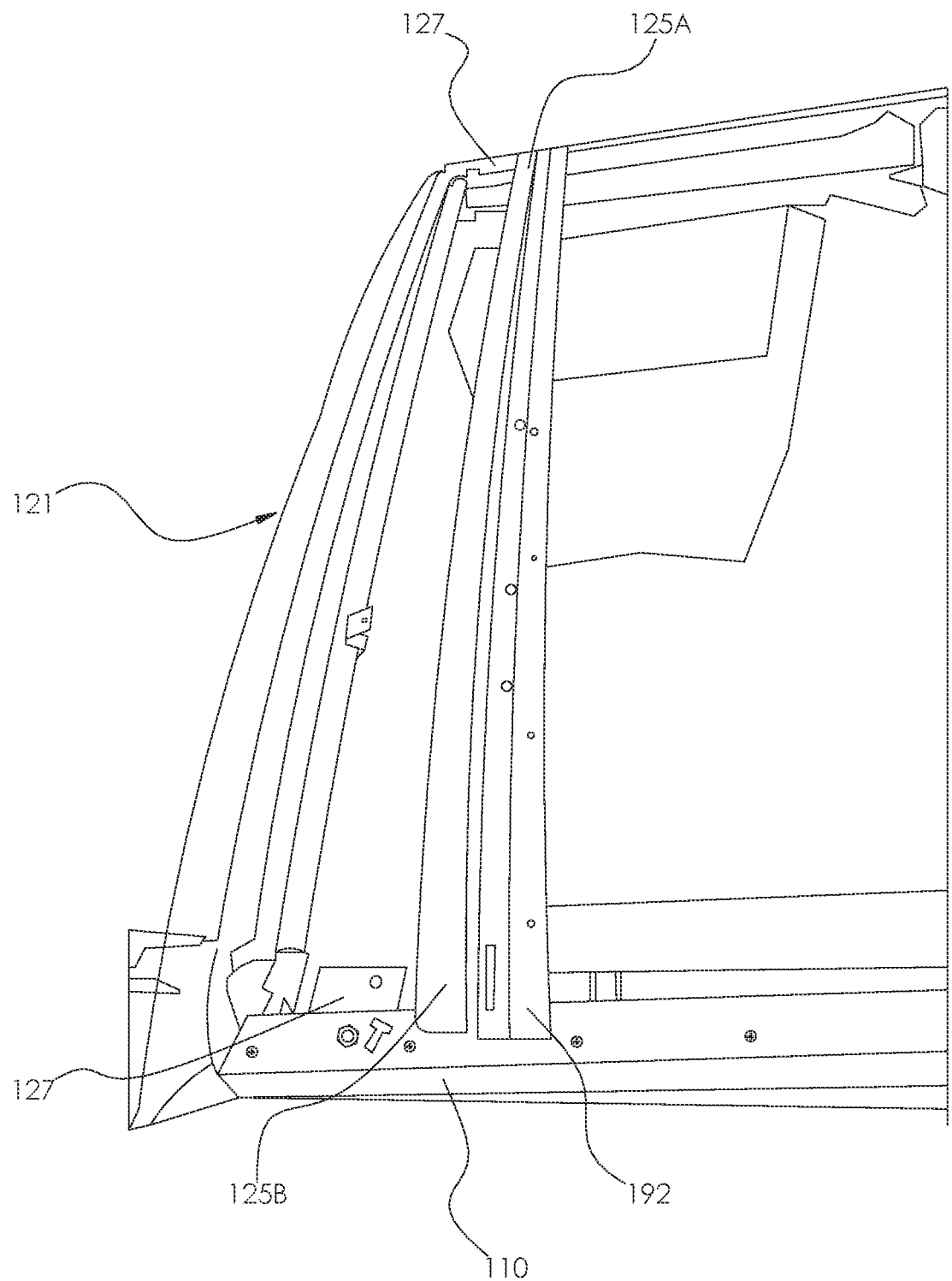
Figure 54:
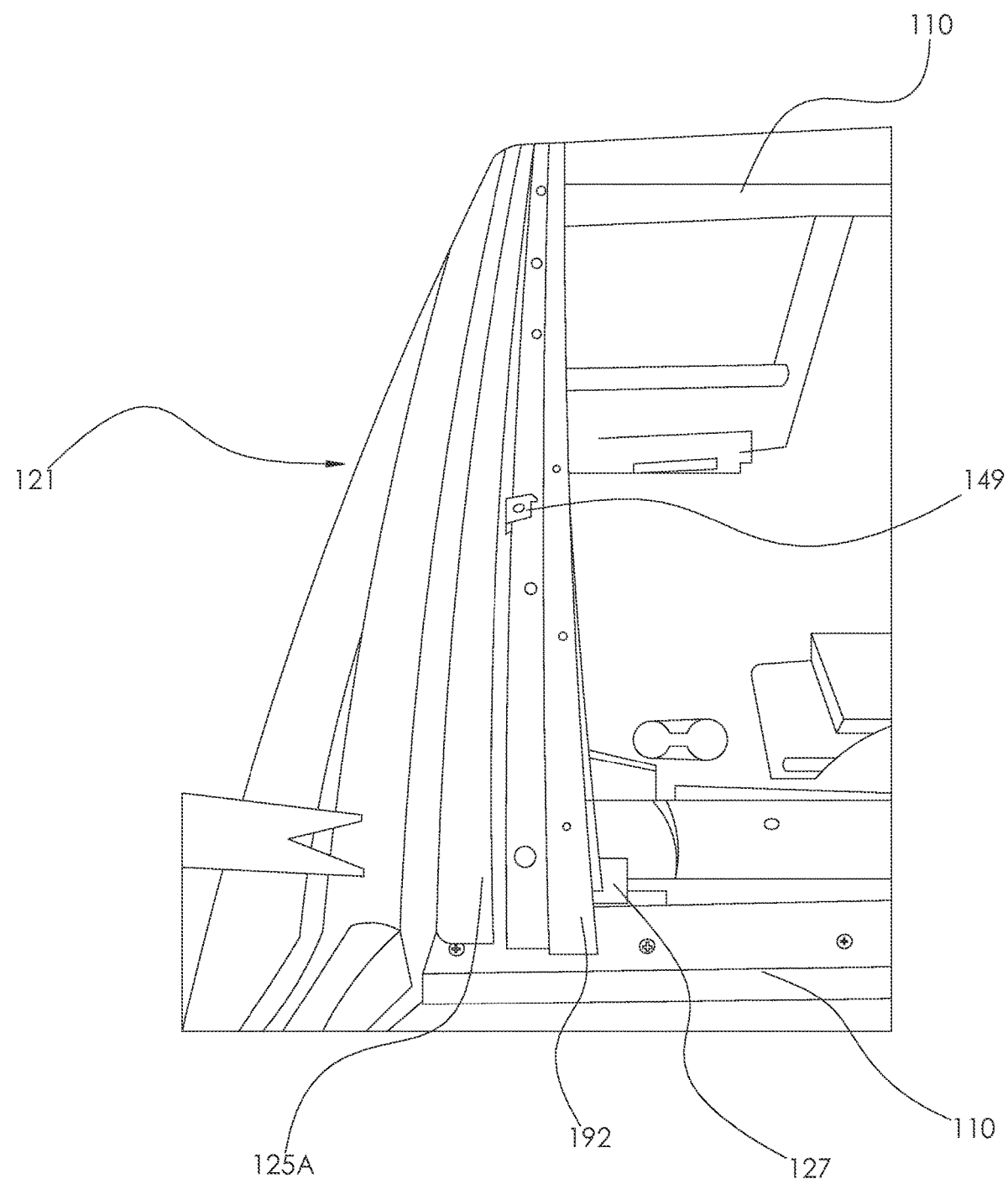
Figure 55:
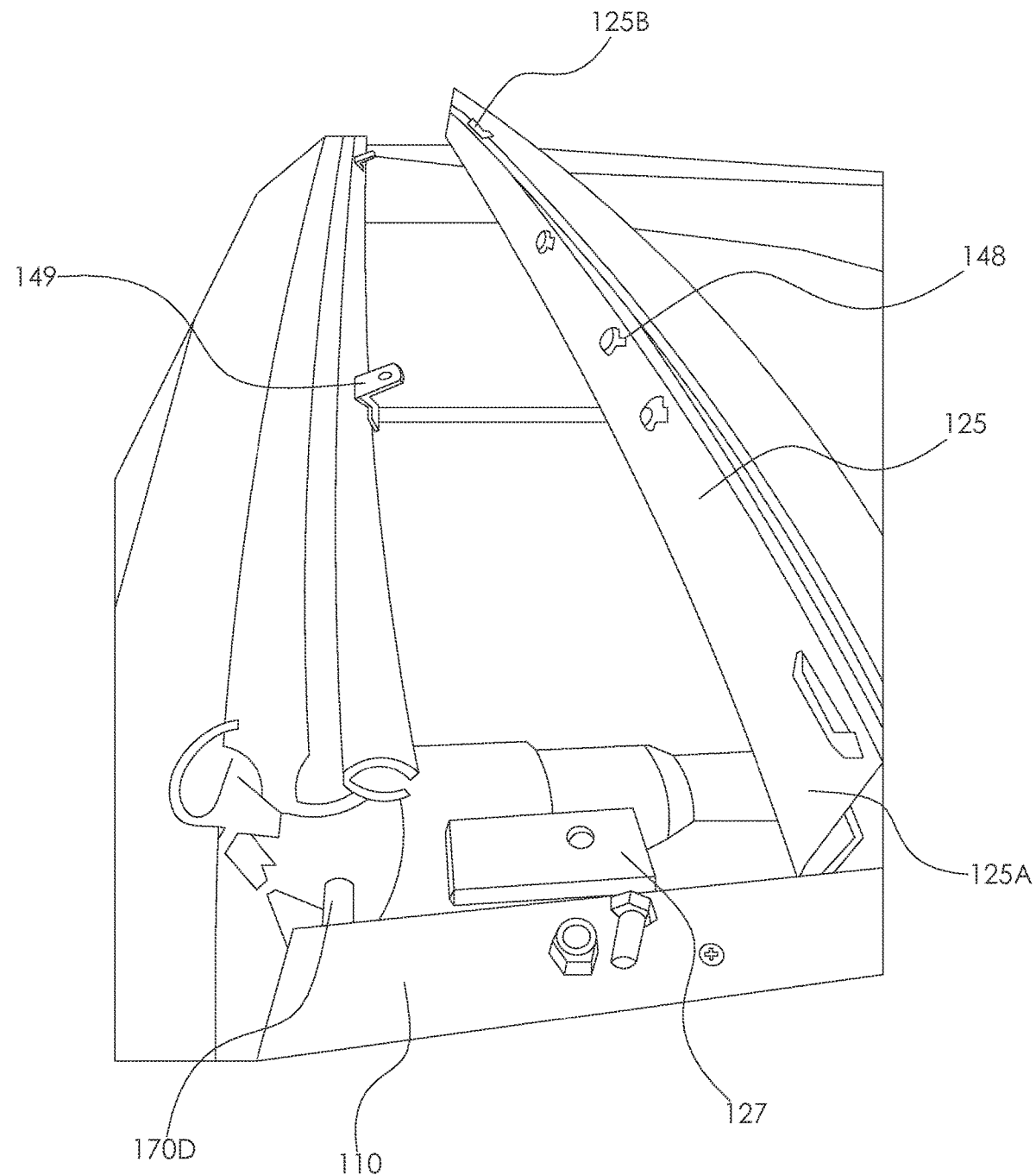
Figure 56:
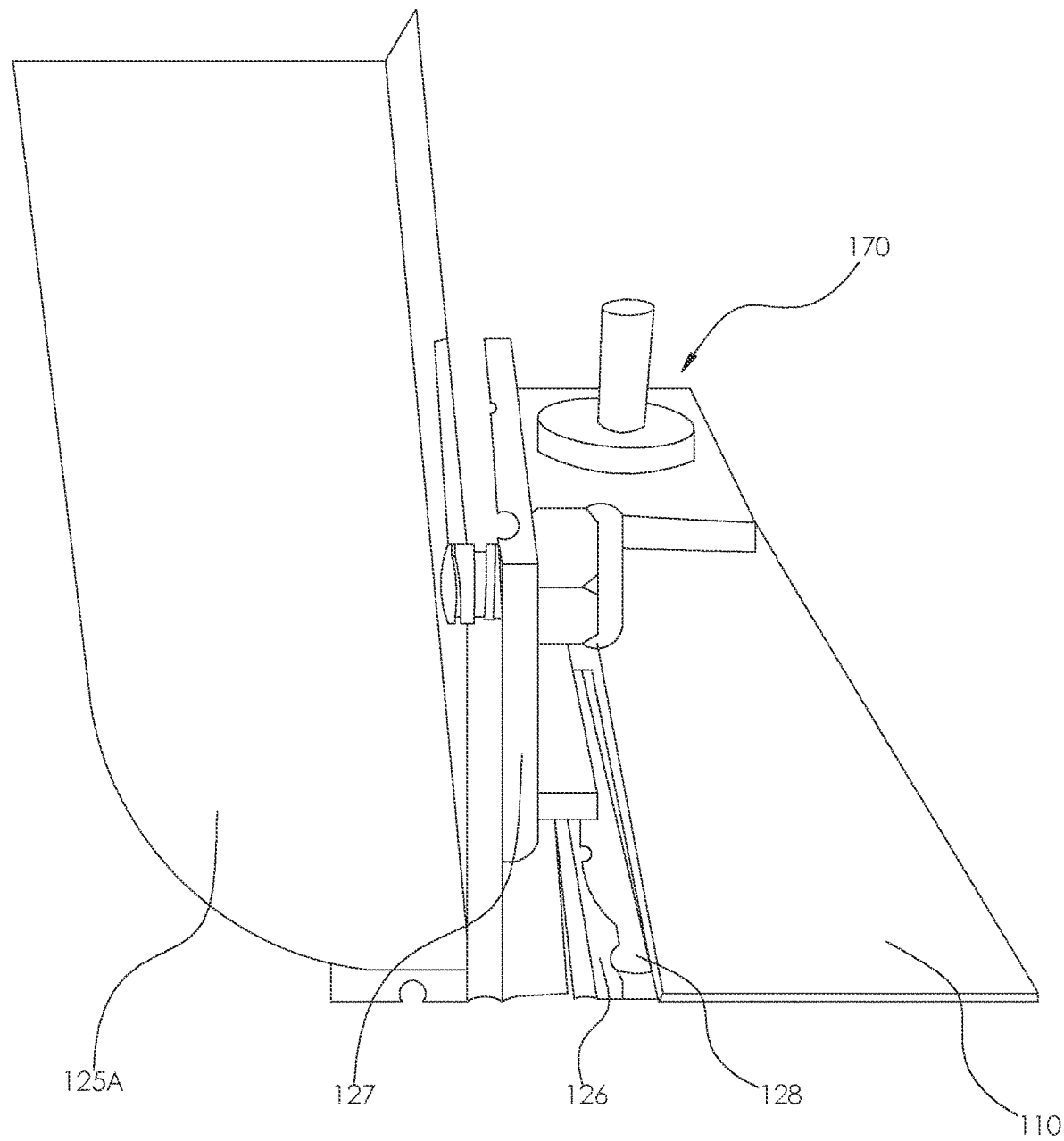
Figure 57:
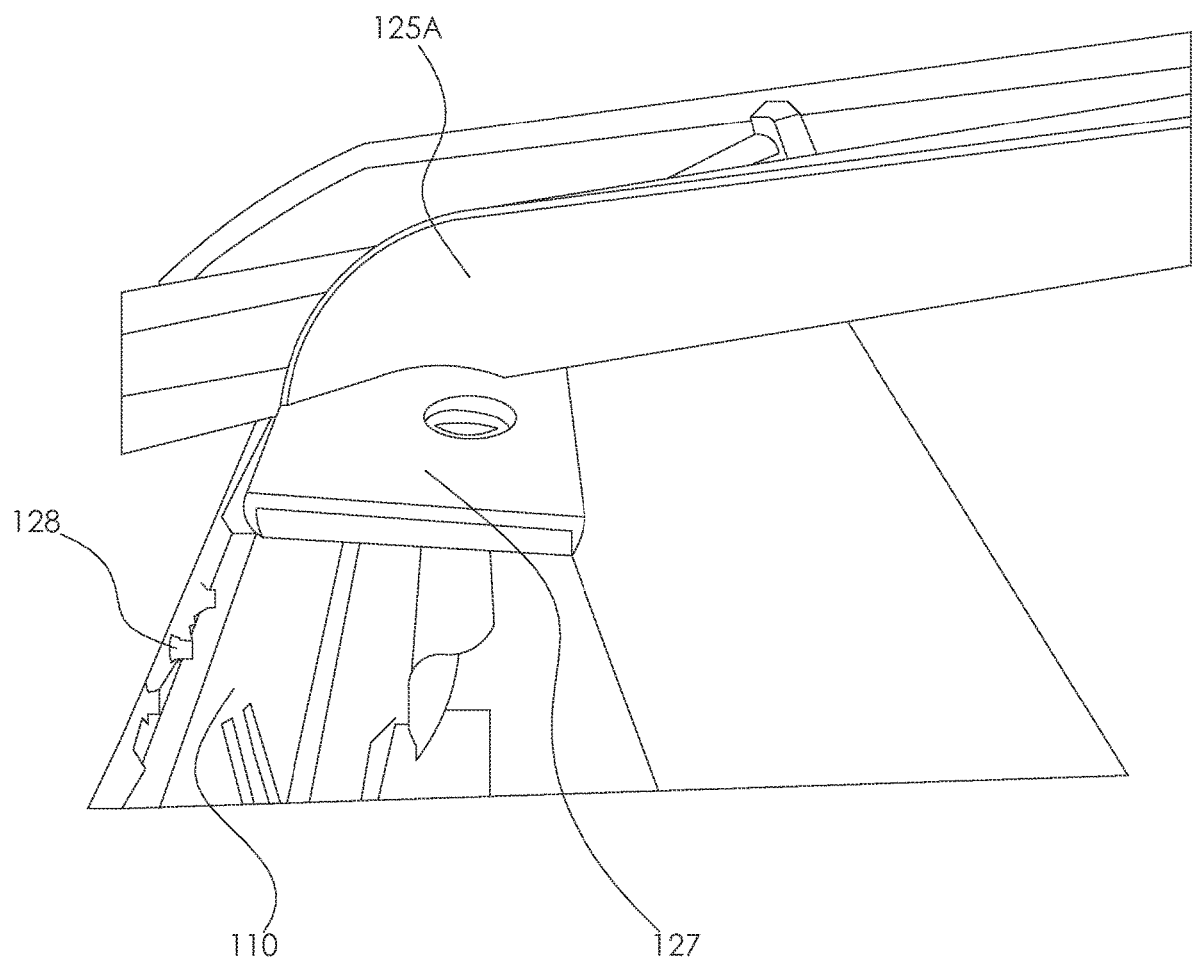
Figure 58:
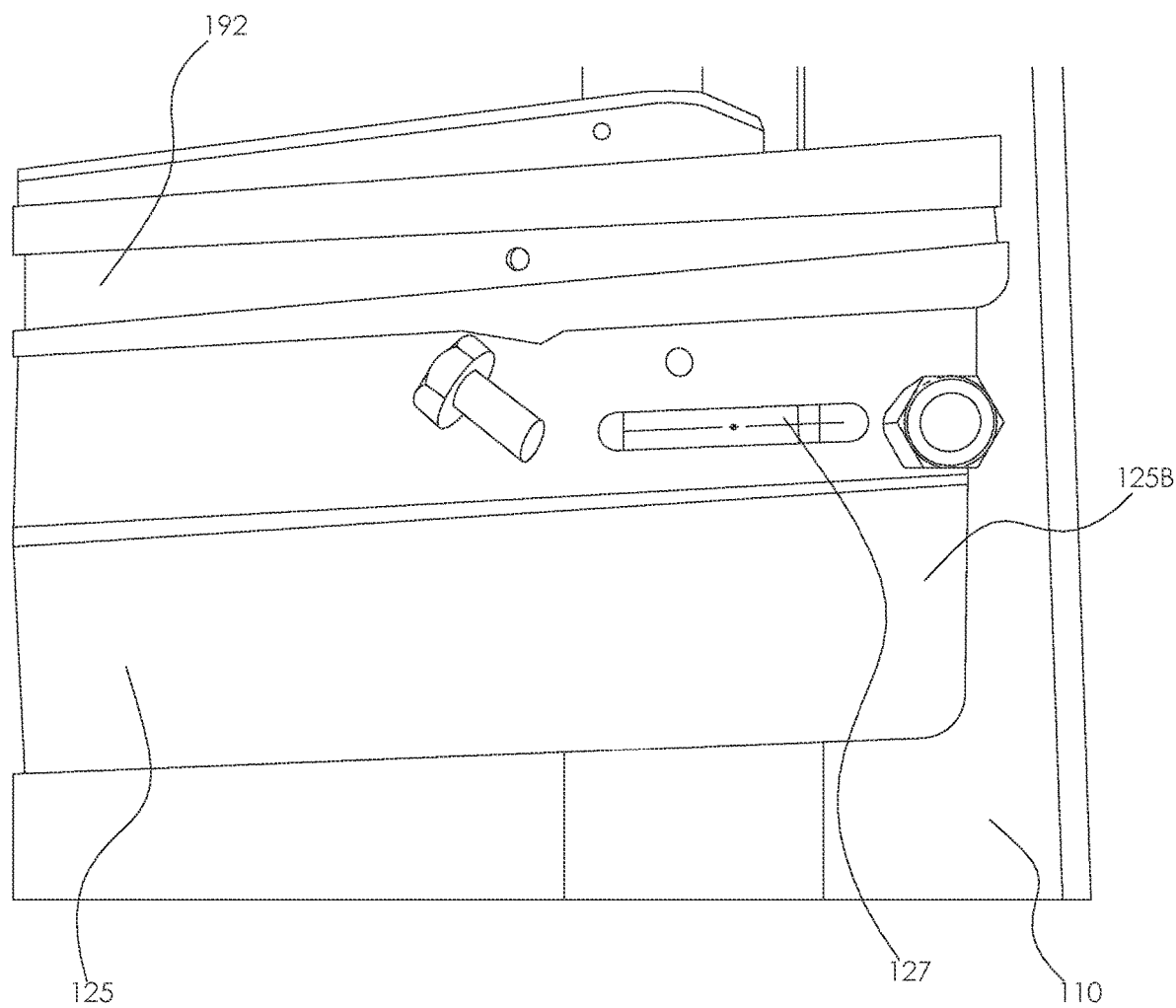
Figure 59:
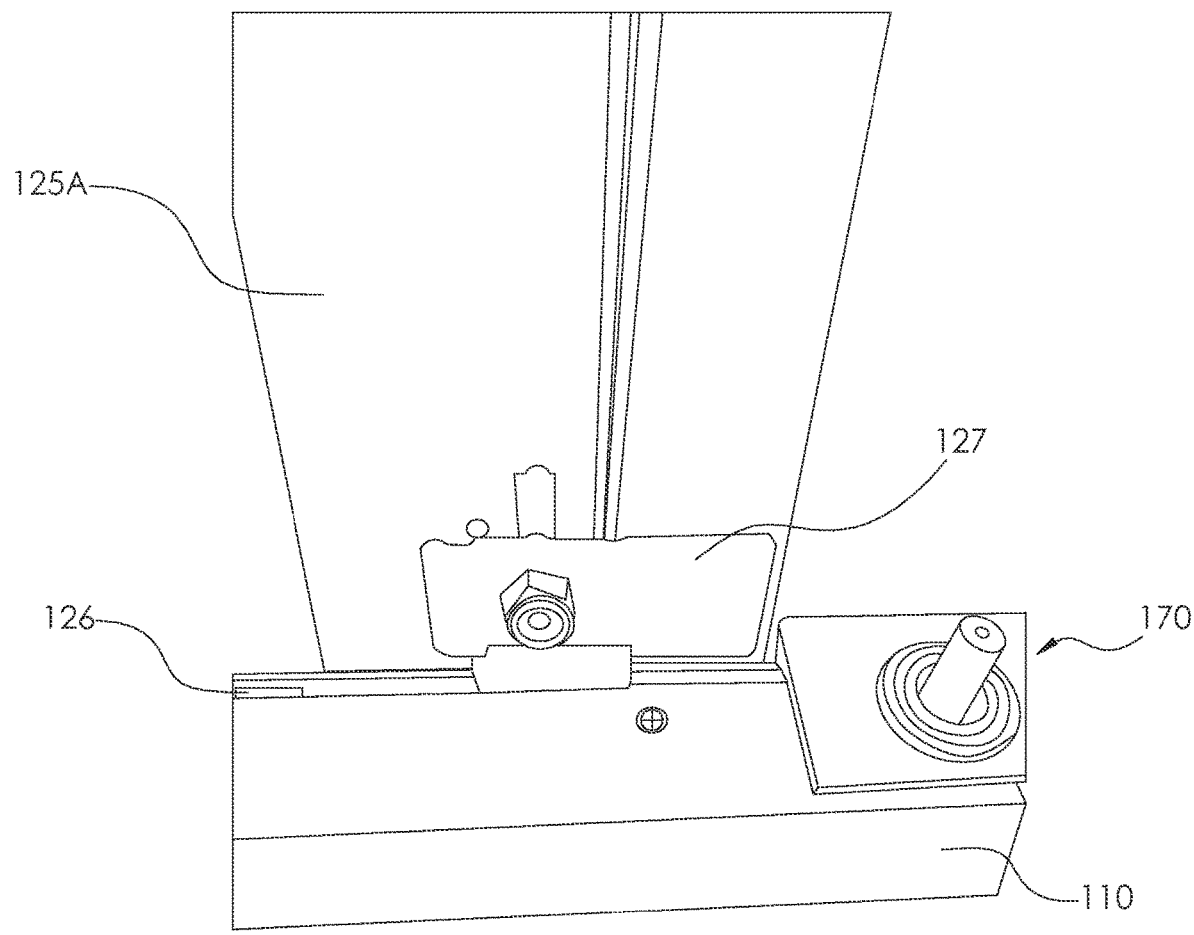
Figure 60:
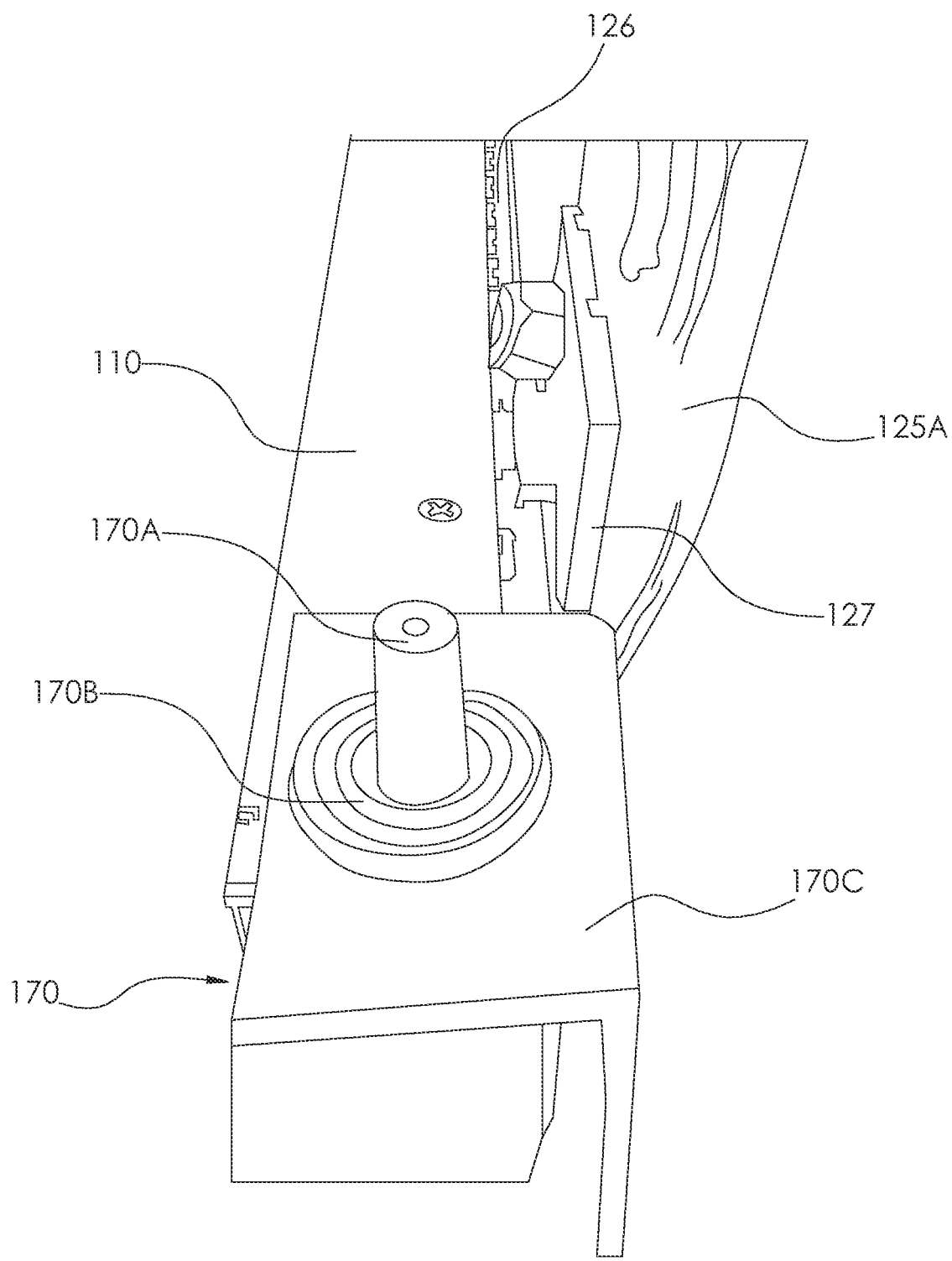
Figure 61:
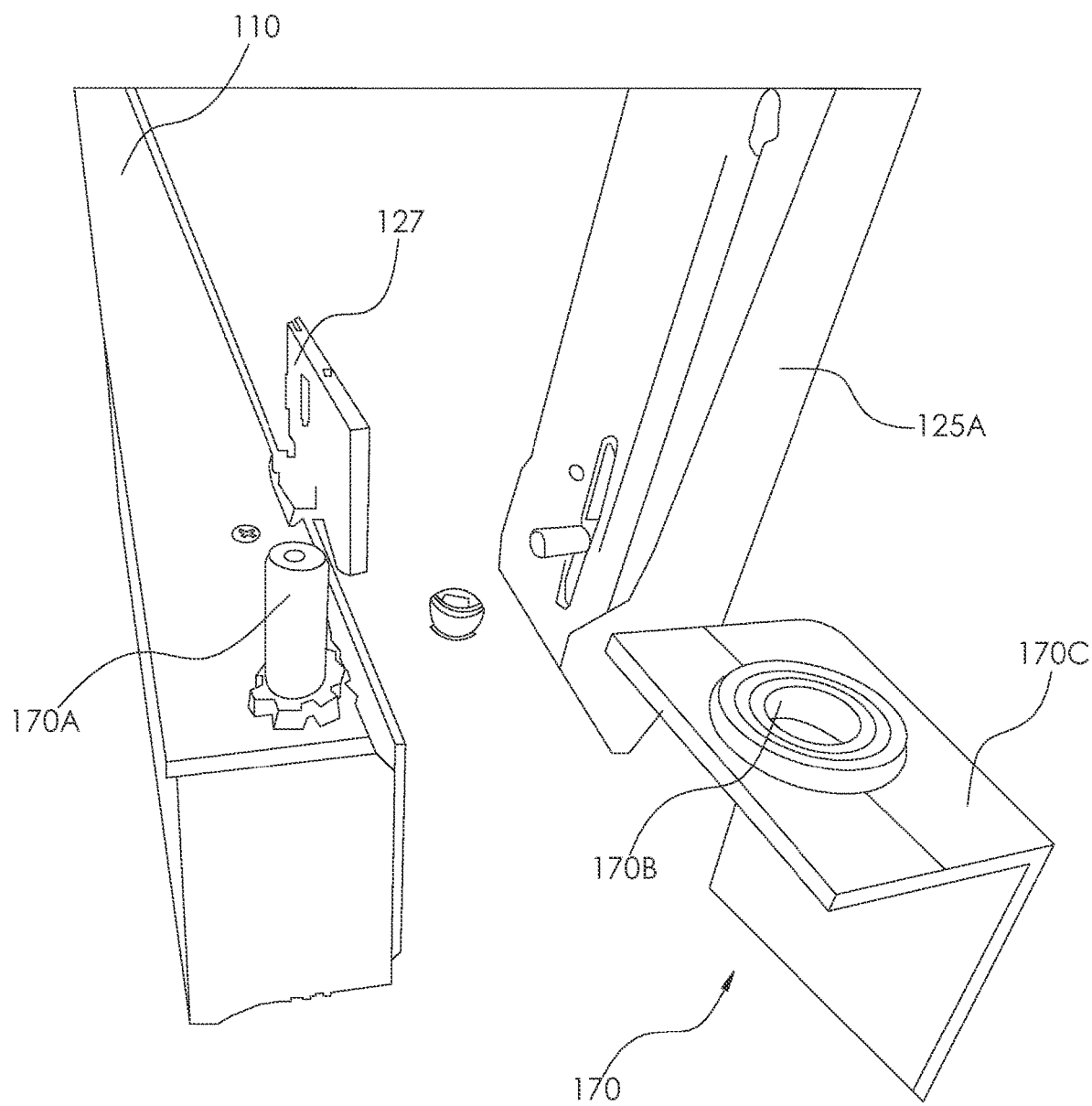
Figure 62:
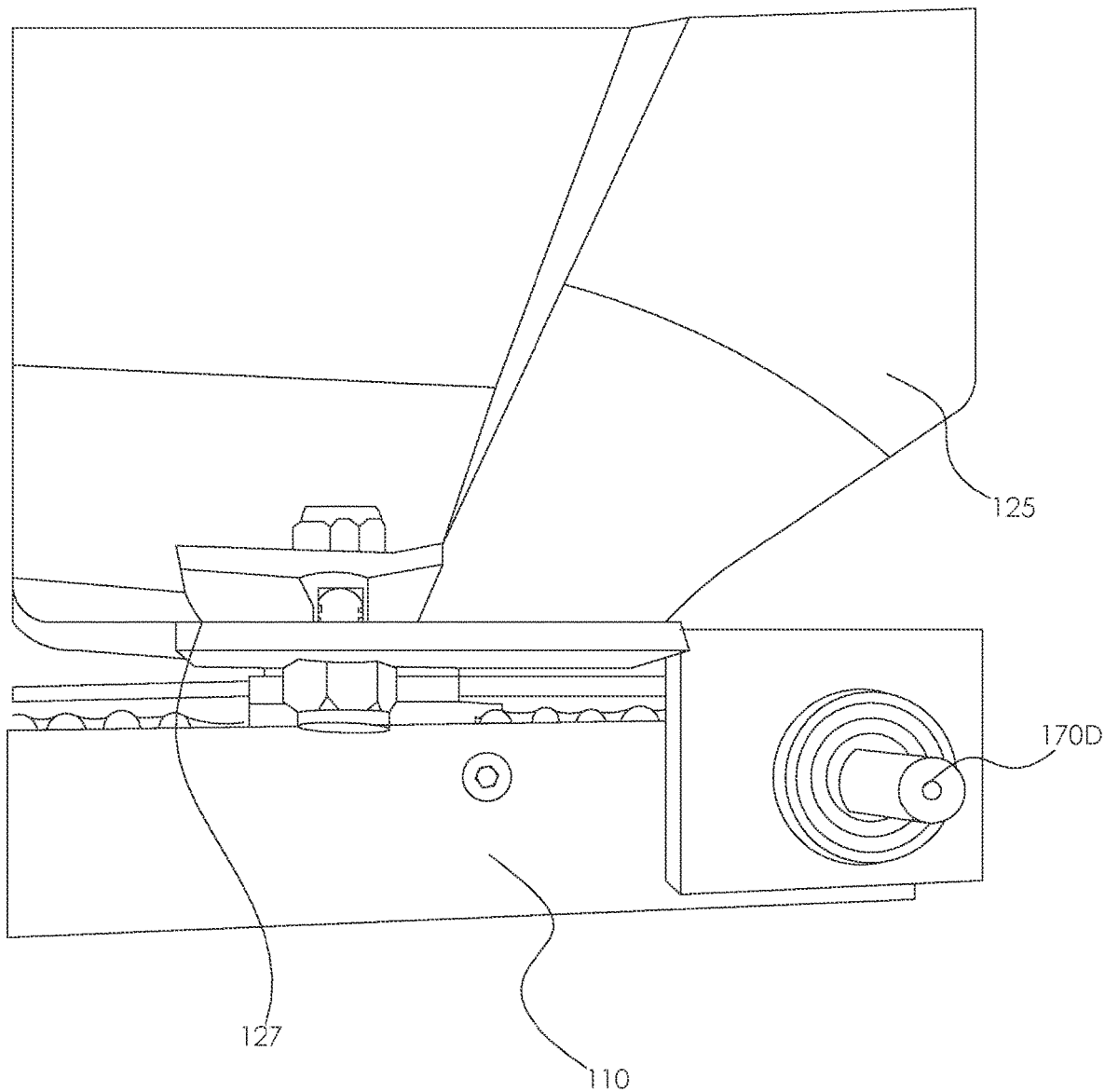

FIG. 32*a* is another perspective view of the drive chain and associated bracket dynamically seated within a groove of a guide rail and held in place via a face plate;

FIG. 33 is a perspective view of one guide rail for use at one side of the vehicle;

FIG. 33*a* is a perspective of another guide rail for use at an opposite side of the vehicle;

FIG. 34 is a perspective view of a coupling attached to an end of a guide rail for being operably mated to the timing rod;

FIG. 35 is another perspective view of the coupling and guide rail shown in FIG. 34;

FIG. 36 is an enlarged perspective view of the flexible cord attached to a longitudinal side of the fabric body;

FIG. 36*a* is an enlarged perspective view of a bracket attached to an associated drive chain and for being affixed to the header;

FIG. 37 is another perspective view of the bracket shown in FIG. 36*a*;

FIG. 38 is an enlarged perspective view of the coupling disengaged from a D-shaped socket at one of the guide rails;

FIG. 39 is an enlarged perspective view of the coupling engaged with the D-shaped socket at one of the guide rails shown in FIG. 38;

FIG. 40 is another perspective view of the header and guide rail configuration as well as the slidable and frictional arrangement of the locking brackets at the header and vehicle;

FIG. 41 is a top plan view of the drive chain, toothed gear, coupling and tension adjusting mechanism disengaged from each other;

FIG. 41*a* is a top plan view of a motor, sprocket and associated D-shaped socket for receiving the coupling shown in FIG. 41;

FIG. 41*b* is a bottom plan view of the motor, sprocket, tension adjusting mechanism, guide rail, and chain attached thereto;

FIG. 42 is an enlarged perspective view of the coupling, toothed gear, and a portion of a drive chain in disengaged from an associated guide rail;

FIG. 42*a* is an exploded view of the coupling, associated fasteners, and the portion of the drive chain shown in FIG. 42;

FIG. 43 is an exploded view of the power actuated JEEP WRANGLER® fabric top, in accordance with a non-limiting exemplary embodiment of the present disclosure;

FIG. 44 is a perspective view of the fabric top employing a plurality of ribs connected to fabric body and laterally spanning across an entire width of thereof, in accordance with a non-limiting exemplary embodiment of the present disclosure;

FIG. 45 is a perspective view showing a plurality of the ribs in FIG. 44, which are juxtaposed along a longitudinal length of the vehicle roof top;

FIG. 46 is an exploded view of an exemplary motor and the tension adjusting mechanism employing a bearing and a toothed gear;

FIG. 47 is another exploded view the exemplary motor and the tension adjusting mechanism employing a bearing and a toothed gear for rotating the drive chain in clockwise and counterclockwise direction when opening/closing the fabric body;

FIG. 48 is a rear elevational view of a long fabric top with an arced rib, wherein the long fabric top extends downwardly along a side of the vehicle, in accordance with a non-limiting exemplary embodiment of the present disclosure;

FIG. 49 is a perspective view showing the fabric body fully retracted to an open position and stored at a corrugated arrangement at the trunk/tailgate area of the vehicle;

FIG. 50 is a perspective view showing the fabric body separated into at least two sections wherein a roof section is maintained at a fully extracted/closed position while side window sections and the rear window section are displaced to a fully retracted/open position, in accordance with a non-limiting exemplary embodiment of the present disclosure;

FIG. 51 is a perspective view showing the fabric body separated into at least two sections wherein the roof section is maintained at the fully extracted/closed position while side window sections and the rear window section are displaced to a partially retracted/open position;

FIG. 52 is a perspective view showing the fabric body separated into at least two sections wherein the roof section and the rear window section are both maintained at the fully extracted/closed position while side window sections are displaced to the partially retracted/open position;

FIG. 53 is a perspective view showing the header and one of the reinforcement ribs are contiguously displaced rearwardly along the vehicle roof;

FIG. 54 is a perspective view showing the header and one of the reinforcement ribs are contiguously displaced forwardly to a fully extracted/closed position along the vehicle roof;

FIG. 55 is a perspective view showing the header disconnected from the brackets attached to the drive chain of each guide rail;

FIG. 56 is an enlarged rear elevational view showing a fastener employed to connect the header to one of the brackets shown in FIG. 55;

FIG. 57 is an enlarged perspective view showing one of the brackets connected to a drive chain at one of the guide rails;

FIG. 58 is a top plan view showing a reinforcement rib attached to the header wherein the fastener is removed from the header and associated bracket therebeneath;

FIG. 59 is a perspective view showing the connectivity between one lateral end of the header and the bracket associated attached to the associated drive chain and associated guide rail;

FIG. 60 is a perspective view showing an anterior end of one guide rail having a bracket provided with a bearing and a coupling for receiving the timing rod;

FIG. 61 is an exploded view of the timing rod bracket, bearing, and coupling shown in FIG. 60; and FIG. 62 is a side elevational view showing how the header attaches to a corresponding bracket connected to the drive chain rotatably seated in one of the guide rails.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means ±15% of the numerical.

If used herein, "substantially" means largely if not wholly that which is specified but so close that the difference is insignificant.

Figure 1:
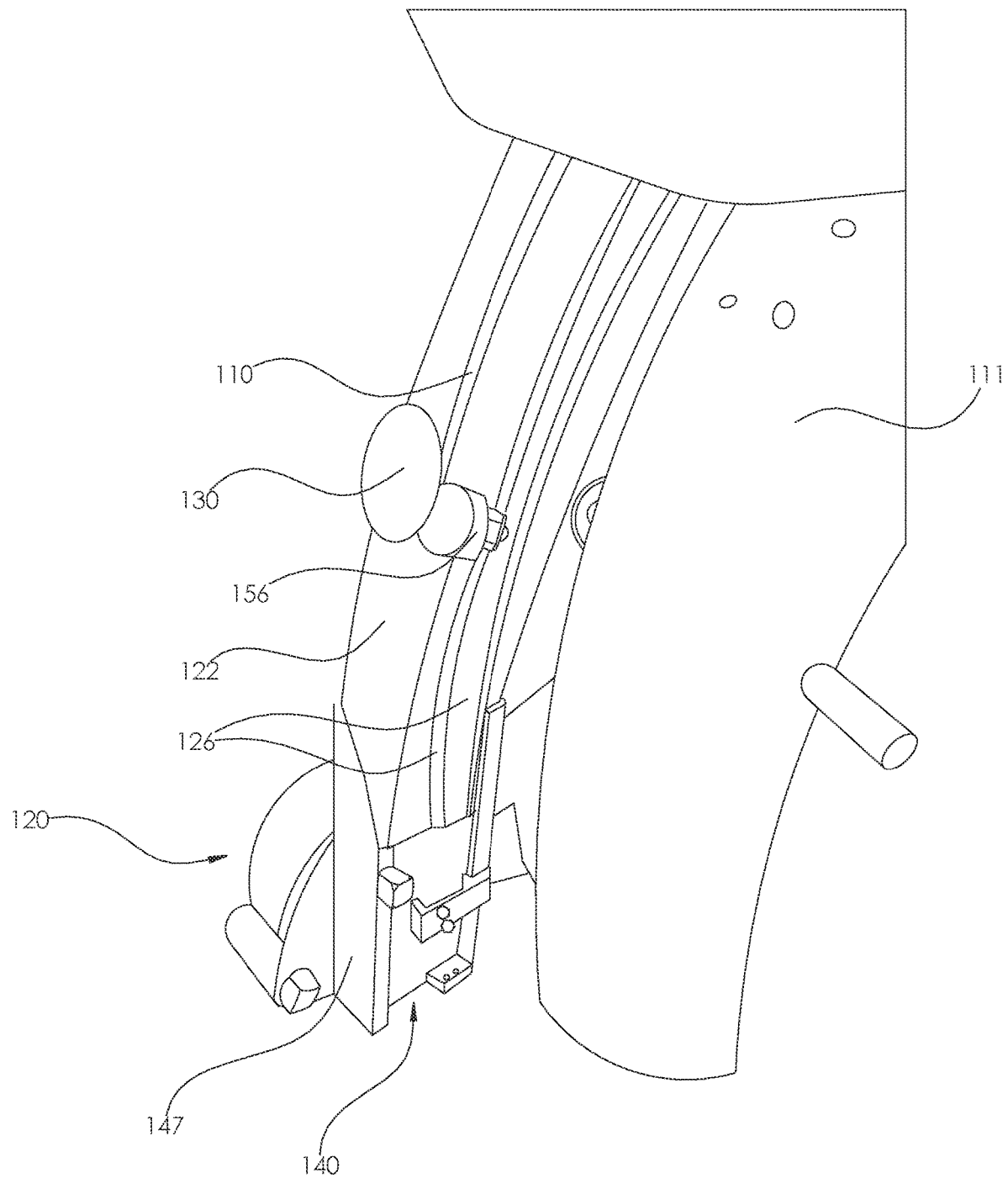
FIG. 1 is a perspective view of a guide rail, bearings, and power-actuated displacement mechanism attached to a rear portion of the existing vehicle, in accordance with a non-limiting exemplary embodiment of the present disclosure.
Figure 2:
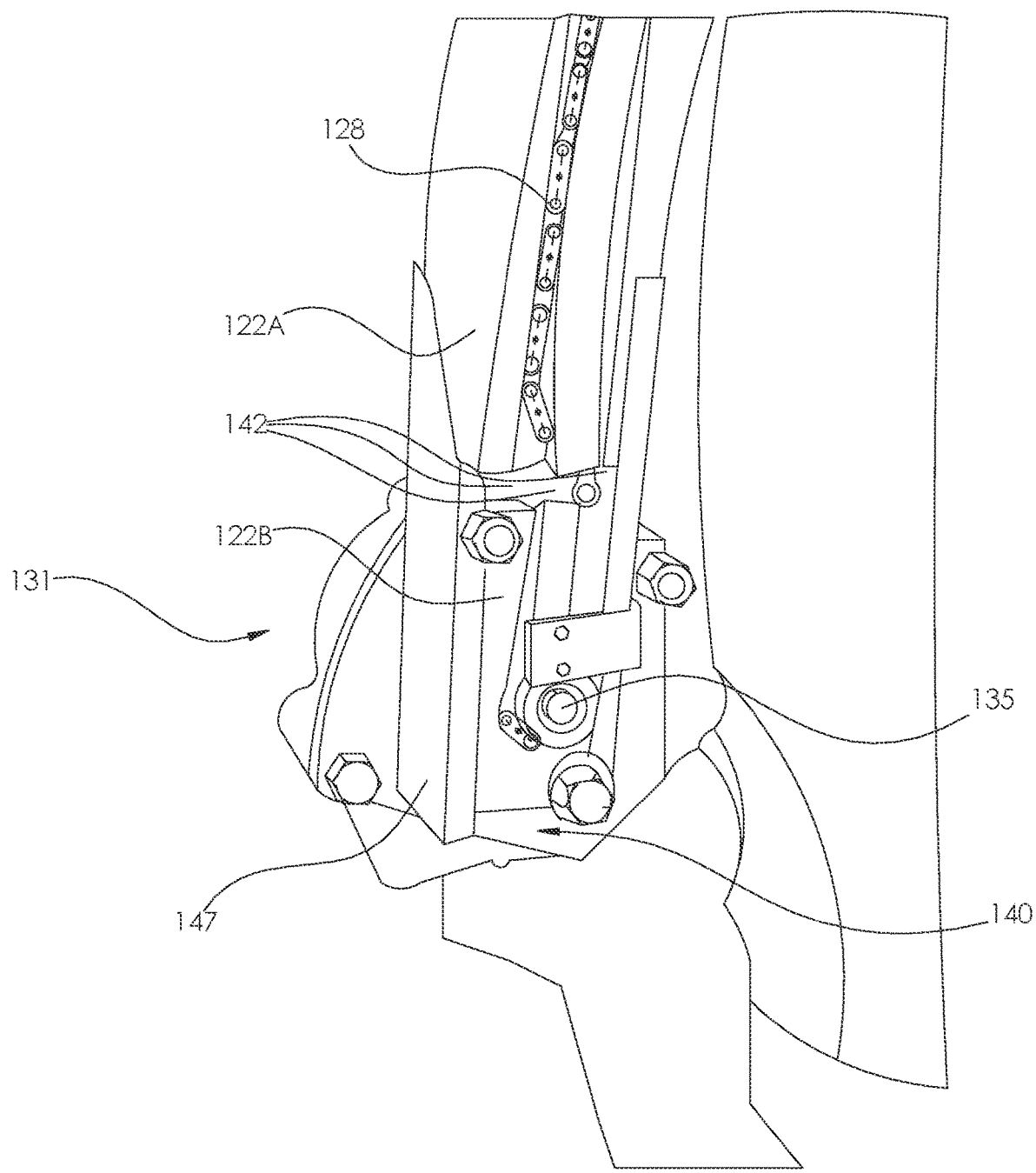
FIG. 2 is another perspective view of the guide rail, tension chain tension adjustment mechanism, and power-actuated displacement mechanism.
Figure 3:
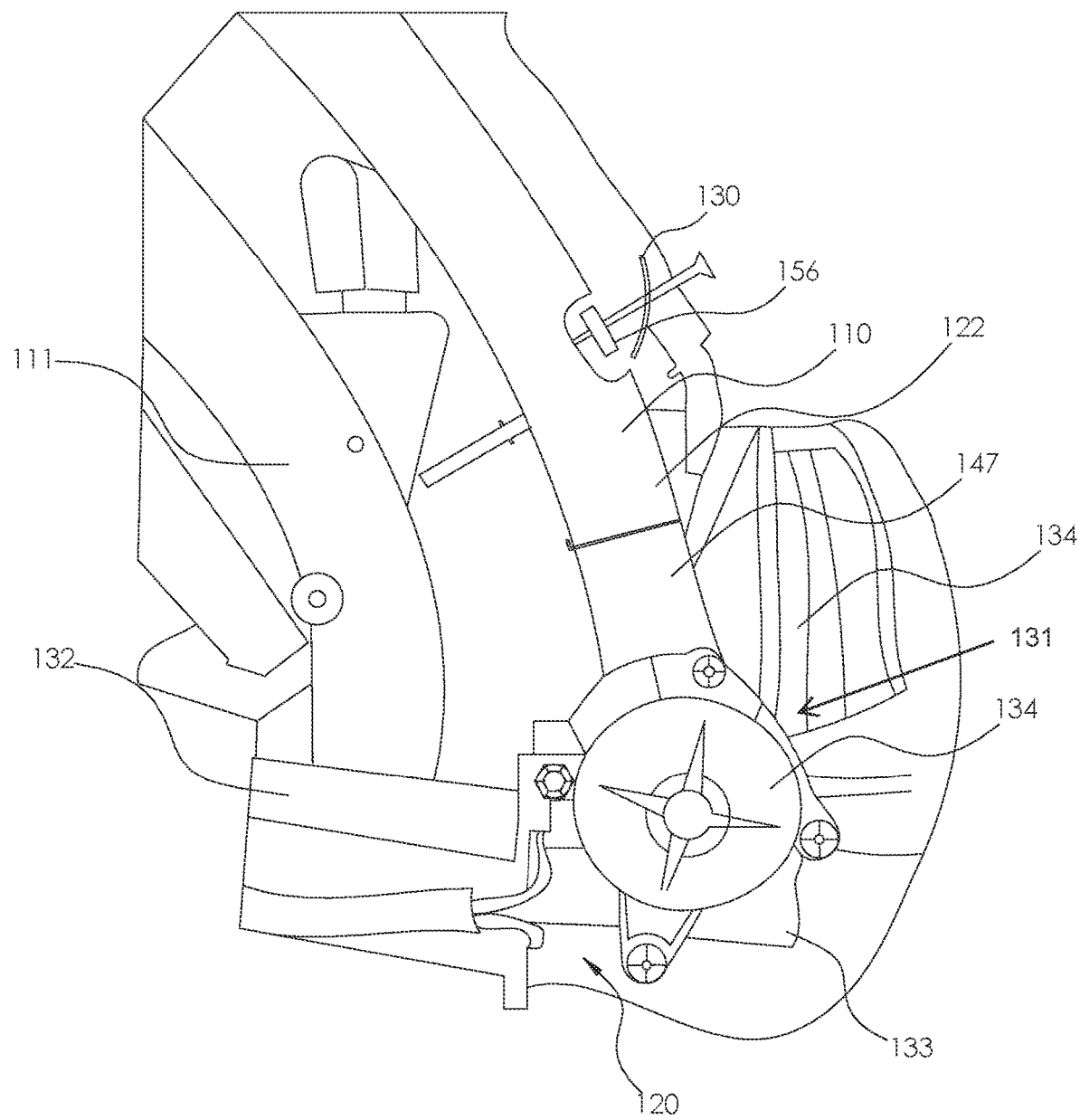
FIG. 3 is a side elevational view of the guide rail, bearings, and power-actuated displacement mechanism.
Figure 4:
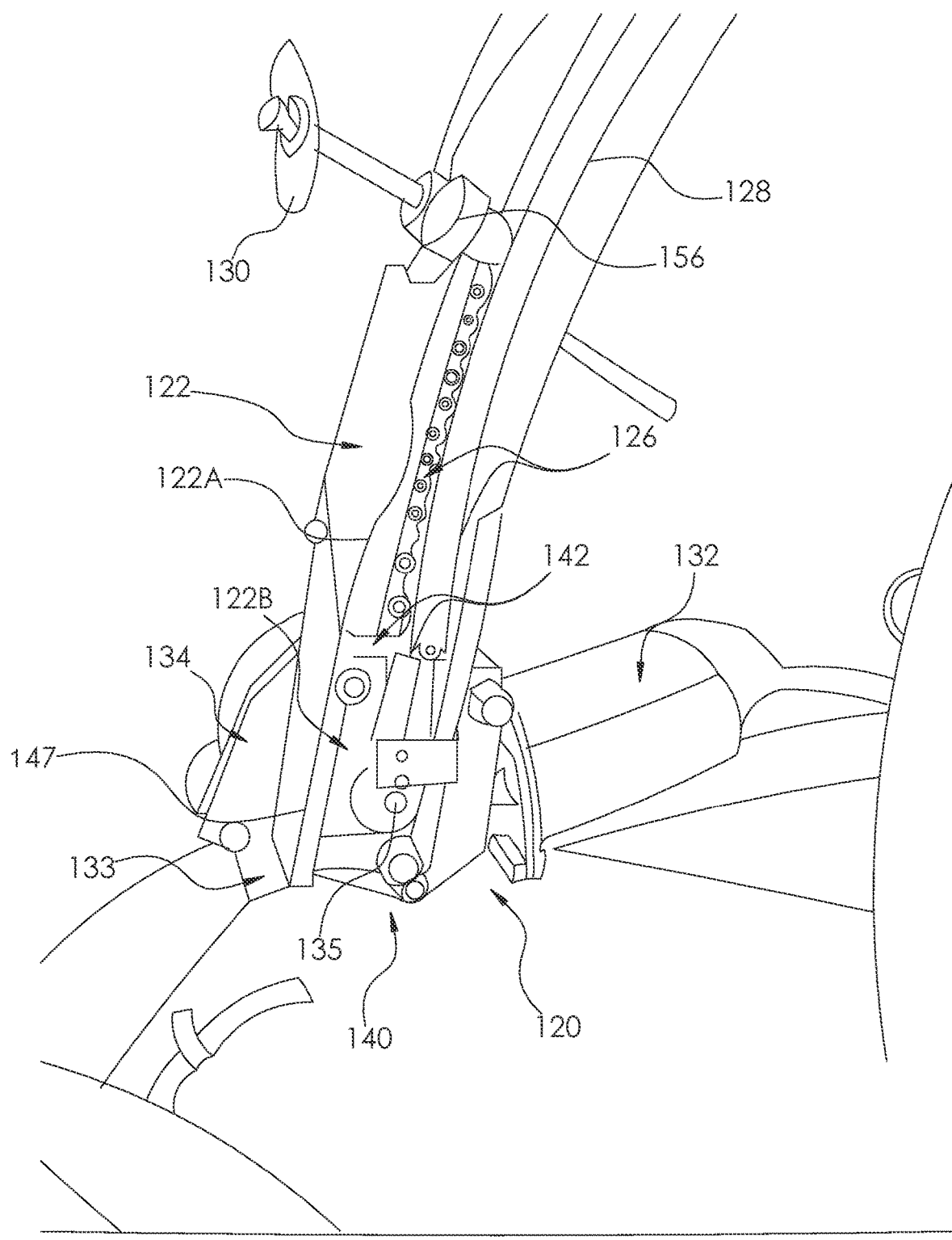
FIG. 4 is another perspective view of the guide rail, bearings, and power-actuated displacement mechanism.
Figure 5:
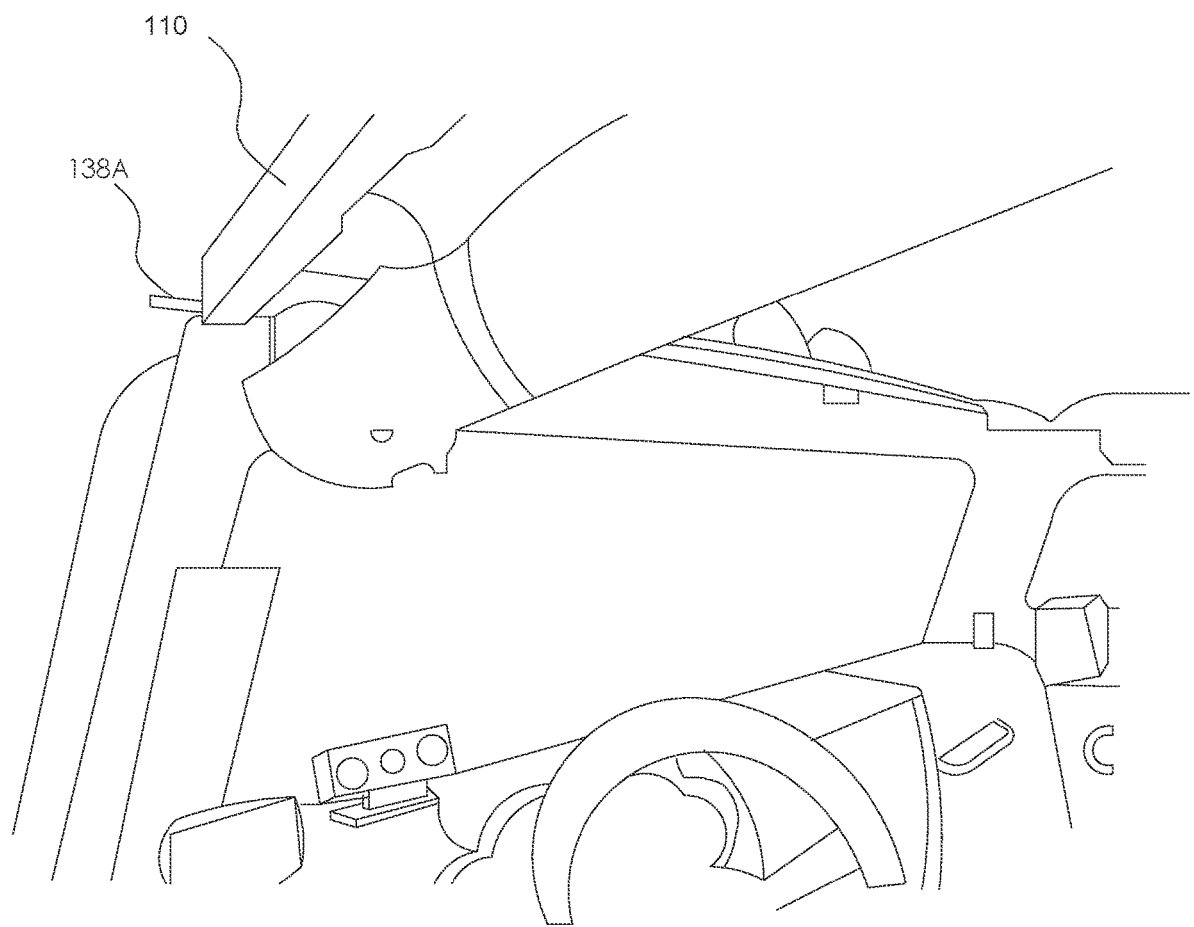
FIG. 5 is a perspective view of an end of the timing rod positioned along a width of vehicle roof portion.
Figure 6:
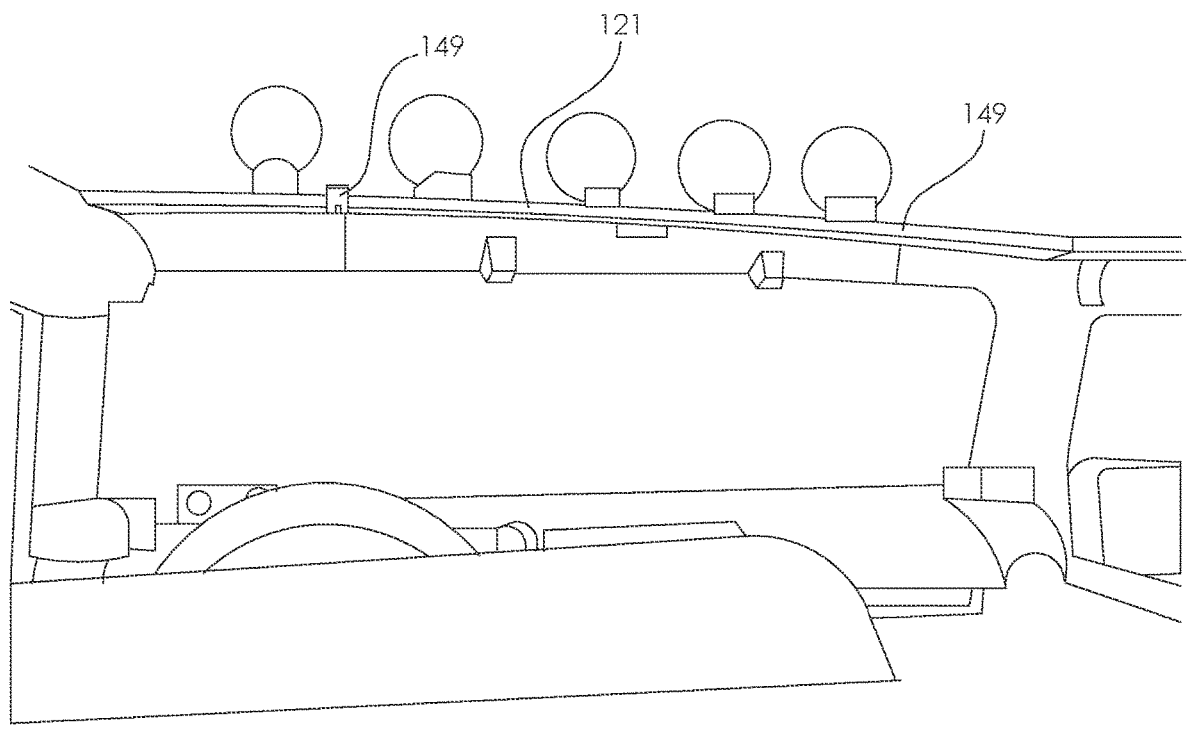
FIG. 6 is a perspective view of locking brackets attached to an anterior of the top roof portion of the vehicle.
Figure 7:
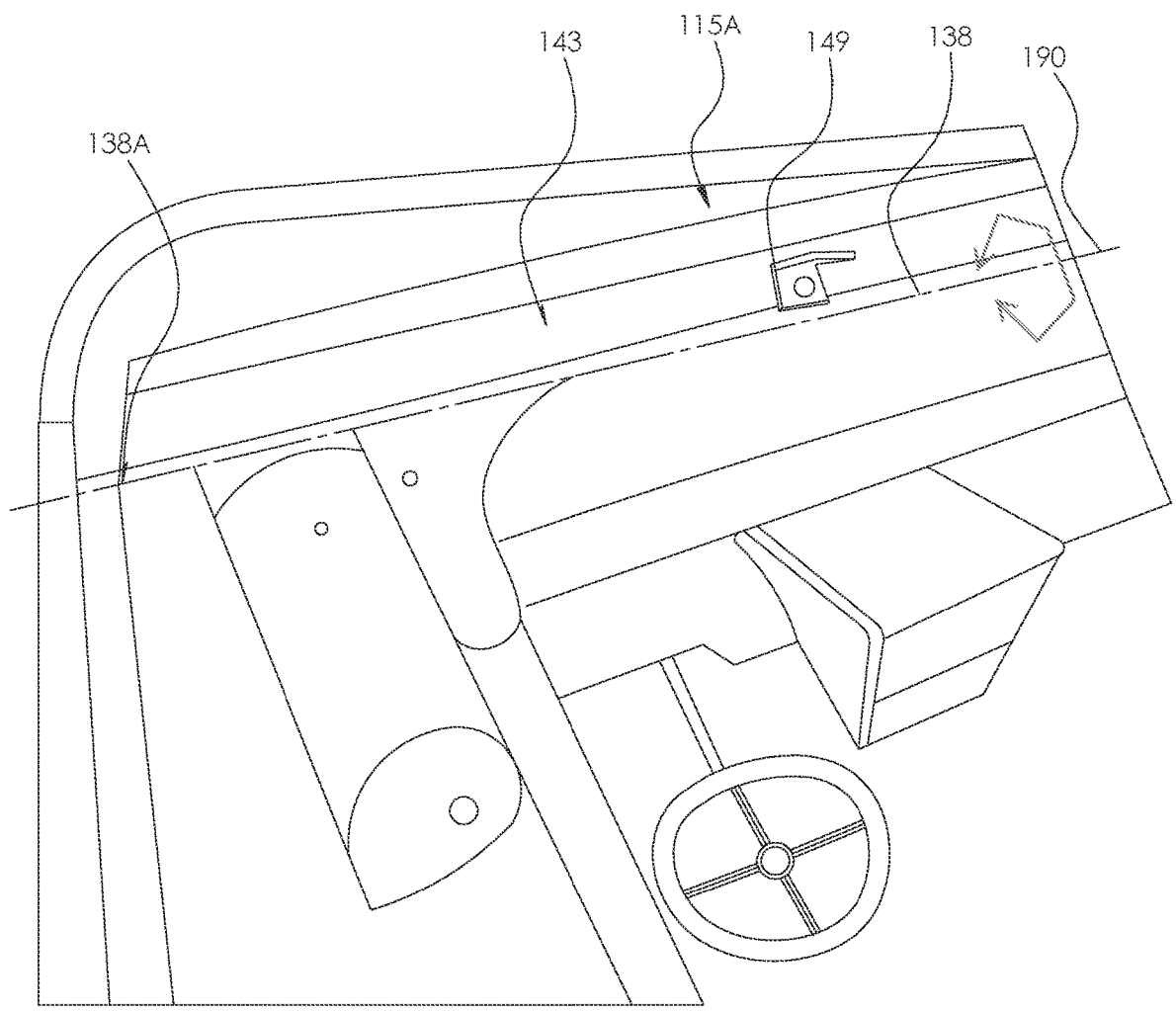
FIG. 7 is an enlarged perspective view of the timing rod hidden beneath an anterior of the vehicle roof top portion.
Figure 8:
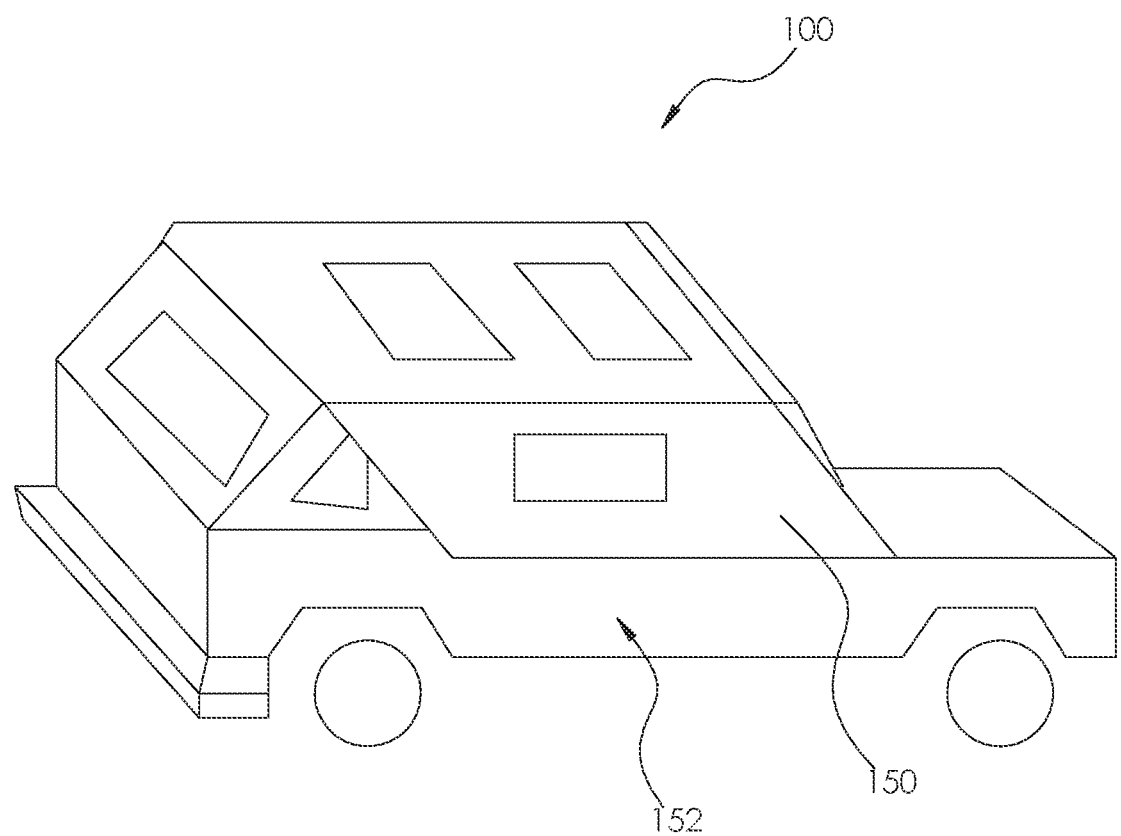
FIG. 8 is a perspective view of an awning deployed to an unwound position and disposed transversely to the vehicle roof top portion.
Figure 9:
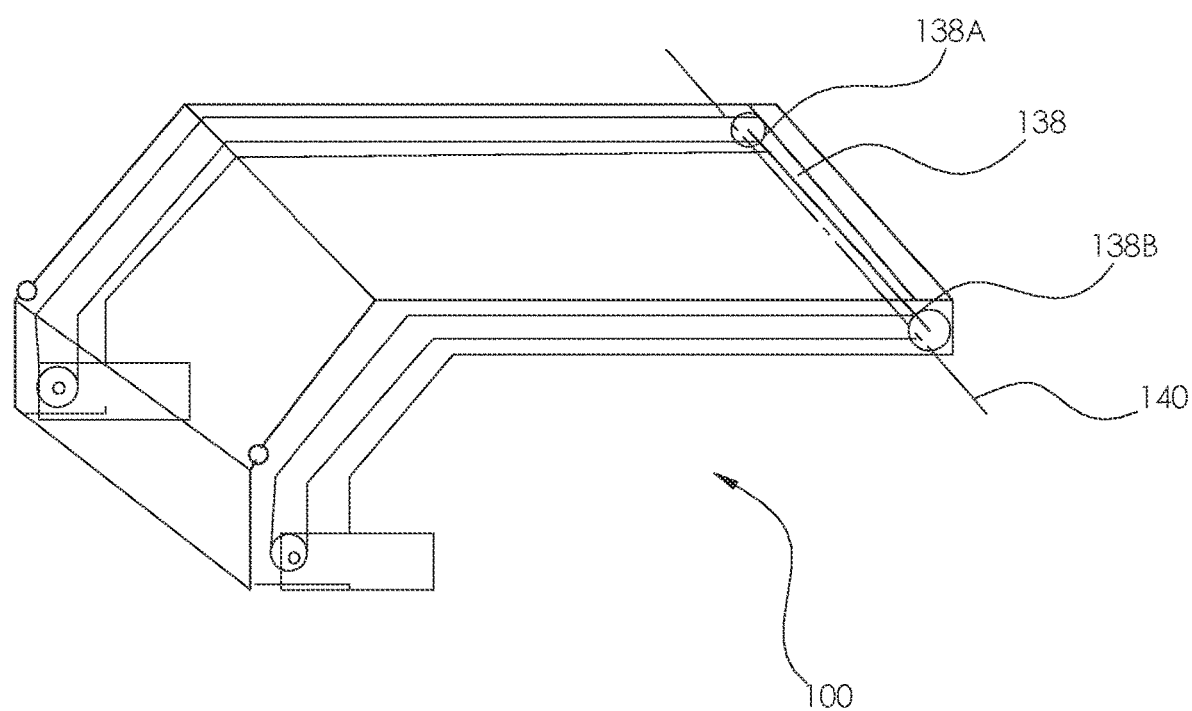
FIG. 9 is another perspective view showing the interrelationship between selected components of the power-actuated vehicle roof top.
Figure 10:
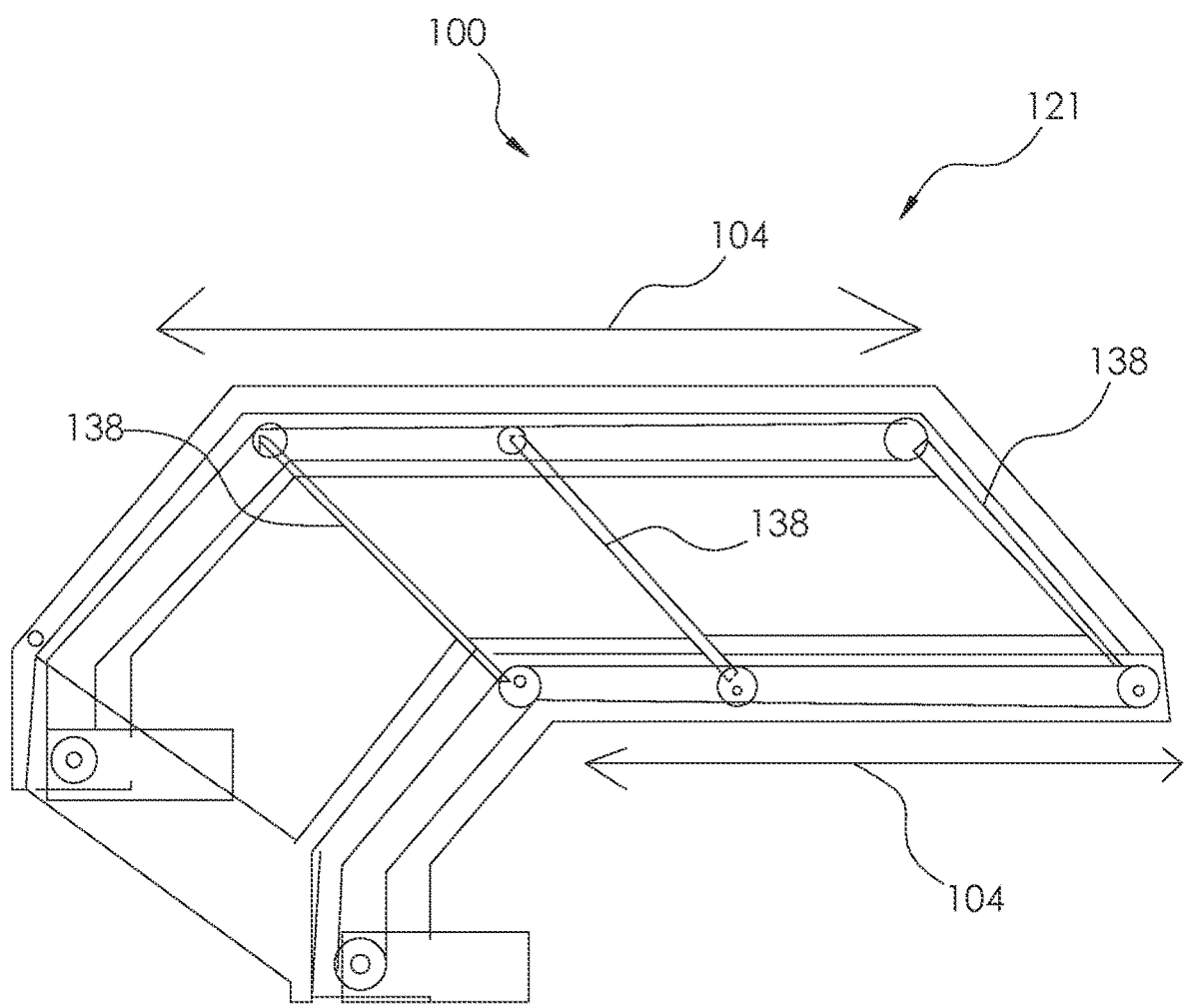
FIG. 10 is a perspective view showing alternate positions of the timing rod positioned along the vehicle roof top.
Figure 11:
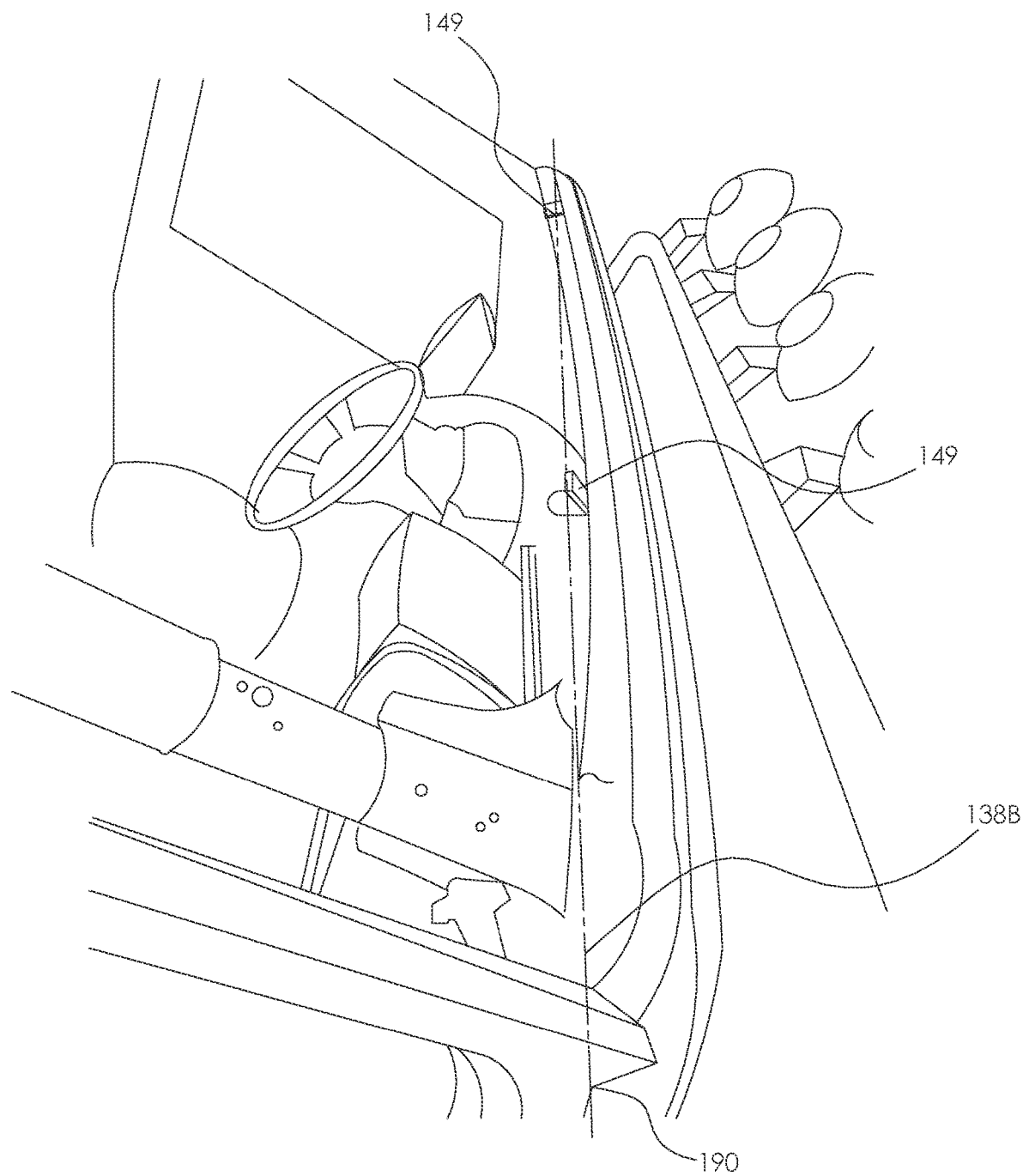
FIG. 11 is another perspective view of locking brackets attached to an anterior of the vehicle roof top, and also showing an end of the timing rod exposed adjacent to one of the guide rails.
Figure 12:
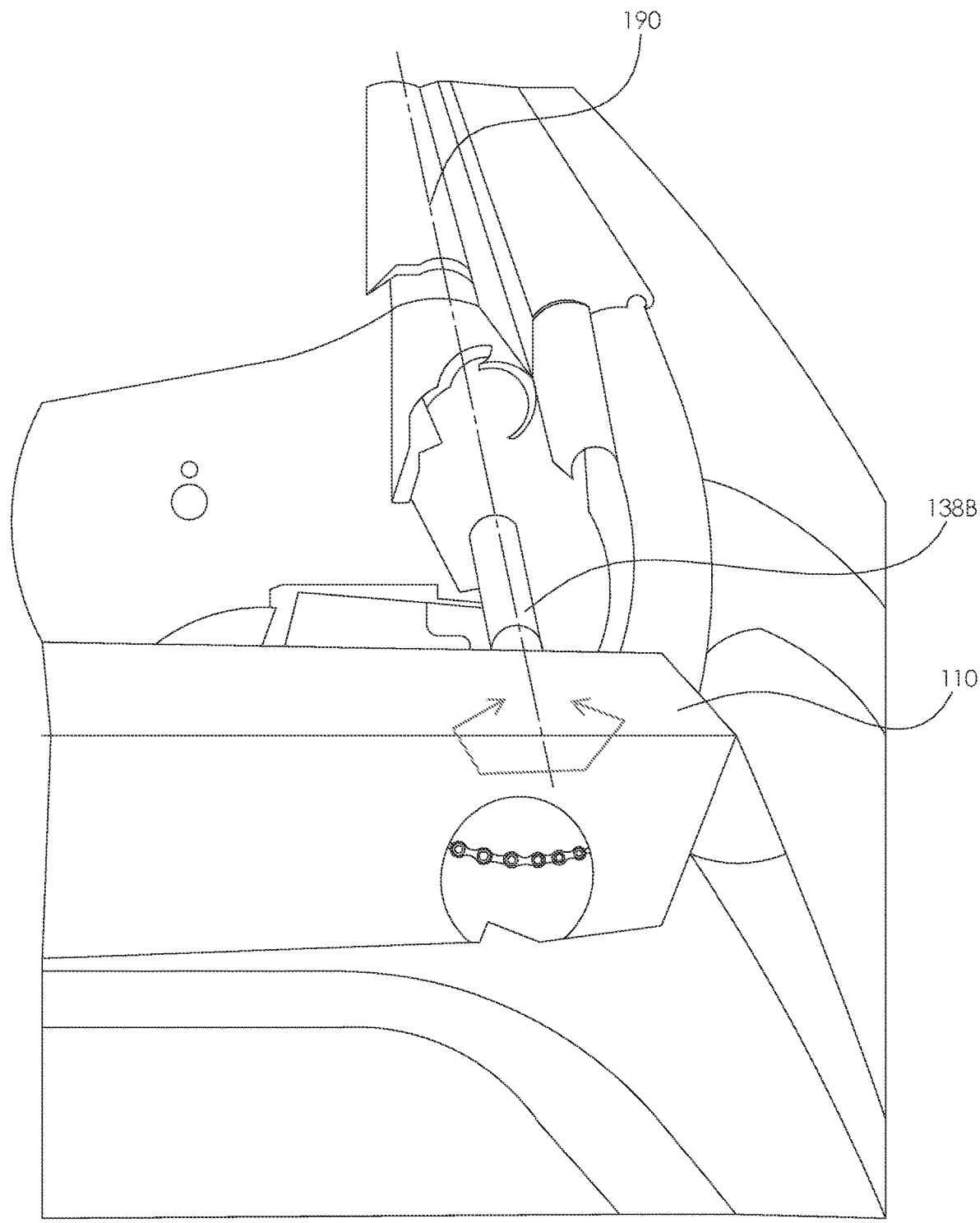
FIG. 12 is an enlarged perspective view of the timing rod end and guide rail shown in FIG. 11.
Figure 13:
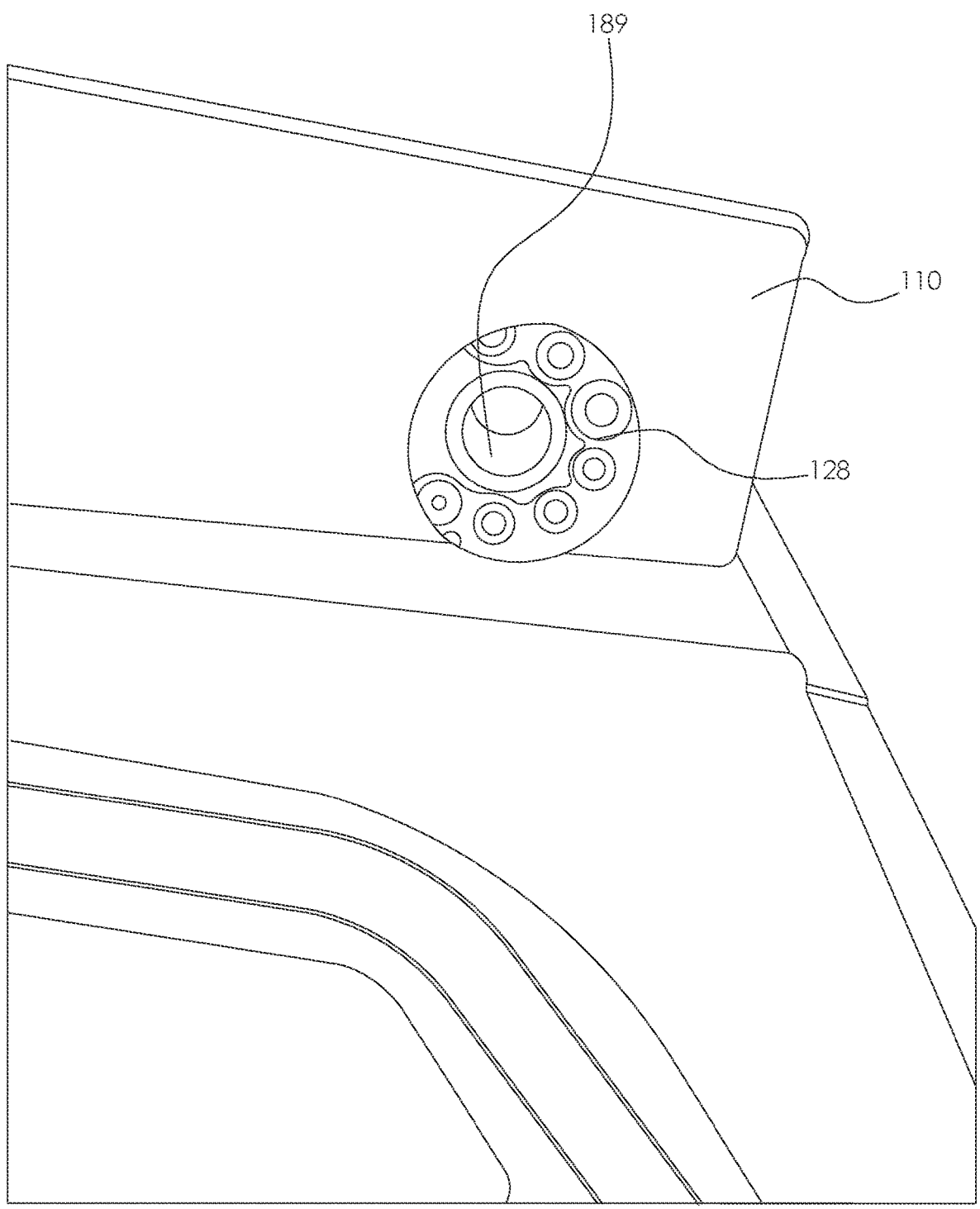
FIG. 13 is an enlarged perspective view of the guide rail containing a drive chain and aperture for rotatably mating the timing rod to the sprocket.
Figure 14:
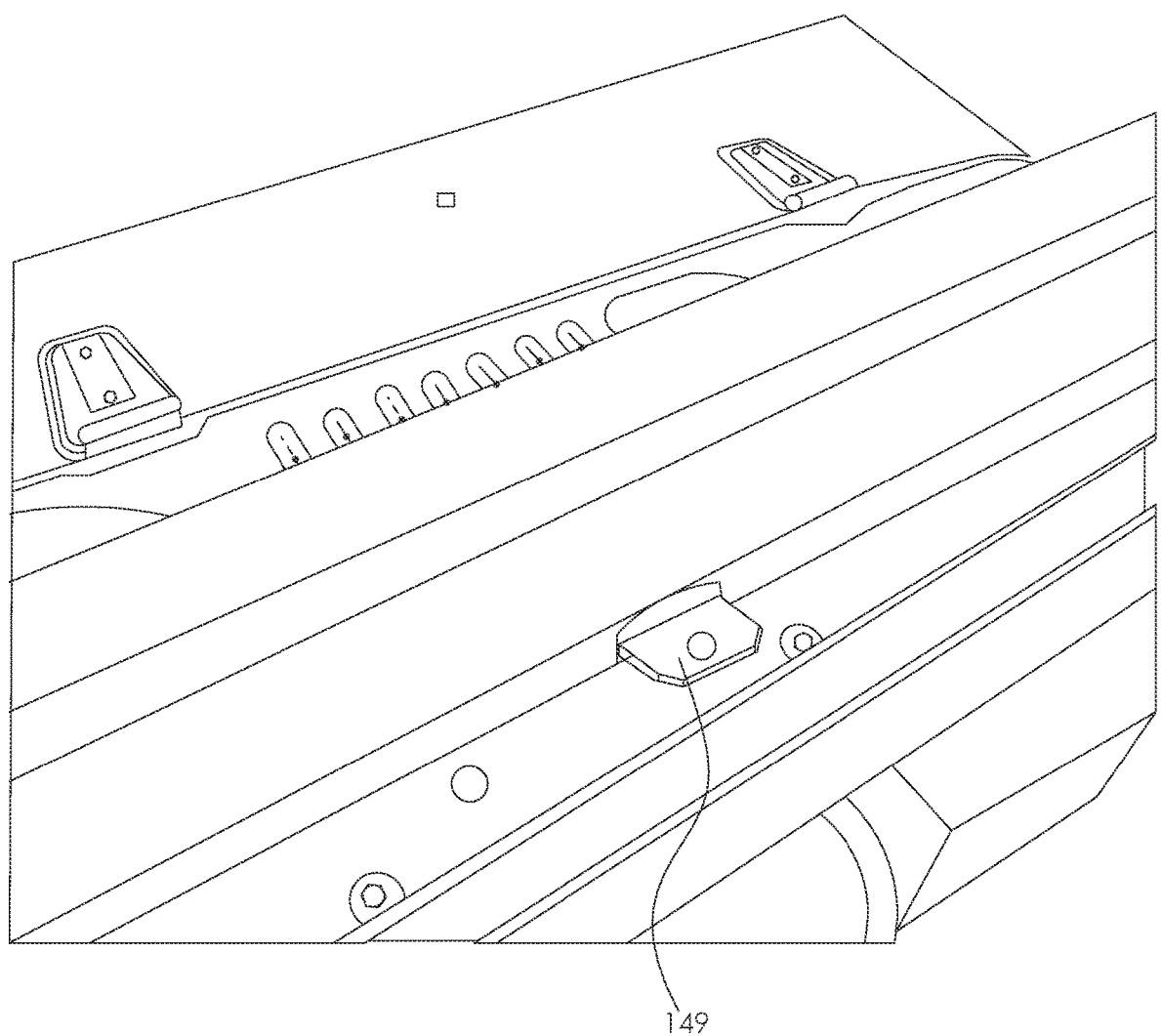
FIG. 14 is an enlarged perspective view of a locking bracket positioned at the anterior of the vehicle roof top.
Figure 15:
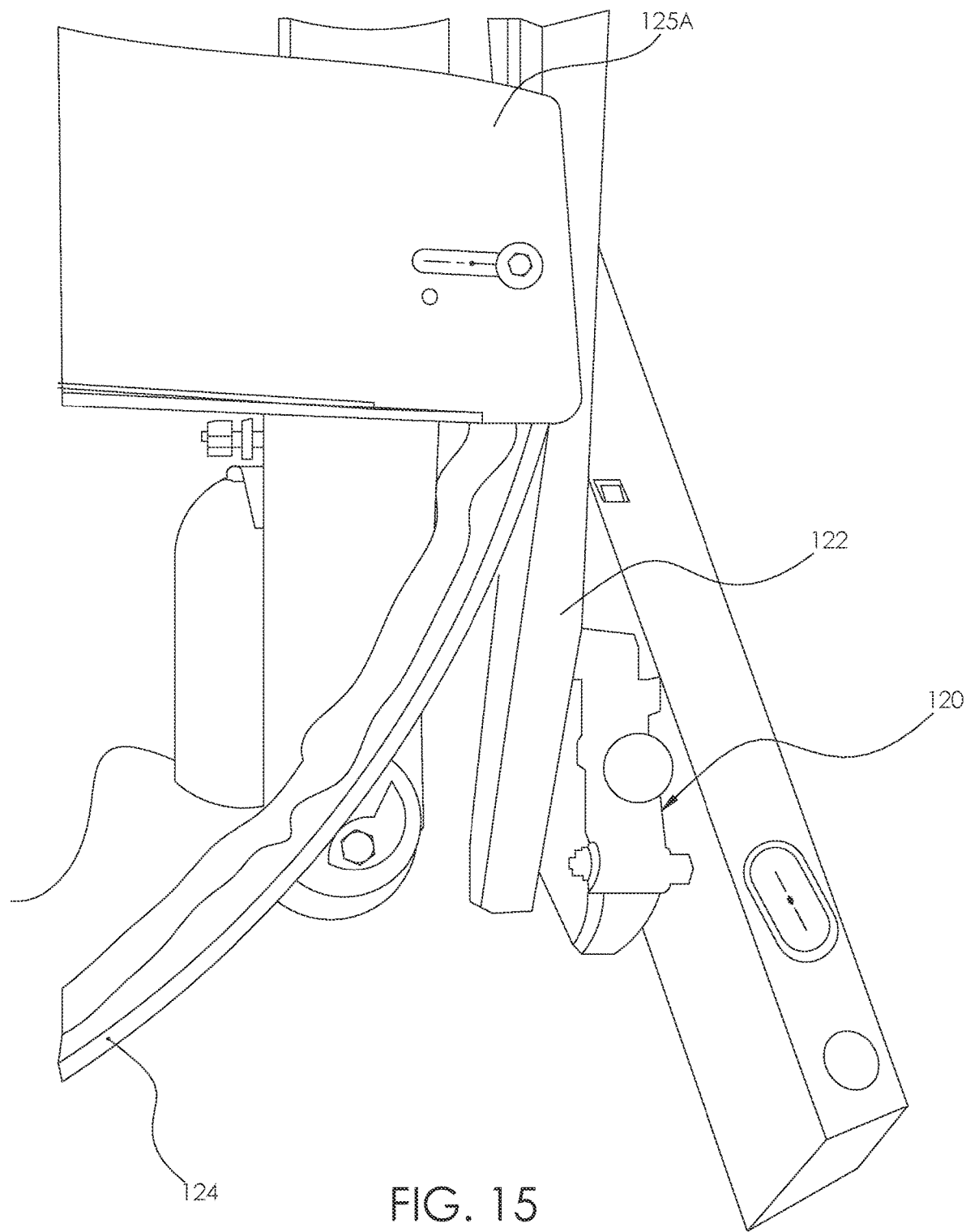
FIG. 15 is a perspective view of a posterior portion of a guide rail wherein the flexible cord ingresses/egresses the guide rail and wherein the header travels along the exterior of the guide rail.
Figure 16:
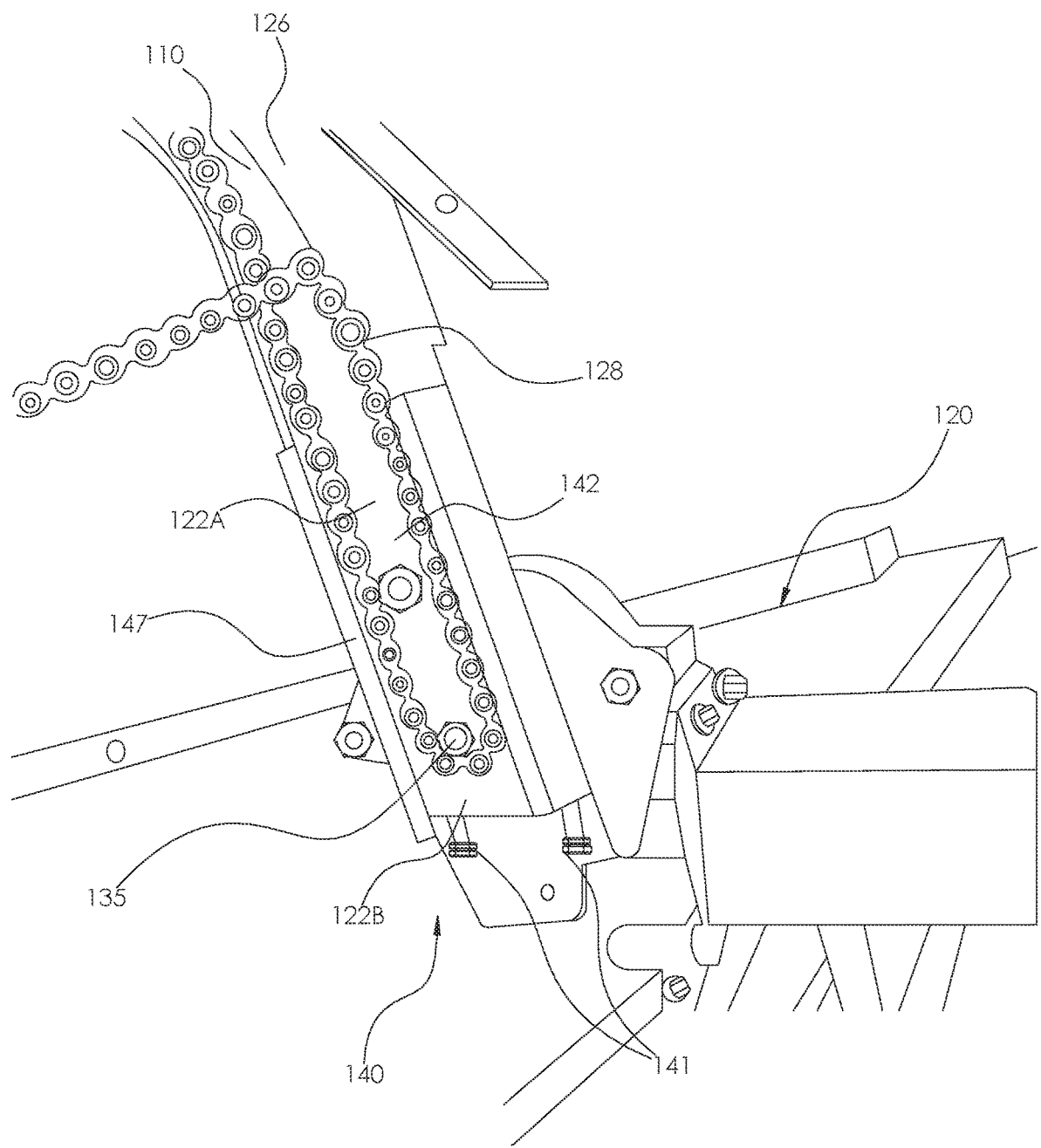
FIG. 16 is a perspective view of a posterior portion of a guide rails having a tension adjusting mechanism attached thereto for adjusting a tension of a drive chain.
Figure 17:
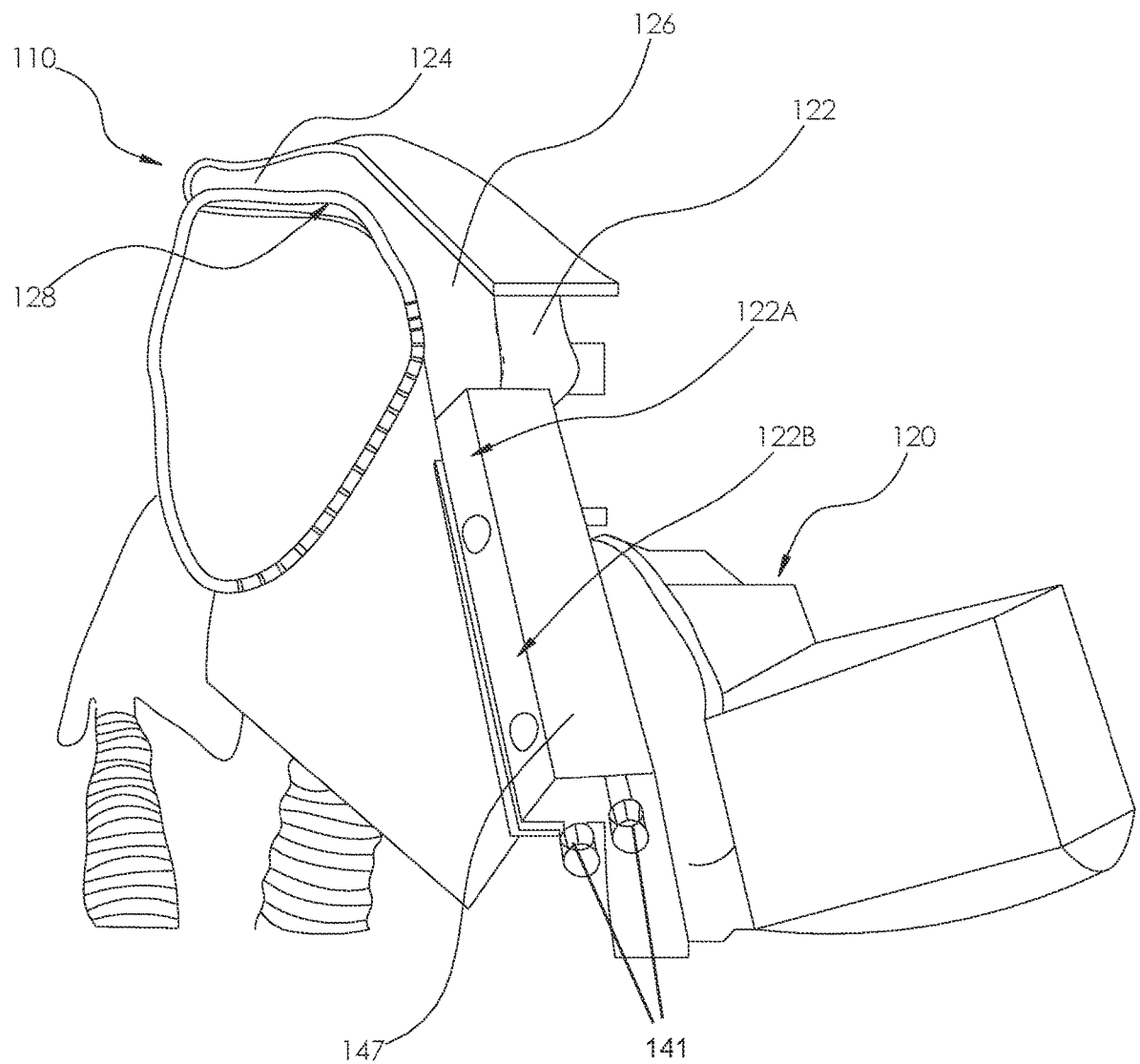
FIG. 17 is another perspective view of the guide rail, tension adjusting mechanism, and drive chain shown in FIG. 16.
Figure 17A:
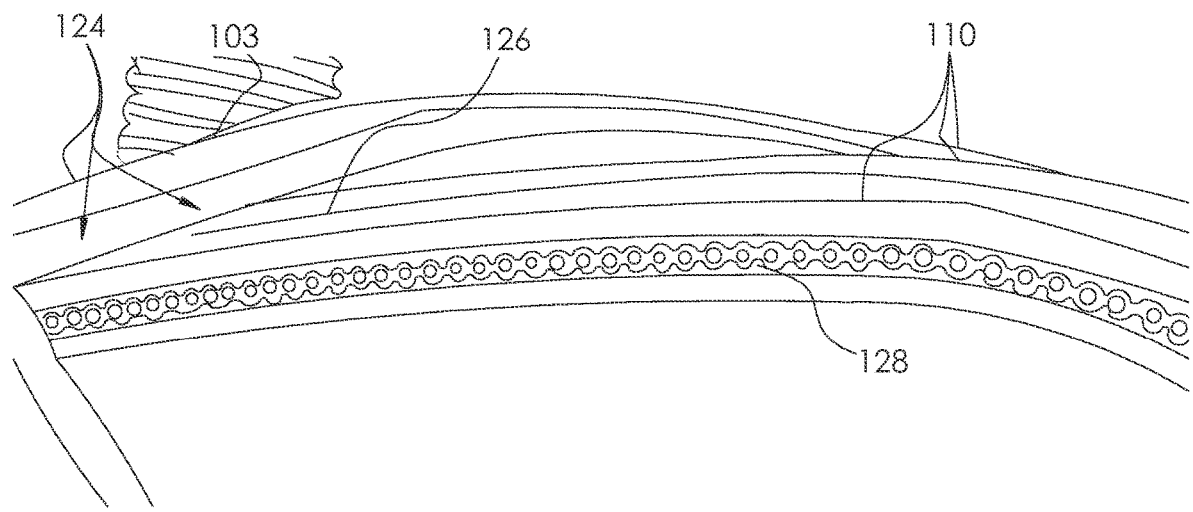
FIG. 17a is an enlarged side elevational view of the structural relationship between the drive chain, flexible cord attached to the fabric body and seated within a groove of the guide rail.
Figure 18:
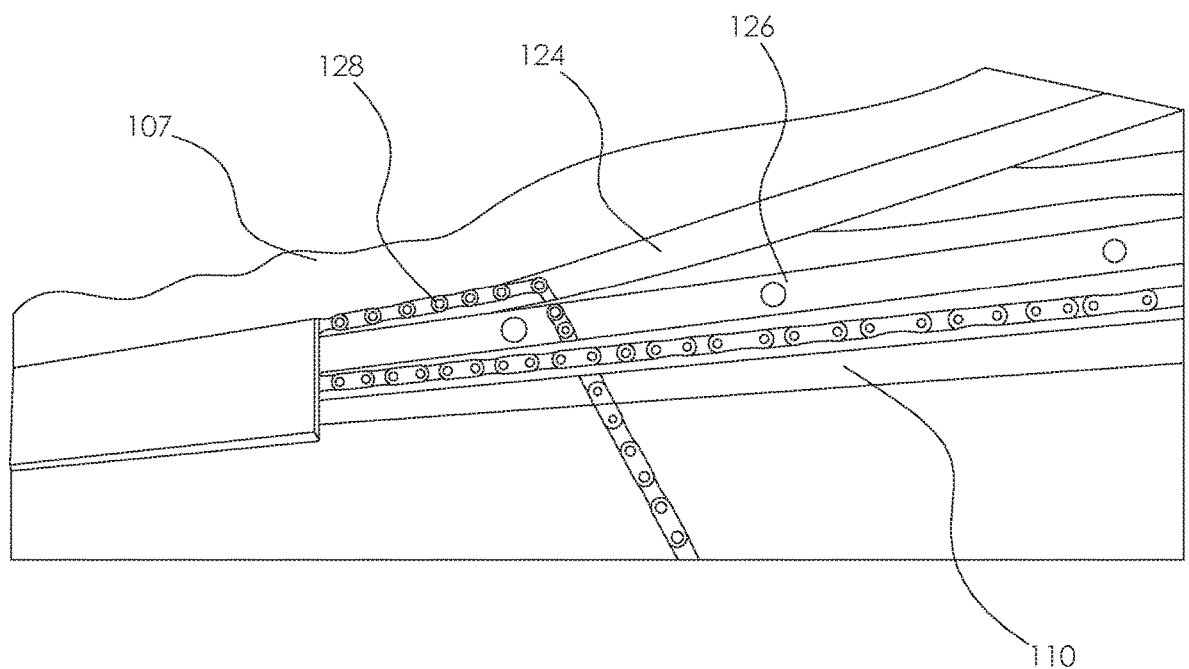
FIG. 18 is another perspective view of a drive chain and flexible cord maintained in the guide rail groove via a face plate affixed to the guide rail.
Figure 18A:
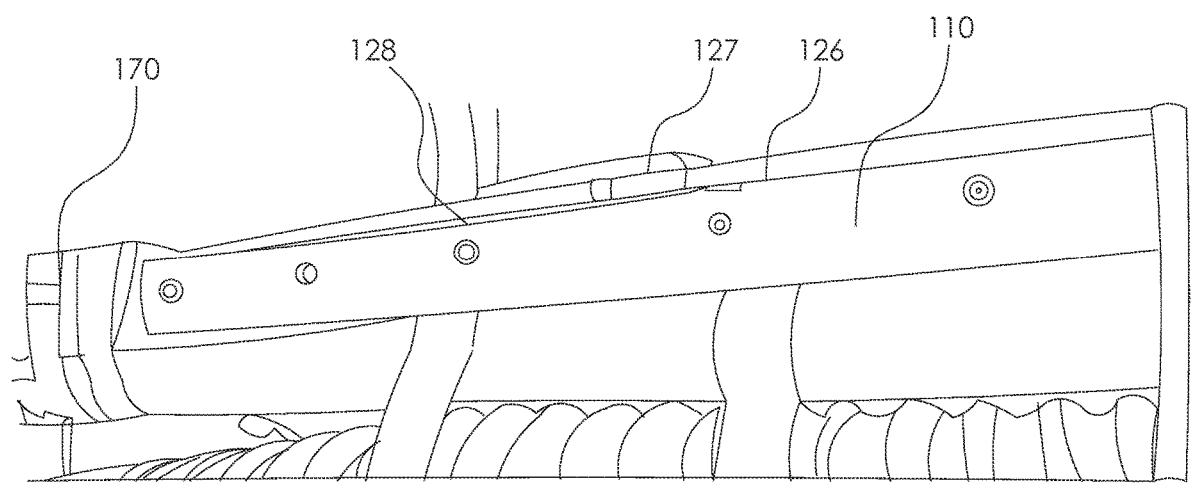
FIG. 18a is another perspective view of the face plate affixed to the guide rail shown in FIG. 18.
Figure 19:
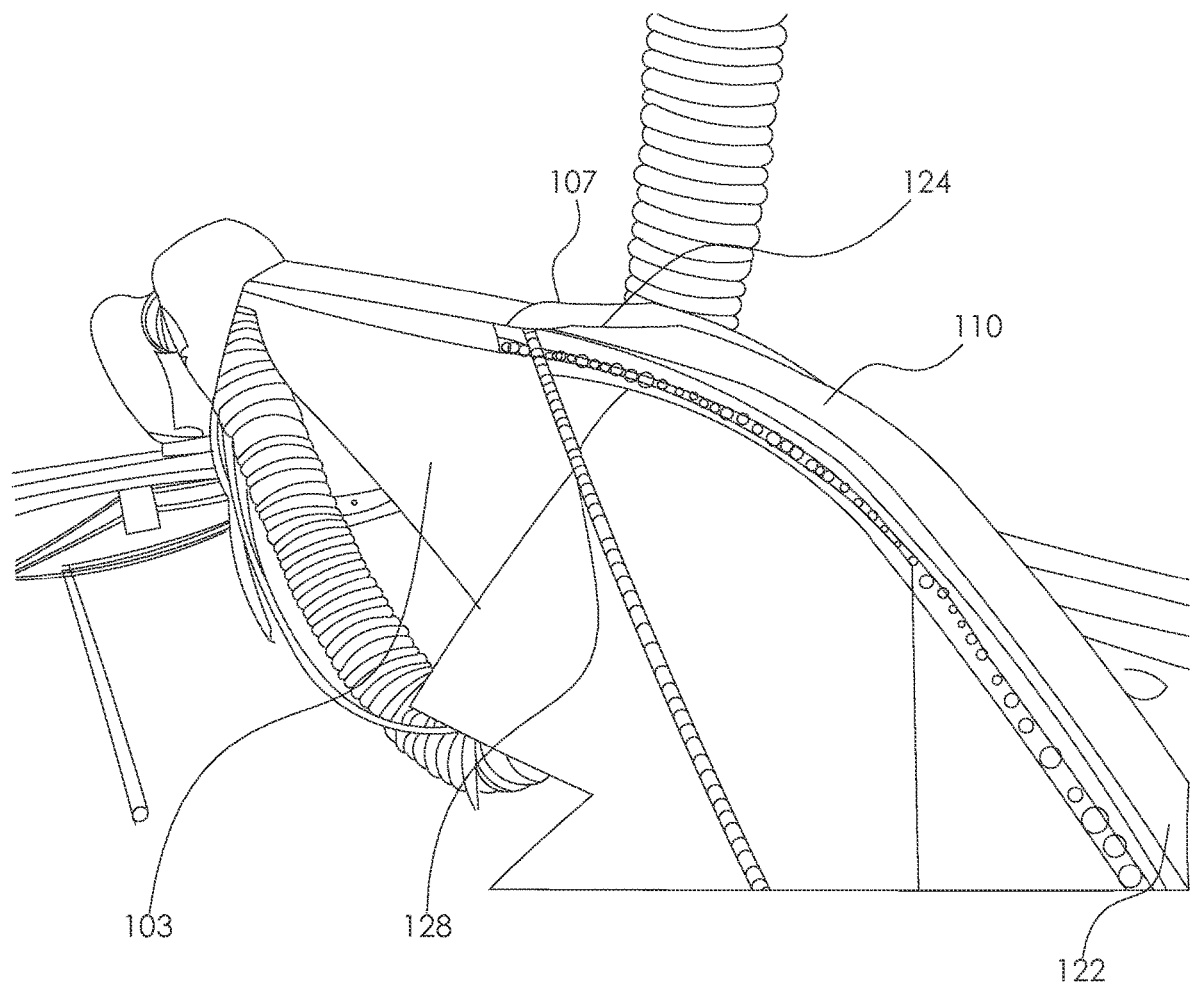
FIG. 19 is another perspective view of the structural relationship of fabric body, flexible cord, drive chain and guide rail.
Figure 20:
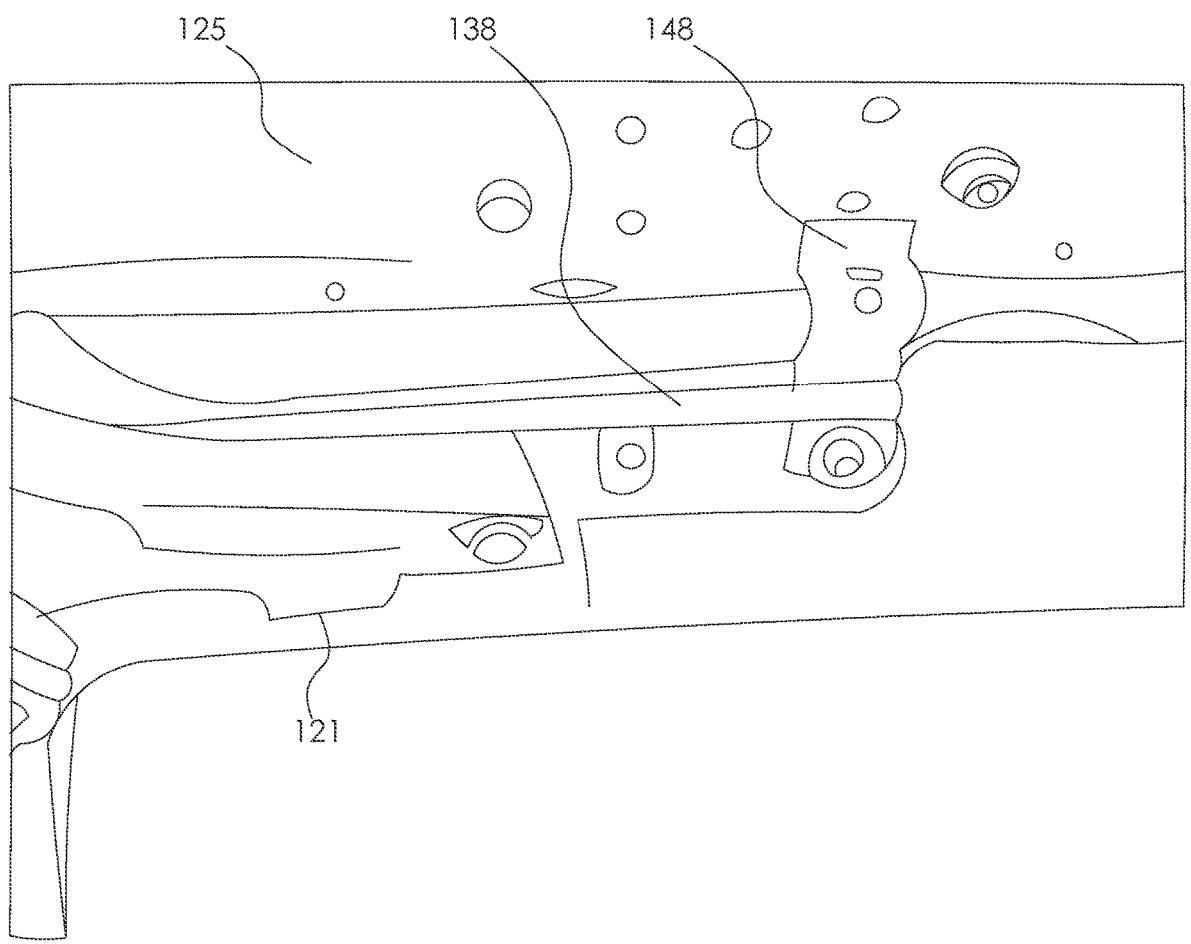
FIG. 20 is a perspective view of another locking bracket that slidably and frictionally receives the header when the fabric top is returned to a unfolded position.
Figure 21:
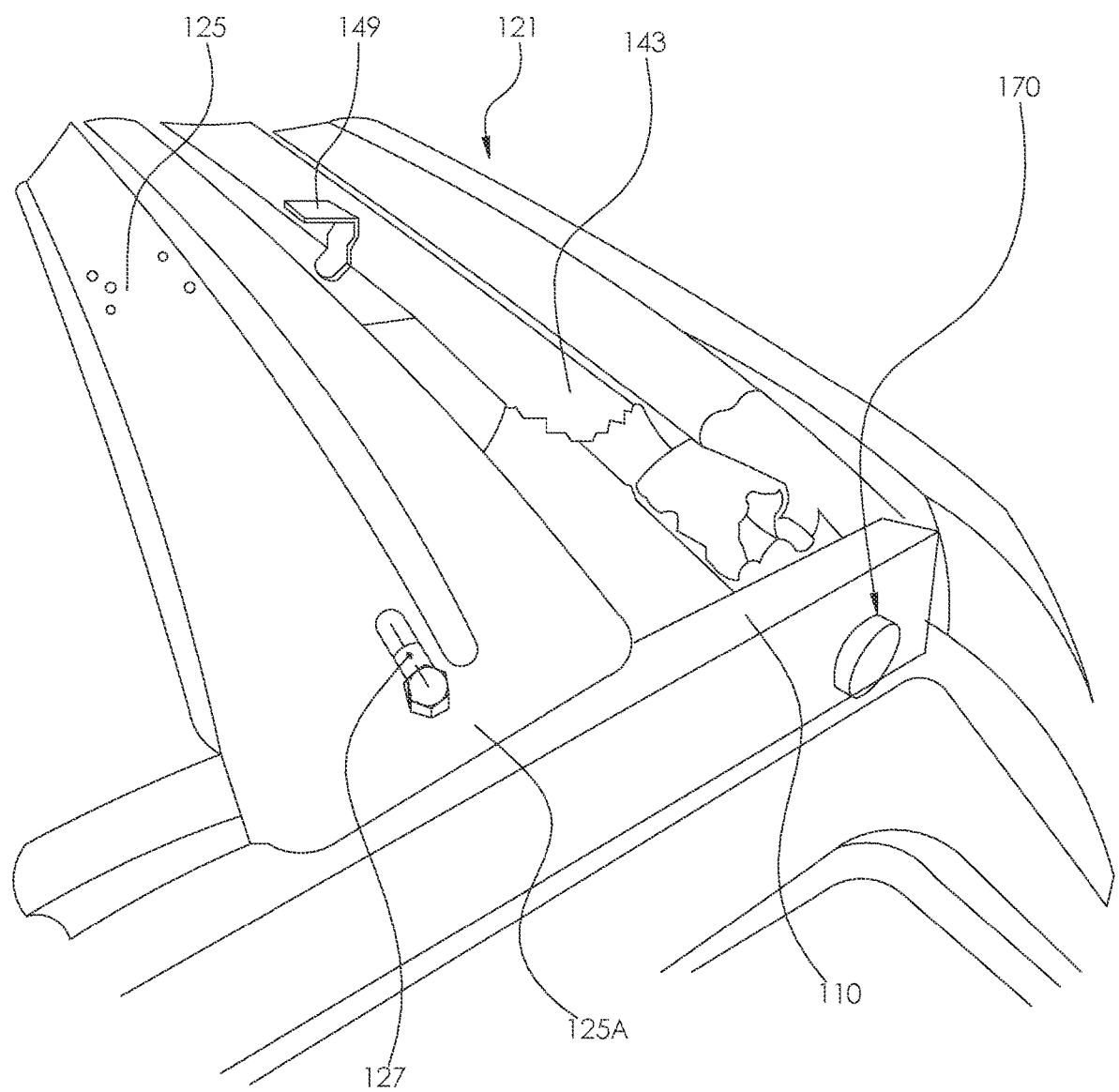
FIG. 21 is a perspective view of header attached to one of the guide rails.
Figure 22:
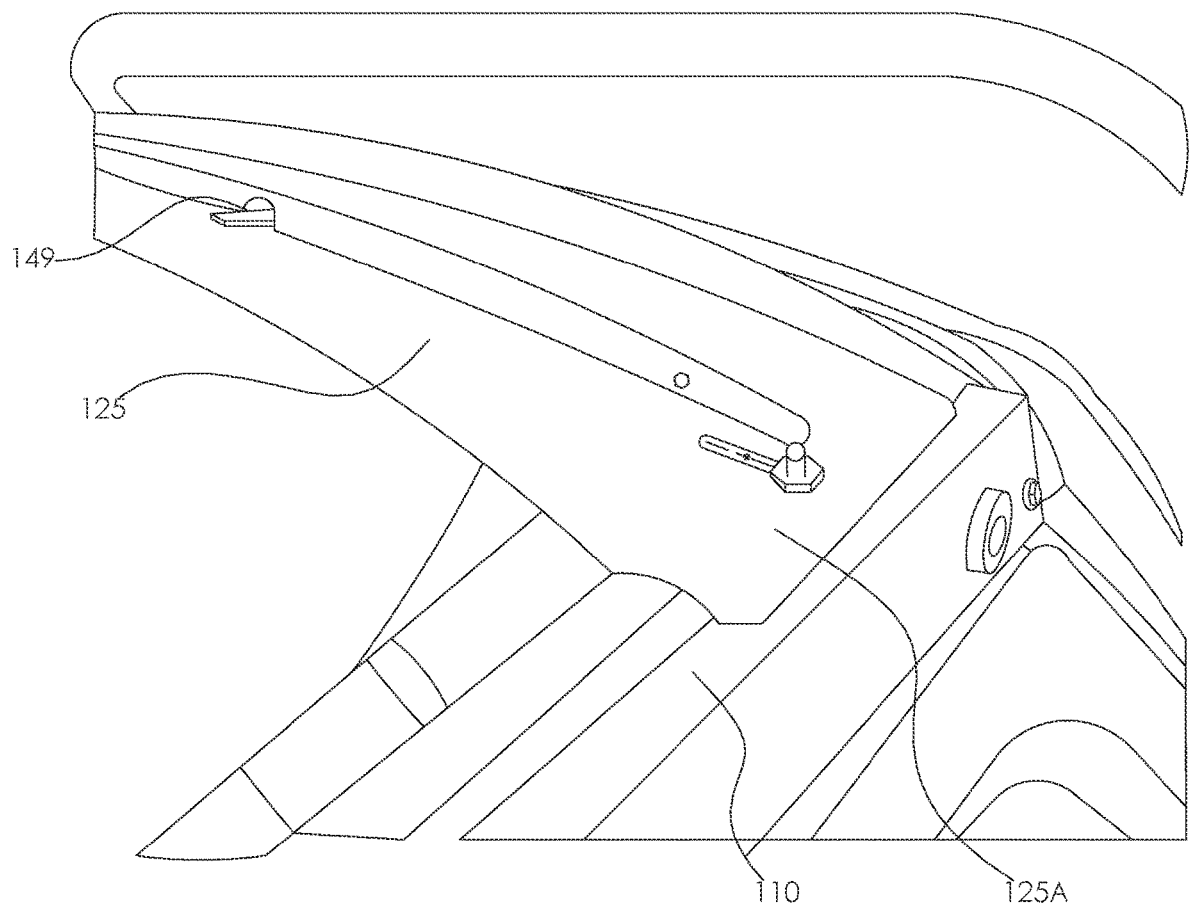
FIG. 22 is another perspective view of the fabric top and flexible cord intercalated between the guide rail and header.
Figure 23:
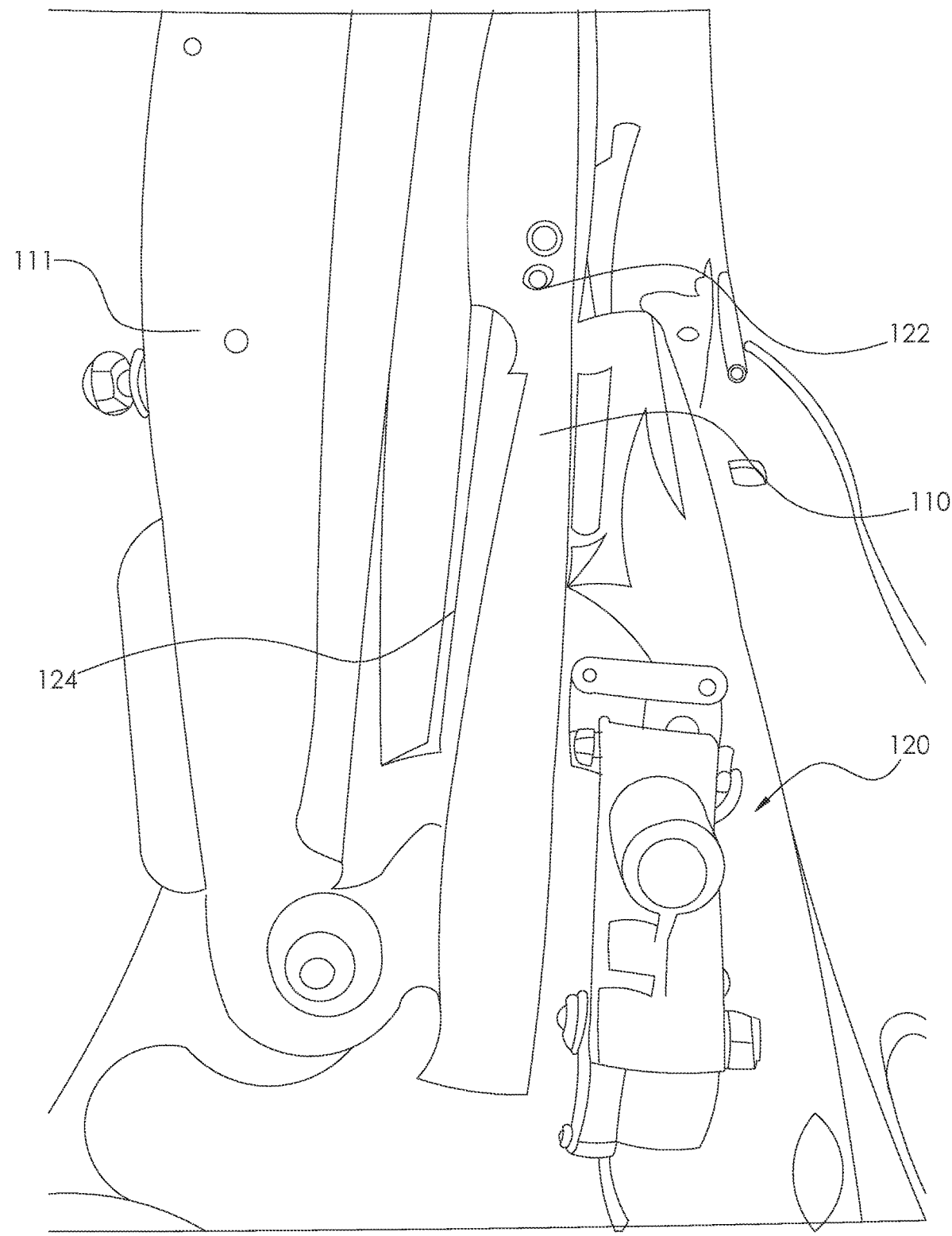
FIG. 23 is another perspective view of the rear portion of a guide rail, flexible cord engaged therewith when the fabric top is more at the unfolded position driven by the power-actuated displacement mechanism.
Figure 24:
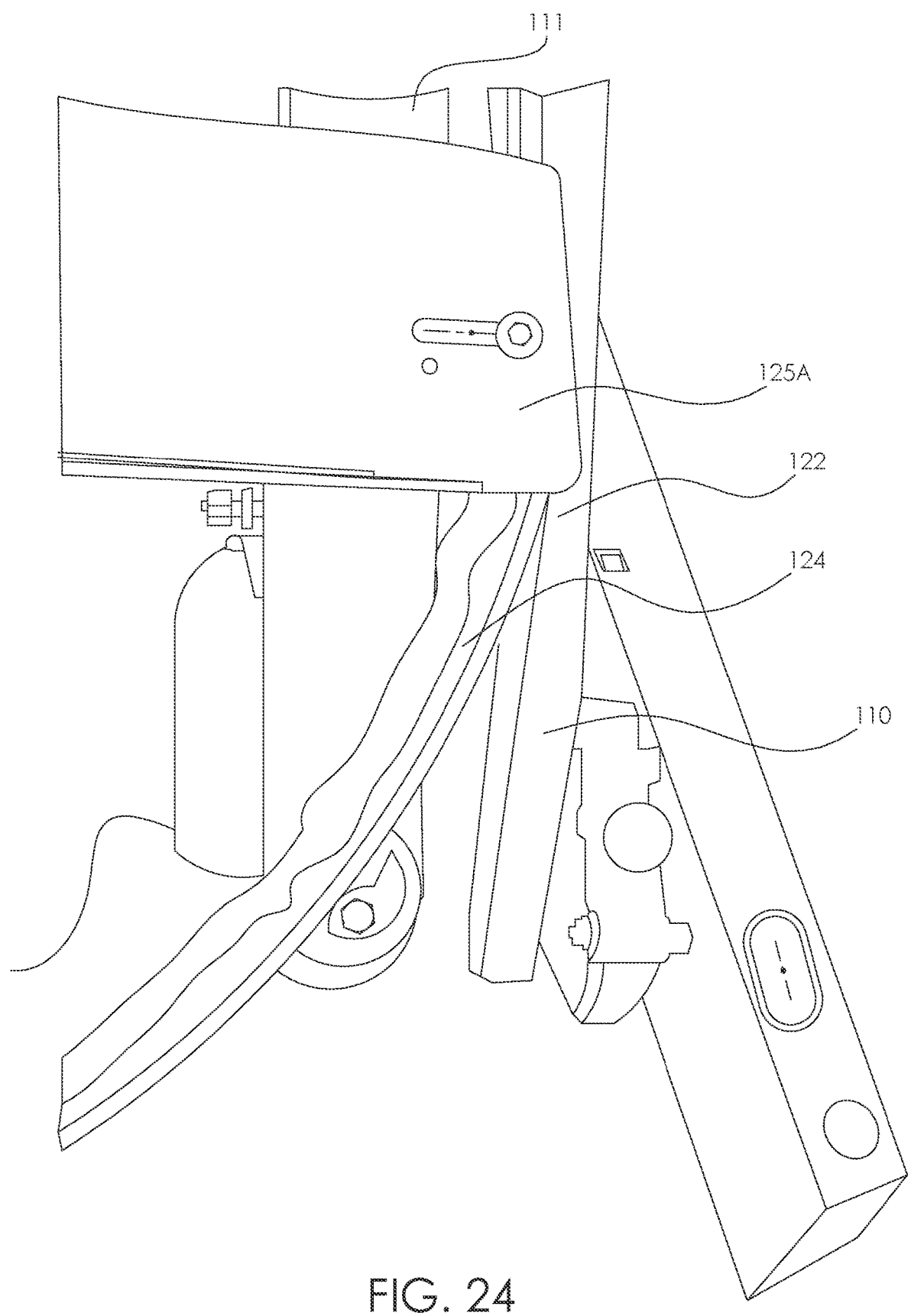
FIG. 24 is another perspective view of the rear portion of a guide rail, header flexible cord engaged therewith when the fabric top is more at the folded position driven by the power-actuated displacement mechanism.
Figure 25:
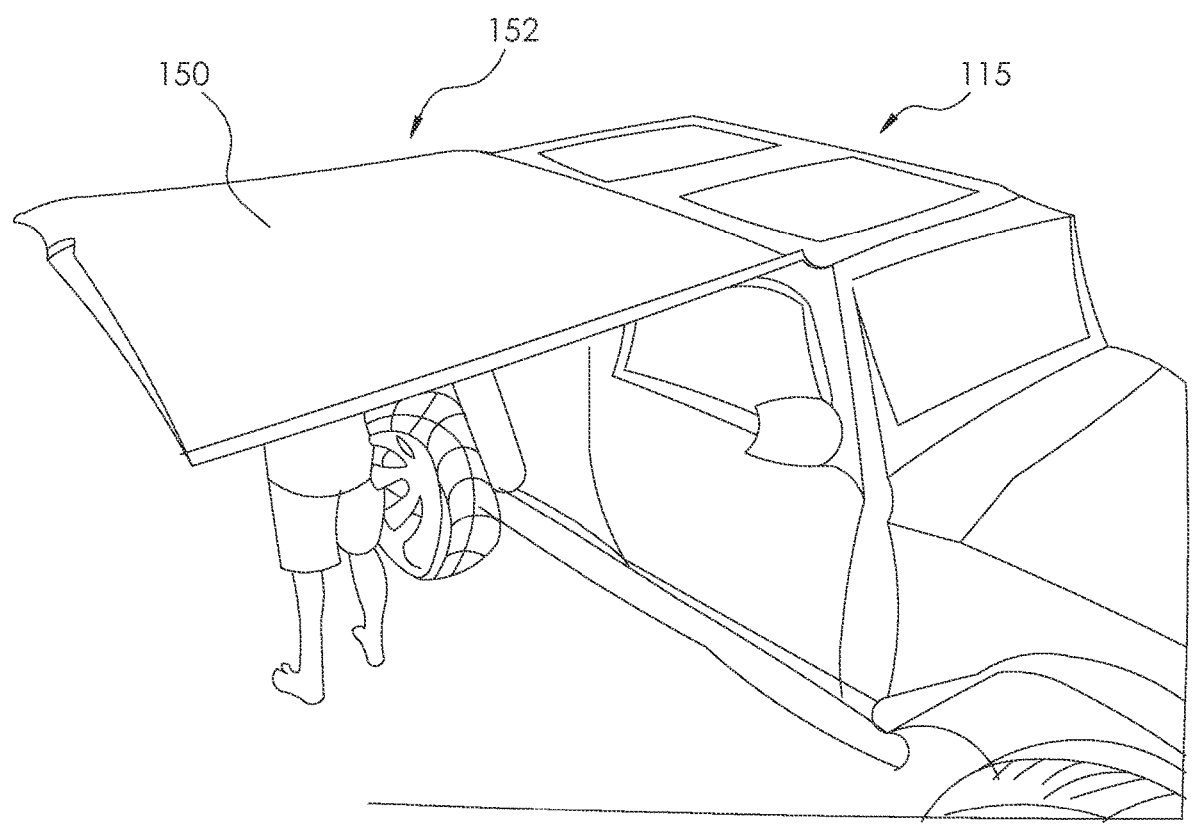
FIG. 25 is another perspective view of the awning unwound from a rolled position and extended transverse to one of the guide rails and away from the vehicle.
Figure 25A:
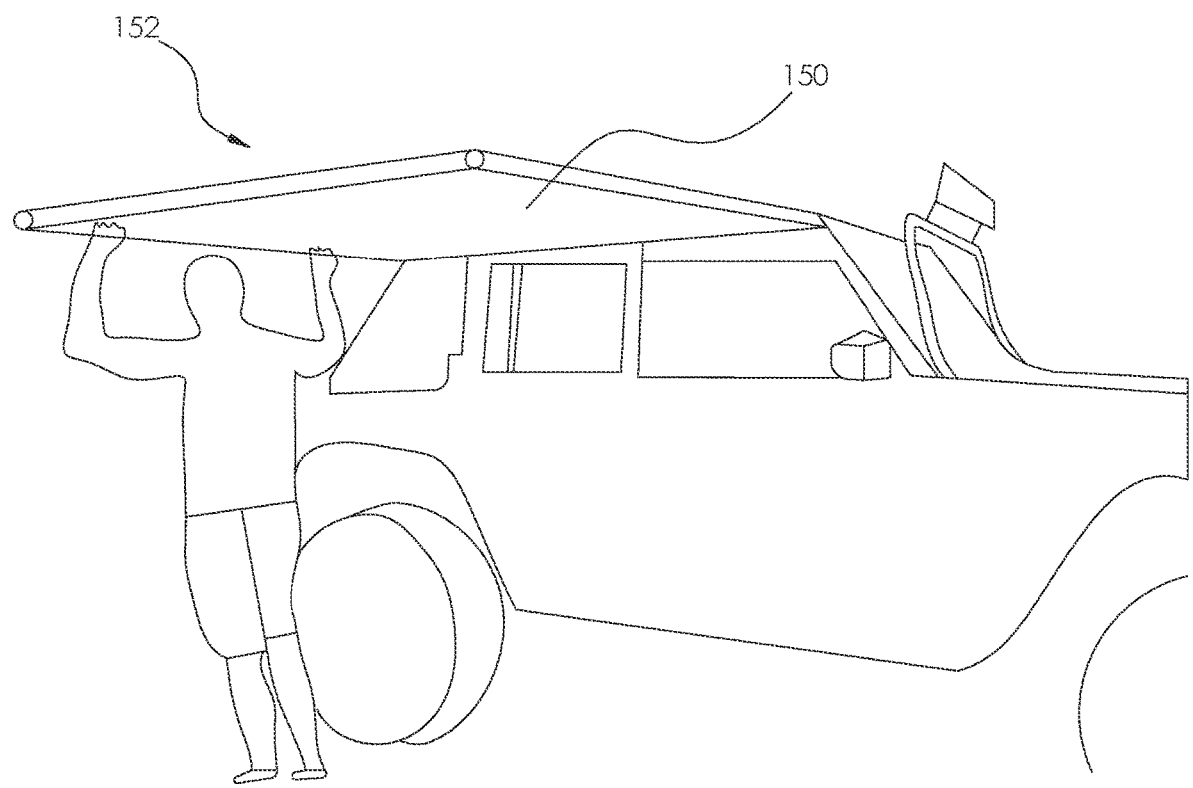
FIG. 25a is another perspective view of the awning unwound from a rolled position and extended transverse to one of the guide rails and away from the vehicle.
Figure 26:
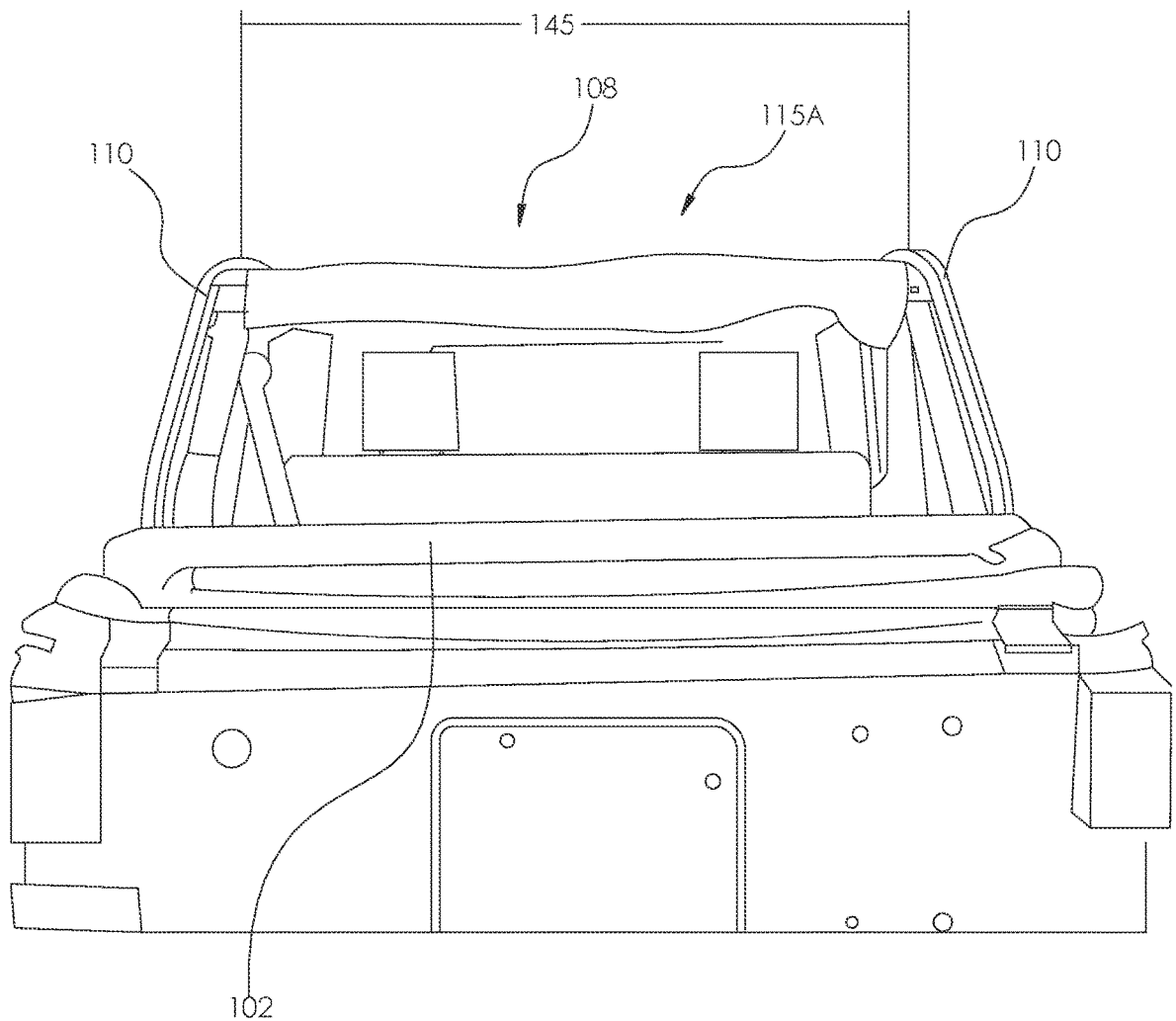
FIG. 26 is a rear elevational view of the fabric top fully retracted to the folded position at a posterior portion of the vehicle.
Figure 27:
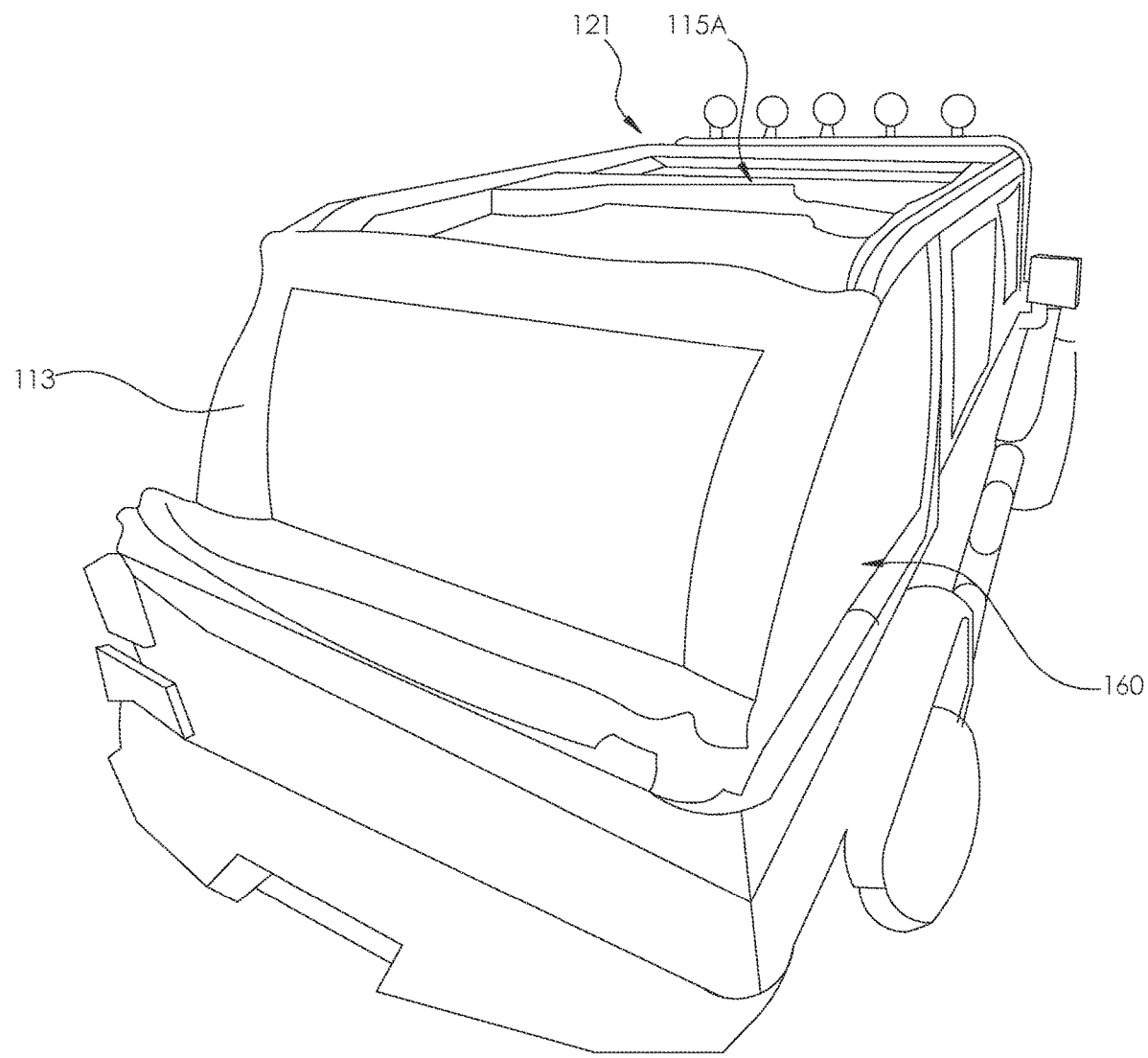
FIG. 27 is a perspective view of the fabric top partially retracted to the folded position at a posterior portion of the vehicle.
Figure 28:
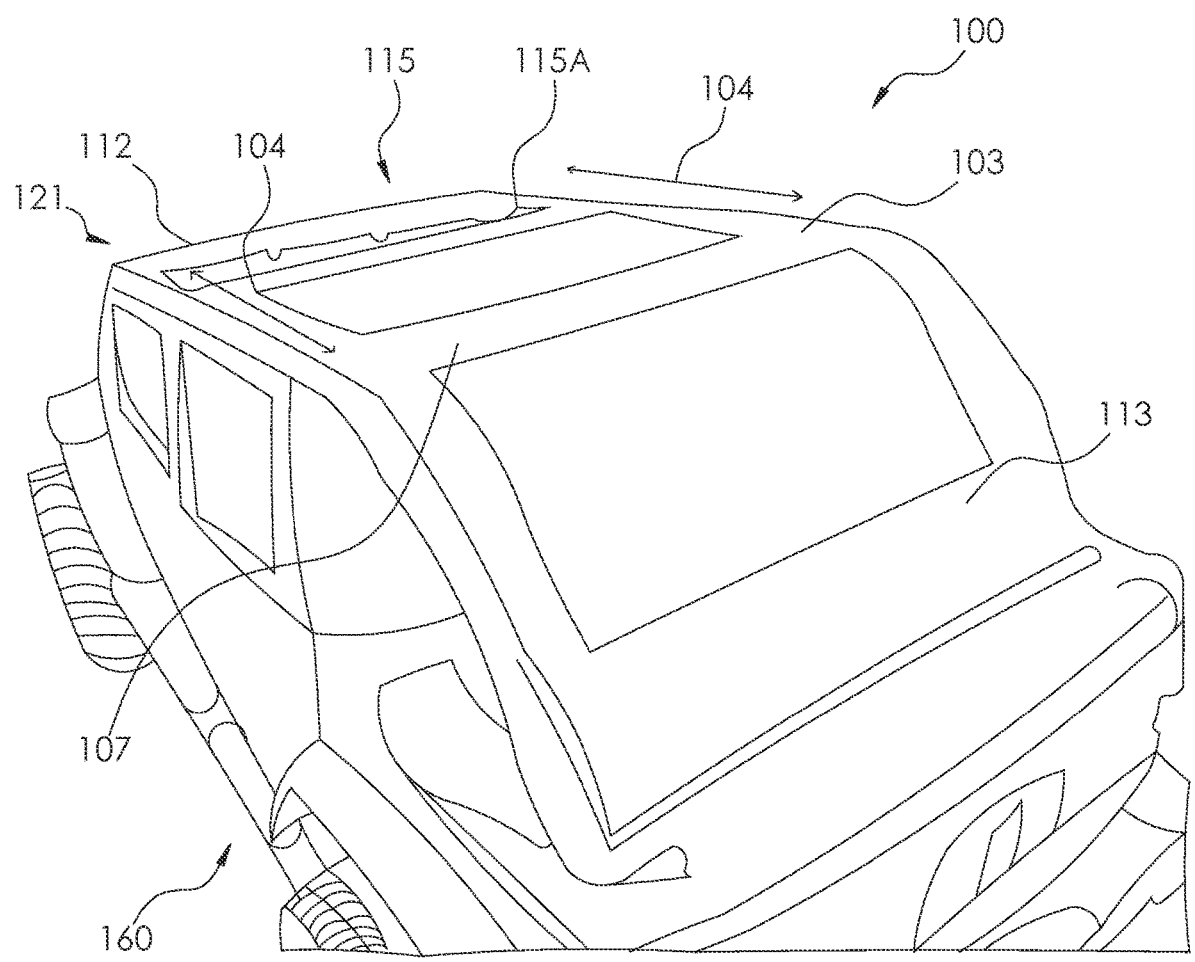
FIG. 28 is a perspective view of the fabric top partially extracted and returned to a partially unfolded position wherein a front seat roof portion is exposed to ambient atmosphere and the sides of the fabric top are lowered at the posterior portion of the vehicle (e.g., bikini top configuration)
Figure 29:
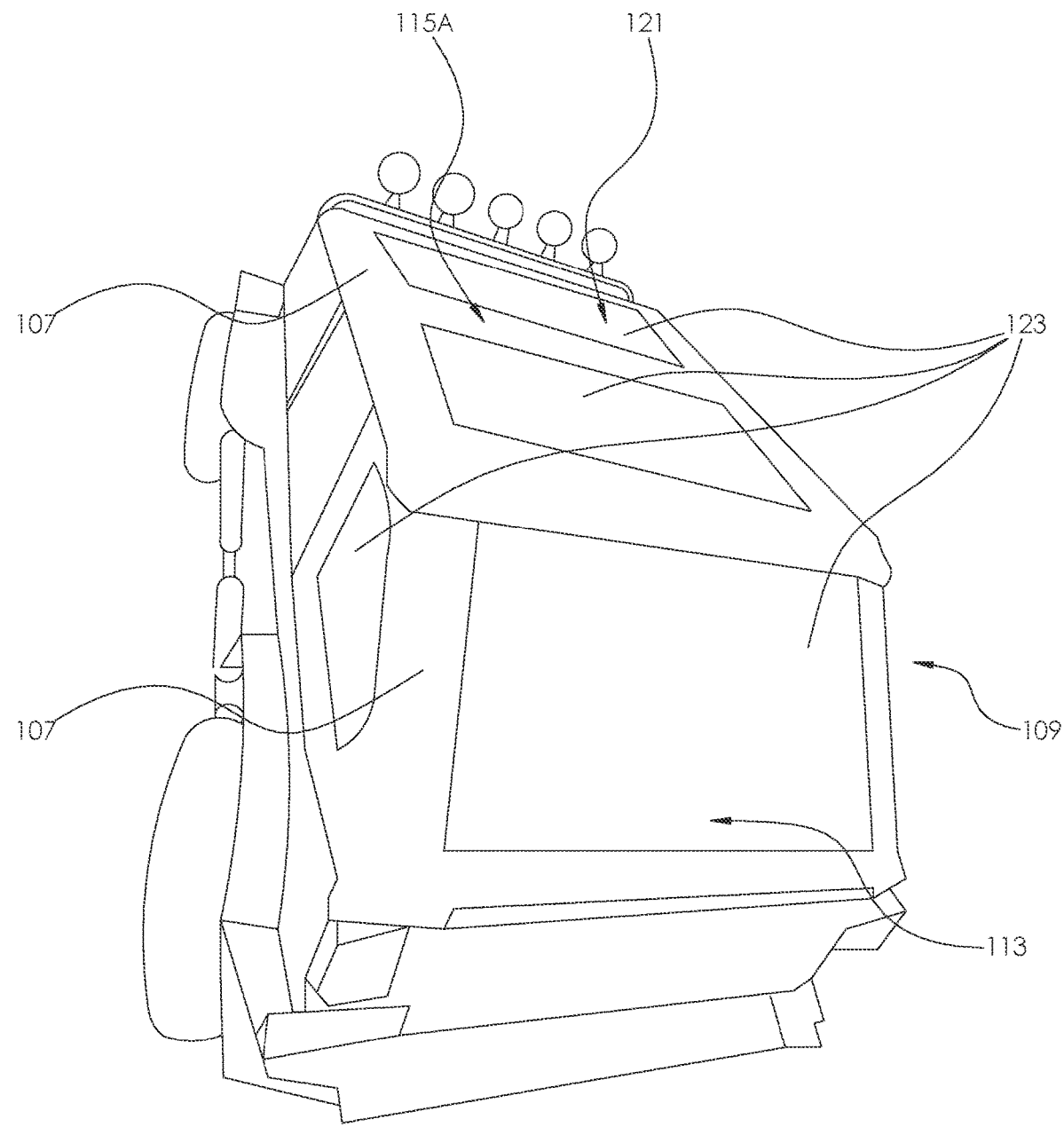
FIG. 29 is a perspective view of the fabric top fully extracted and returned to the unfolded position.
Figure 30:
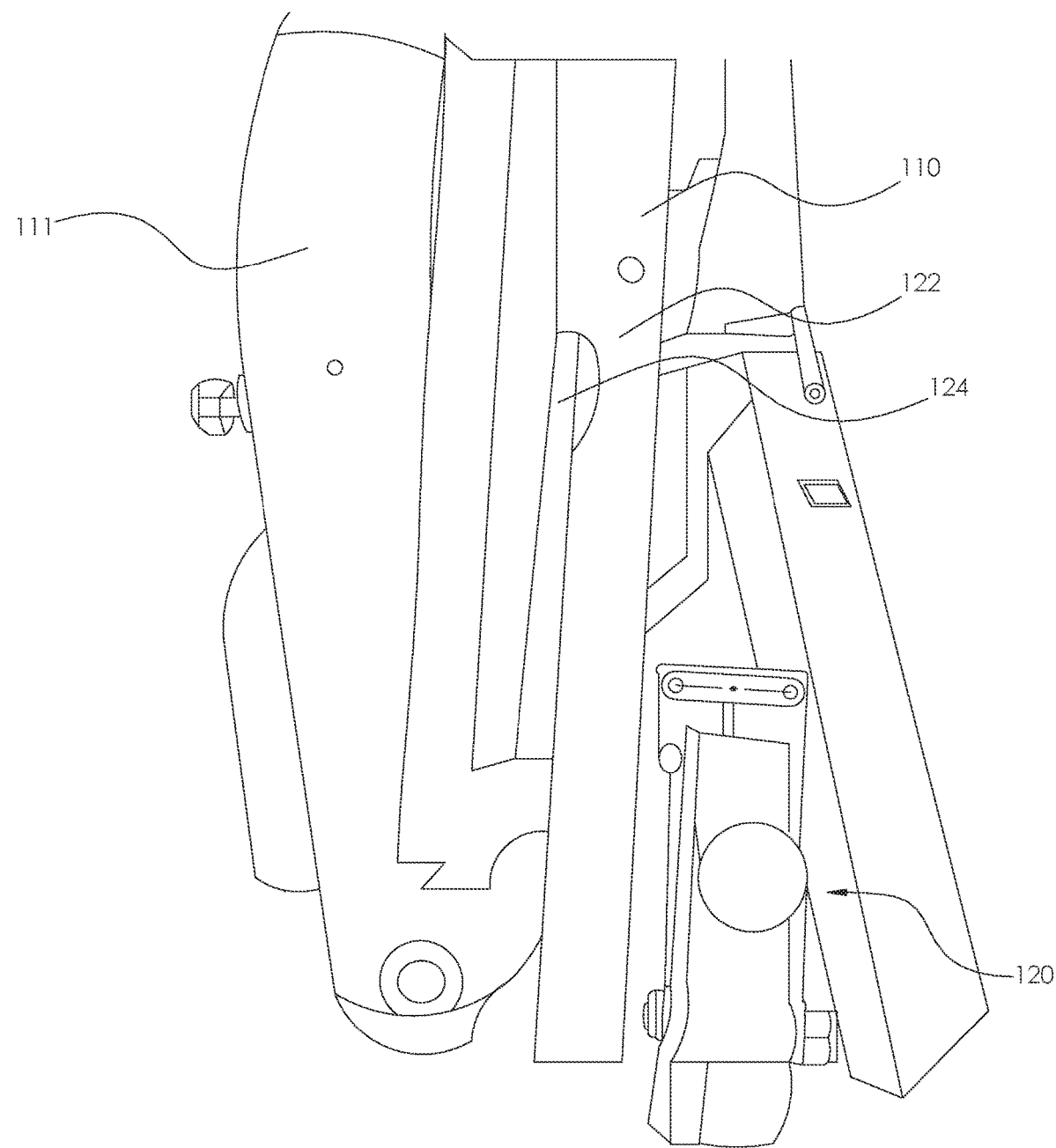
FIG. 30 is another perspective view of the rear portion of a guide rail, flexible cord engaged therewith when the fabric top is more at the unfolded position driven by the power-actuated displacement mechanism.
Figure 31:
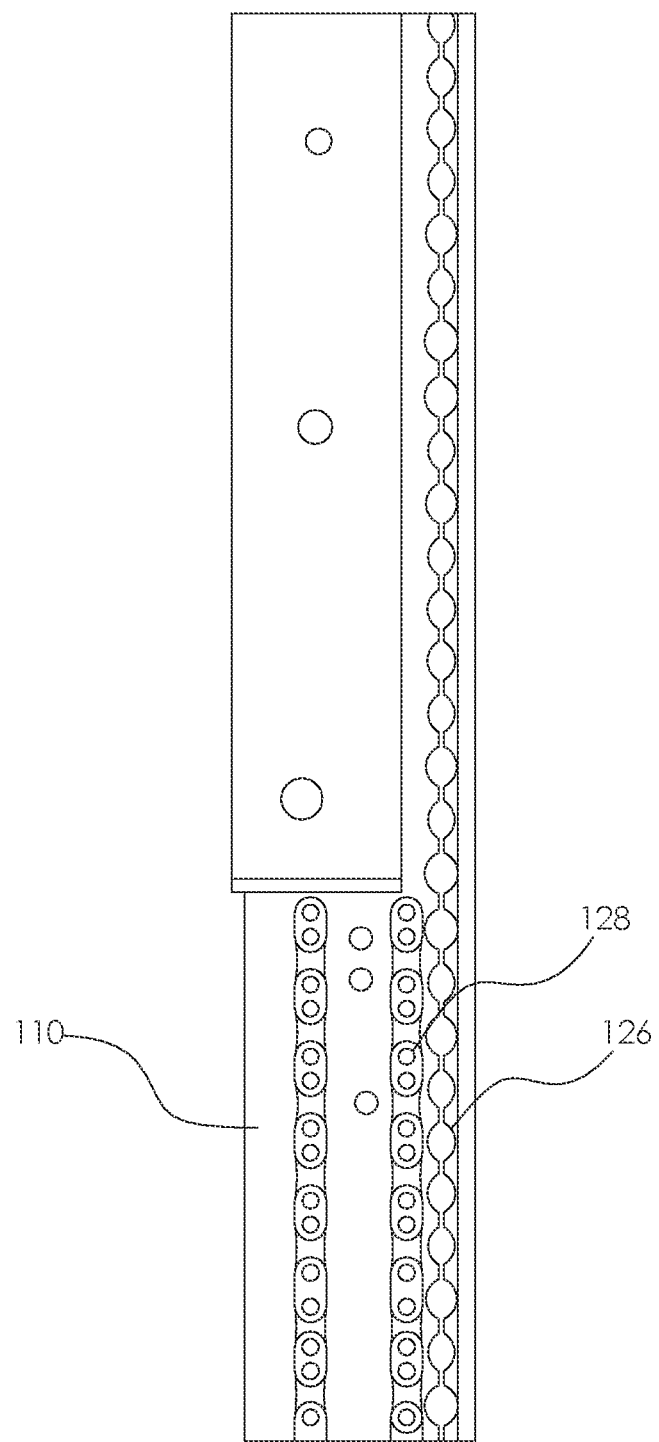
FIG. 31 is a perspective view of a drive chain dynamically seated within a groove of a guide rail and held in place via a face plate.

The non-limiting exemplary embodiment(s) is/are referred to generally in FIGS. 1-62 and is/are intended to provide a specially designed power-actuated JEEP® (WRANGLER AND WRANGLER UNLIMITED) (JW/JWU) fabric top 100 that is selectively deployed between various configurations (e.g., bikini configuration 101, fully-down configuration 102, side window configuration 160, etc.) wherein the fabric body 103 travels along a substantially horizontal path 104 (e.g., not upwardly arcuate path) along a top portion (roof portion 115a) of the JW/JWU vehicle 115 for use in space-limited areas. It should be understood that the exemplary embodiment(s) may be used to deploy the soft fabric body 103 in various configurations, and should not be limited to any particular configuration described herein. The embodiments of the present disclosure are retrofitted to fit both 2-door and 4-door versions of the aforementioned JEEP®, without restriction to a model type (e.g., JK, JL, GLADIATOR, etc.).

The power-actuated fabric top 100 for a JEEP® (WRANGLER AND WRANGLER UNLIMITED) vehicle 115 includes a fabric top section 107 configured to be adapted between a folded (retracted/open) position 108 and an unfolded (extracted/closed) position 109, a plurality of guide rails 110 statically affixed to an existing frame 111 of an existing JEEP® (WRANGLER AND WRANGLER UNLIMITED) vehicle 115 (JW/JWU) and extended from an existing windshield portion 112 to an existing tailgate portion 113 of the existing JW/JWU vehicle 115.

The power-actuated fabric top 100, for a JEEP® vehicle, includes: a fabric top section 107 configured to be reciprocated between a folded (retracted/open) position 108 and an unfolded (extracted/closed) position 109 along an entire roof portion 115a and a rear (trunk/tailgate) portion 113 of the existing vehicle 115, a plurality of guide rails 110 statically affixed to the entire roof portion 115a and the rear (trunk/tailgate) portion 113 of the existing vehicle 115 and extended from an existing front windshield portion 112 to the existing tailgate portion 113 of the existing vehicle 115, and a power-actuated displacement mechanism 120 configured to facilitate retraction and extraction of the fabric top section 107 between the folded (retracted/open) position 108 and the unfolded (extracted/closed) position 109 relative to the entire roof portion 115a and the rear (trunk/tailgate) portion 113 of the existing vehicle 115. Such a power-actuated displacement mechanism 120 is operably coupled to the guide rails 110 and supported by the rear (trunk/tailgate) portion 113 of the existing vehicle 115.

Advantageously, the fabric top section 107 is configured to have a substantially horizontal travel path 104 along an anterior portion 121 of the guide rails 110 and thereby does not pivot up and away from the guide rails 110 along the entire roof portion 115a and the rear (trunk/tailgate) portion 113 of the existing vehicle 115. Such horizontal, linear displacement is advantageous because it enables attachment of cargo racks (not shown) to the vehicle roof 115a to carry luggage, camping/sporting gear, etc. The fabric top section 107 is able to succinctly open and close while the cargo racks are affixed to the vehicle roof Advantageously, the fabric top section 107 is operably coupled to the guide rails 110 and is responsive to an operating mode of the power-actuated displacement mechanism 120. In this manner, the folded (retracted/open) position 108 of the fabric top section 107 is advantageously piled together at the existing tailgate portion 113 of the existing vehicle 115 when retracted to the folded (retracted/open) position 108. Advantageously, such a fabric top section 107 is able to be reciprocated between folded and unfolded positions while the cargo rack is attached to the vehicle roof.

Referring to FIGS. 1-62 in general, the fabric top section 107 includes a fabric body 103 spanning across an entire width 145 of the entire roof portion 115a of vehicle 115 and further has a plurality of transparent window portions 123. A plurality of flexible cords 124 are connected to the fabric body 103 and contiguously positioned along a longitudinal length of guide rails 110, respectively. A header 125 is coupled to the fabric body 103 and configured to extend along a major width of the fabric body 103, thereby supported by the guide rails 110. Advantageously, the flexible cords 124 are selectively egressed and ingressed from a posterior portion 122 of the guide rails 110, respectively, when the fabric body 103 is displaced between the folded (retracted/open) position 108 and the unfolded (extracted/closed) position 109, respectively. In particular, the flexible cords 124 are frictionally intercalated within the guide rails 110 and slidably reciprocate therealong for causing reciprocation of the fabric body 103 between the folded (retracted/open) position 108 and the unfolded (extracted/closed) position 109.

In a non-limiting exemplary embodiment, each of the guide rails 110 includes a plurality of grooves (channels) 126 continuously looped from the anterior portion 121 to the posterior portion 122 of the guide rails 110, respectively. Thus, each groove 126 forms a circular path within an associated guide rail 110 for displacing the flexible cords 124 (and thus fabric body 103) along grooves 126 when the fabric body 103 is displaced between the folded (retracted/open) position 108 and the unfolded (extracted/closed) position 109. Advantageously, such groove 126 may be annular and form a looped travel path and entirely located within the guide rails 110, respectively, for facilitating reciprocation between the folded (retracted/open) position 108 and unfolded (extracted/closed) position 109.

In a non-limiting exemplary embodiment, the power-actuated displacement mechanism 120 includes a plurality of driven chain brackets 127, and a plurality of flexible driven chains 128 dynamically seated within the grooves 126, respectively, and statically engaged with the driven chain brackets 127, respectively. Advantageously, axially opposed ends 125a, 125b of the header 125 are secured to the driven chain brackets 127, respectively, and are reciprocated exterior of the guide rails 110. Advantageously, the driven chain brackets 127 remain disposed exterior of the guide rails 110 and travel therealong between the anterior portion 121 and the posterior portion 122 of the guide rails 110. Notably, the driven chains 128, driven chain brackets 127, header 125, flexible cords 124, and fabric body 103 all travel in sync together along the travel paths defined by the grooves 126 along the longitudinal lengths of the guide rails 110.

In a non-limiting exemplary embodiment, the guide rails 110 further include a plurality of guide bearings 156 rotatably engaged to the posterior portion 122 of the guide rails 110, respectively, and at least one washer 130 positioned adjacent to each of the guide bearings 156 and configured to guide the flexible cords 124 along the grooves 126 without snagging the fabric body 103 during reciprocation between the folded (retracted/open) position 108 and the unfolded (extracted/closed) position 109. Advantageously, the flexible cords 124 are configured to travel within the grooves 126 and between the guide bearings 156 to facilitate smooth displacement of the fabric body 103 into and out from the guide rails 110 when the fabric top section 107 is reciprocated between the folded (retracted/open) position 108 and the unfolded (extracted/closed) position 109, respectively.

In a non-limiting exemplary embodiment, the power-actuated displacement mechanism 120 further includes a plurality of motor assemblies 131 operably coupled to the guide rails 110. Each of the motor assemblies 131 includes a motor 132 having a worm gear 133 rotatably coupled thereto, a sprocket 134 rotatably connected to the worm gear 133 wherein the sprocket 134 has a driven shaft 135 registered transverse to the worm gear 133 and provided with a "D" cross-section 136 aligned with an associated one of the guide rails 110, and a rectilinear timing rod 138 having axially opposed ends 138a, 138b in operable communication (via couplings 170) with the flexible driven chains 128 at the guide rails 110, respectively. Each time rod coupling 170 includes a rectilinear connector bolt 170a, bearings 170b, and toothed gear 170d attached to L-shaped bracket 170c. Such couplings are attached to the anterior portion 122 of an associated guide rail 110 and operably connected to an associated flexible driven chain 128 at the associated guide rail 110 via another "D" cross-section 189. Advantageously, each of the flexible driven chains 128 is driven by an associated one of the motors 132 and maintained in rotational sync by the timing rod 138. Advantageously, the timing rod 138 may be rotated about a fulcrum axis 190 registered parallel to the header 125 and disposed between the guide rails 110. The timing rod 138 ensures the fabric body 103 is evenly reciprocated between the folded (retracted/open) position 108 and the unfolded (extracted/closed) position 109, respectively. It is noted that the timing rod 138 preferably rotates as the driven chains 128 travel along the grooves 126 of the guide rails 110. Furthermore, more than one timing rod 138 may be employed and may be operably engaged with the driven chains 128 at selected positions defined along the longitudinal lengths of the guide rails 110.

In a non-limiting exemplary embodiment, each posterior portion 122 of the guide rails 110 is split into a primary section 122a and an auxiliary section 122b configured to facilitate tension calibration of each flexible driven chain 128. Advantageously, each posterior section of the guide rails 110 includes a chain tension adjustment mechanism 140 including a support brace 147 a plurality of fasteners 141 in threaded communication with the auxiliary section 122b such that an adjustable gap 142 is selectively shortened and lengthened between the primary section 122a and the auxiliary section 122b when tightening and loosening the driven chains 128, respectively.

In a non-limiting exemplary embodiment, the timing rod 138 is in synchronous rotatable communication (via couplings 170) with each of the flexible driven chains 128, respectively, and spaced from the fabric body 103.

In a non-limiting exemplary embodiment, the timing rod 138 is hidden behind an existing interior trim 143 of the existing vehicle 115 and spans across a major width 145 of the entire roof portion 115a of the existing vehicle 115.

In a non-limiting exemplary embodiment, one or more elongated reinforcement ribs 192 spans across the width 145 of the vehicle 115 and may be connected to the fabric body 103 and/or header 125. Such elongated reinforcement ribs 192 travel along the horizontal travel path 104 when the fabric body 103 is evenly reciprocated between the folded (retracted/open) position 108 and the unfolded (extracted/closed) position 109, respectively. The elongated reinforcement ribs 192 are preferably juxtaposed side-by-side at predetermined intervals along the longitudinal length of the fabric body 103 and may be affixed thereto, via suitable conventional fasteners, for example.

In a non-limiting exemplary embodiment, driven chain brackets 127 are statically attached to an associated one of the driven chains 128, respectively, as well as the header 125. Header 125 is statically affixed to the fabric body 103 and flexible cords 124. Advantageously, the flexible cords 124 travel within the grooves 126 of the guide rails 110, respectively, (as the motor assemblies 131 operate) and thereby reciprocate the fabric body 103 between the unfolded (extracted/closed) position 109 and the folded (retracted/open) position 108, respectively. It is noted that the flexible cords 124 do not travel along a complete looped rotational path within the guide rails 110 because the cords 124 and fabric body 107 exit from the posterior ends 122 of guide rails 110 when the fabric body 103 is to the folded (retracted/open) position 108.

In a non-limiting exemplary embodiment, each driven chain bracket 127 travels in sync with an associated one of the flexible driven chains 128 along a longitudinal length of the guide rails 110 and thereby evenly displaces the header 125 and the fabric body 103 between the folded (retracted/open) position 108 and unfolded (extracted/closed) position 109, respectively. When header 125 reaches the anterior portion 121 of the guide rails 110 it stops because engages the front windshield portion of the vehicle 115.

In a non-limiting exemplary embodiment, the header 125 includes a plurality of header brackets 148, 149 statically affixed to the header 125 and front windshield portion of the vehicle 115, respectively. Advantageously, the header brackets 148, 149 are configured to frictionally and slidably engage and disengage each other when the fabric top section 107 is reciprocated between the folded (retracted/open) position 108 and the unfolded (extracted/closed) position 109, respectively. In this manner, the header 125 is securely abutted with the anterior portion (front windshield portion) of the existing vehicle 115 when the header brackets 148, 149 and engaged together.

In a non-limiting exemplary embodiment, the axially opposed ends 125a, 125b of the timing rod 138 are operably connected (via couplings 170) to the driven chains 128, respectively, and thereby maintain synchronous rotational movement of the flexible driven chains 128 along their respective grooves 126. Advantageously, the timing rod 138 is rotationally configured (via couplings 170) to facilitate even reciprocation of the header 125 and the fabric body 103 between the folded (retracted/open) position 108 and the unfolded (extracted/closed) position 109, respectively, as the driven chain brackets 127 synchronously reciprocate with the flexible driven chains 128.

In a non-limiting exemplary embodiment, at least one awning 150 is located exterior of the guide rails 110. The at least one awning 150 is selectively extracted away from and transverse to the longitudinal lengths of the guide rails 110 relative to the entire roof portion 115a of the existing vehicle 115. Such an awning 150 may be rotatably wound in a stored position 151 and rotatably unwound to a deployed position 152, as needed.

In a non-limiting exemplary embodiment, the existing vehicle 115 includes: at least one of a JEEP WRANGLER®, a JEEP WRANGLER UNLIMITED®, and JEEP GLADIATOR®.

The present disclosure further includes a power-actuated vehicle fabric top 100, which includes a fabric top section 107 configured to be reciprocated between a folded (retracted/open) position 108 and an unfolded (extracted/closed) position 109 along an entire roof portion 115a and a rear (trunk/tailgate) portion 113 of an existing vehicle 115; a plurality of guide rails 110 statically affixed to the existing vehicle 115, and a power-actuated displacement mechanism 120 operably coupled to the guide rails 110 and supported by the rear (trunk/tailgate) portion 113 of the existing vehicle 115. Advantageously, the fabric top section 107 is configured to have a substantially horizontal travel path 104 along an anterior portion 121 of the guide rails 110 and thereby does not pivot up and away from the guide rails 110 along the entire roof portion 115a and the rear (trunk/tailgate) portion 113 of the existing vehicle 115. Advantageously, the fabric top section 107 is operably coupled to the guide rails 110 and is responsive to an operating mode of the power-actuated displacement mechanism 120. Advantageously, the folded (retracted/open) position 108 of the fabric top section 107 is piled together at the existing tailgate portion 113 of the existing vehicle 115 when retracted to the folded (retracted/open) position 108.

The present disclosure further includes a method of utilizing a power-actuated fabric top 100 for a vehicle. Such a method includes the steps of: providing an existing vehicle 115; providing a fabric top section 107 configured to be reciprocated between a folded (retracted/open) position 108 and an unfolded (extracted/closed) position 109 along an entire roof portion 115a and a rear (trunk/tailgate) portion 113 of an existing vehicle 115; providing and statically affixing a plurality of guide rails 110 to the existing vehicle 115; providing and operably coupling a power-actuated displacement mechanism 120 to the guide rails 110 such that the power-actuated displacement mechanism 120 is supported by the rear (trunk/tailgate) portion 113 of the existing vehicle 115; operably coupling the fabric top section 107 to the guide rails 110 so that the fabric top section 107 is responsive to an operating mode of the power-actuated displacement mechanism 120.

The method further includes the steps of: reciprocating the fabric top section 107 between a folded (retracted/open) position 108 and an unfolded (extracted/closed) position 109 along the entire roof portion 115a and the rear (trunk/tailgate) portion 113 of the existing vehicle 115 such that the fabric top section 107 is reciprocated along a substantially horizontal travel path 104 along an anterior portion 121 of the guide rails 110 and thereby does not pivot up and away from the guide rails 110 along the entire roof portion 115a and the rear (trunk/tailgate) portion 113 of the existing vehicle 115; and retracting the fabric top section 107 to the folded (retracted/open) position 108 and thereby piling together the folded (retracted/open) position 108 of the fabric top section 107 at the existing tailgate portion 113 of the existing vehicle 115.

In a non-limiting exemplary embodiment(s), a power-actuated fabric top 100 for a JEEP® (WRANGLER AND WRANGLER UNLIMITED) vehicle includes a fabric top section 107 configured to be adapted between a folded (retracted/open) position 108 and an unfolded (extracted/closed) position 109, a plurality of guide rails 110 statically affixed to an existing frame 111 of an existing JEEP® (WRANGLER AND WRANGLER UNLIMITED) vehicle (JW/JWU) and extended from an existing windshield portion 112 to an existing tailgate portion 113 of the existing JW/JWU, and a power-actuated displacement mechanism 120 for retracting and advancing the fabric top section 107 between the folded (retracted/open) position 108 and the unfolded (extracted/closed) position 109. Such a power-actuated displacement mechanism 120 is operably coupled to the guide rails 110. Advantageously, the fabric top section 107 is configured to have a substantially horizontal travel path 104 along an anterior portion 121 of the guide rails 110 and thereby does not pivot up and away from the guide rails 110. Notably, the fabric top section 107 is operably coupled to the guide rails 110 and responsive to an operating mode of the power-actuated displacement mechanism 120. In this manner, the folded (retracted/open) position 108 of the fabric top section 107 is piled up inside the existing tailgate portion 113 of the existing JW/JWU.

In a non-limiting exemplary embodiment, the fabric top section 107 includes a fabric body 103 having a plurality of transparent window portions 123, flexible cords 124 connected to left and right longitudinal sides of the fabric body 103 and positioned within (frictionally intercalated) a longitudinal length of the guide rails 110, respectively, and a header 125 coupled to the fabric body 103 extended along a width 145 thereof. Such flexible cords 124 are selectively egressed and ingressed in a posterior portion 122 of the guide rails 110 when the fabric body 103 is displaced to the folded (retracted/open) position 108 and the unfolded (extracted/closed) position 109, respectively.

In a non-limiting exemplary embodiment, each of the guide rails 110 includes a key-hole-type groove 126 extended from the anterior portion 121 to the posterior portion 122, a flexible driven chain 128 dynamically seated within the groove 126 and engaged with the driven chain bracket 127. Each groove 126 defines a travel path disposed from the anterior portion 121 to the posterior portion 122, along which the driven chain 128 and flexible cords 124 travel. Notably, a plurality of guide bearings 156 are rotatably fastened to the posterior portion 122. Advantageously, a corresponding one of the flexible cords 124 passes between the guide bearings 156 and exits the travel path at each guide rail 110. At least one washer 130 is positioned adjacent to the guide bearings 156 for guiding the corresponding flexible cord 124 into and out from the grooves 126 without snagging the fabric body 103.

In a non-limiting exemplary embodiment, the power-actuated displacement mechanism 120 may be operated by a user interface located inside the vehicle. The power-actuated displacement mechanism 120 may be powered by the vehicle battery and/or a stand-alone dedicated power supply source. Such a power-actuated displacement mechanism 120 includes a plurality of motor assemblies 131 operably coupled to the guide rails 110 wherein each of the motor assemblies 131 includes a motor 132 having a worm gear 133 rotatably coupled thereto. A sprocket 134 is rotatably connected with the worm gear 133, wherein the sprocket 134 has a driven shaft 135 registered transverse to the worm gear 133 and provided with a "D" cross-section 136 aligned with an associated one of the guide rails 110. Advantageously, a rectilinear timing rod 138 having axially opposed ends 125a, 125b is in operable communication with the sprockets 134 and the flexible driven chains 128, respectively, but is located at the anterior portion 121 of the guide rails 110 whereas each sprocket 134 interfaces with the driven chains 128 at the posterior portion 122 of the guide rails 110. Although, the timing rod 138 connects to the driven chains 128 via couplings 170 at the anterior portion 121 of guide rails 110, it is noted that more than one timing rod 138 may be employed and may be positioned at alternate locations defined along the longitudinal lengths of the guide rails 110.

Advantageously, each of the flexible driven chains 128 is driven by an associated one of the motors 132 and maintained in sync by the timing rod 138 so the fabric body 103 evenly reciprocates along the guide rails 110. Of course, a variety of suitable gear mechanisms may be employed, without departing from the true spirit and scope of the present disclosure. For example, a beveled gear, pulley, magnetic propeller, etc. may be employed to drive the sprocket 134.

In a non-limiting exemplary embodiment, each of the guide rails 110 is split at the posterior portion 122 for permitting adjustment of the flexible driven chain 128. The chain tension adjustment mechanism 140 is located at the posterior portion 122 of guide rails 110.

In a non-limiting exemplary embodiment, the timing rod 138 is in synchronous rotatable communication with each guide rail 110 and each flexible driven chain 128, respectively, via couplings 170.

In a non-limiting exemplary embodiment, the timing rod 138 is hidden behind an existing interior trim 143 of the existing JW/JWU vehicle 115.

In a non-limiting exemplary embodiment, each driven chain bracket 127 is attached to an associated one of the driven chains 128 and header 125. Notably, the flexible cords 124 are statically affixed to the driven chain brackets 127 and frictionally intercalated between grooves 126 and driven chains 128. A face plate 171 is attached to a medial side of each guide rail 110 and keeps the associated driven chain 128 positioned within the associated groove 126 so that flexible cords 124 are prohibited from becoming dislodged from the grooves 126 as the driven chain bracket 127 is reciprocated along the guide rails 110. In this manner, the driven chain bracket 127, the flexible cords 124, and fabric body 103 all travel in sync with an associated one of the flexible driven chains 128 along the guide rails 110 thereby evenly displacing the header 125 and the fabric body 103 between the folded (retracted/open) position 108 and unfolded (extracted/closed) position 109. Advantageously, the header 125 is configured to lock and seal (via brackets 148, 149 with the existing vehicle frame 111 of the existing JW/JWU vehicle 115 when the fabric body 103 is extracted to the unfolded (extracted/closed) position 109.

In a non-limiting exemplary embodiment, the axially opposed ends 125a, 125b of the timing rod 138 are operably engaged with couplings 170, respectively, and thereby maintain the motors 132 in sync to evenly fold and unfold the header 125 and the fabric body 103.

In a non-limiting exemplary embodiment, at least one awning 150 in rotational communication with the guide rails 110. Such an awning 150 is selectively wound to a rolled, stored position 151 and unwound to an unrolled, deployed position 152.

In a non-limiting exemplary embodiment, the keyhole groove 126 is advantageous with the flexible cord 124 that is part of the fabric top 100 which moves the fabric top 100 up and down. Because of this structural configuration, it seals the top against the JW/JWU doors making it extremely quiet versus conventional fabric tops for JEEP® vehicles. The back and sides of the fabric top section 107, past the doors, can be separated from the top portion 107a, making it also just an electric "bikini" top thereby virtually making this top two tops in one. Dual sunroofs (transparent windows) are also incorporated into the structural configuration of the fabric body 103.

In a non-limiting exemplary embodiment, as noted hereinabove, a selectively retractable awning 150 is stored adjacent to the guide rails 110. Also, because of the way the fabric body 103 opens, you can put a roof rack on and not have to remove it while the fabric body 103 section is folded and unfolded. The fabric body 103 section top also folds down lower into a more compact shape, making the drivers rear view clearer.

In a non-limiting exemplary embodiment, optional folding back/sides of the fabric body 103, independent from its top portion 107a, but will fold down with its top portion 107a if needed with a single switch. Such a switch may include a toggle switch located inside the vehicle and powered by the vehicle battery, for example.

In a non-limiting exemplary embodiment, a fabric interior shade may be configured with a top portion 107a of the fabric body 103 to cover up the (JW/JWU) sunroofs and thereby shields a vehicle occupant from ambient light/heat.

In a non-limiting exemplary embodiment, when the top portion 107a the fabric body 103 is partially retracted, the rear sunroof gives the driver rear view visibility, while maintaining a covered, clear view area for the rear passengers.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A power-actuated fabric top for a vehicle, comprising:
    a fabric top section configured to be reciprocated between a folded position and an unfolded position along an entire roof portion and a rear frame portion of an existing vehicle;
    a plurality of guide rails statically affixed to the entire roof portion and the rear frame portion of the existing vehicle and extended from an existing front windshield portion to an existing tailgate portion of the existing vehicle; and
    a power-actuated displacement mechanism configured to facilitate retraction and extraction of said fabric top section between the folded position and the unfolded position relative to the entire roof portion and the rear frame portion of the existing vehicle, said power-actuated displacement mechanism being operably coupled to said guide rails and supported by the rear frame portion of the existing vehicle;
    wherein said fabric top section is configured to have a substantially horizontal travel path along an anterior portion of said guide rails and thereby does not pivot up and away from said guide rails along the entire roof portion and the rear frame portion of the existing vehicle;
    wherein said fabric top section is operably coupled to said guide rails and is responsive to an operating mode of said power-actuated displacement mechanism;
    wherein the folded position of said fabric top section is piled together at the existing tailgate portion of the existing vehicle when retracted to the folded position;
    wherein said fabric top section includes
        a fabric body spanning across an entire width of the entire roof portion and having a plurality of transparent windows portions,
        a plurality of flexible cords connected to said fabric body and contiguously positioned along a longitudinal length of each said guide rails, respectively, and
        a header coupled to said fabric body and configured to extend along a major width of said fabric body;
    wherein said flexible cords are selectively egressed and ingressed from a posterior portion of said guide rails, respectively, when said fabric body is displaced between the folded position and the unfolded position, respectively.

2. The power-actuated fabric top of claim 1, wherein each of said guide rails comprises: a plurality of grooves continuously looped from said anterior portion to said posterior portion of said guide rails, respectively; said grooves being annular and entirely located within said guide rails, respectively.

3. The power-actuated fabric top of claim 2, wherein said power-actuated displacement mechanism comprises:
    a plurality of driven chain brackets; and
    a plurality of flexible driven chains dynamically seated within said grooves, respectively, and statically engaged with said driven chain brackets, respectively;
    wherein axially opposed ends of said header are statically secured to said driven chain brackets, respectively;
    wherein said driven chain brackets remain disposed exterior of said guide rails and travel therealong between said anterior portion and said posterior portion of said guide rails.

4. The power-actuated fabric top of claim 3, wherein said guide rails further comprise:
a plurality of bearings rotatably engaged to said posterior portion of said guide rails, respectively; and
at least one washer positioned adjacent to each of said bearings and configured to guide said flexible cords along said grooves without snagging said fabric body during reciprocation between the folded position and the unfolded position;
wherein said flexible cords are configured to travel within said grooves and between said bearings to facilitate smooth displacement of said fabric body into and out from said guide rails when said fabric top section is reciprocated between the folded position and the unfolded position, respectively.

5. The power-actuated fabric top of claim 4, wherein said power-actuated displacement mechanism further comprises:
a plurality of motor assemblies operably coupled to said guide rails, each of said motor assemblies including
a motor having a worm gear rotatably coupled thereto;
a sprocket rotatably connected to said worm gear, said sprocket having a driven shaft registered transverse to said worm gear and provided with a "D" cross-section aligned with an associated one of said guide rails; and
a rectilinear timing rod having axially opposed ends in communication with said flexible driven chains at said guide rails, respectively;
wherein each of said flexible driven chains is driven by an associated one of said motors and maintained in rotational sync by said timing rod.

6. The power-actuated fabric top of claim 5, wherein each said posterior portion of said guide rails is split into a primary section and an auxiliary section configured to facilitate tension calibration of each said flexible chain;
wherein each said posterior section of said guide rails comprises: a chain tension adjustment mechanism including a plurality of fasteners in threaded communication with said auxiliary section such that an adjustable gap is selectively shortened and lengthened between said primary section and said auxiliary section when tightening and loosening said driven chains, respectively.

7. The power-actuated fabric top of claim 6, wherein said timing rod is in synchronous communication with each of said guide rails and each of said flexible driven chains, respectively, and spaced from said fabric body.

8. The power-actuated fabric top of claim 7, wherein said timing rod is hidden behind an existing interior trim of the existing vehicle and spans across a major width of the entire roof portion of the existing vehicle.

9. The power-actuated fabric top of claim 8, wherein driven chain brackets are statically attached to an associated one of said flexible driven chains, respectively, as well as said header; wherein said flexible cords travel within said grooves of said guide rails, respectively, and thereby reciprocate said fabric body between the unfolded position and the folded position, respectively.

10. The power-actuated fabric top of claim 8, wherein each said driven chain brackets travels in sync with an associated one of said flexible driven chains along a longitudinal length of said guide rails and thereby evenly displaces said header and said fabric body between the folded position and unfolded position, respectively.

11. The power-actuated fabric top of claim 10, wherein said header comprises: a plurality of header brackets statically affixed to said header and an anterior portion of the existing vehicle, respectively; wherein said header brackets are configured to frictionally and slidably engage and disengage each other when said fabric top section is reciprocated between the folded position and the unfolded position, respectively; wherein said header is securely abutted with the anterior portion of the existing vehicle when said header brackets and engaged together.

12. The power-actuated fabric top of claim 11, wherein said axially opposed ends of said timing rod are operably connected to said sprockets, respectively, and thereby maintain synchronous rotational movement of said flexible chains, said timing rod being rotationally configured to facilitate even reciprocation of said header and said fabric body between the folded position and the unfolded position, respectively.

13. The power-actuated fabric top of claim 12, further comprising: at least one awning located exterior of said guide rails, said at least one awning being selectively extracted away from and transverse to the longitudinal lengths of said guide rails relative to the entire roof portion of the existing vehicle.

14. The power-actuated fabric top of claim 1, wherein the existing vehicle comprises: at least one of a JEEP WRANGLER® and a JEEP WRANGLER UNLIMITED®.

15. A power-actuated fabric top for a vehicle, comprising:
a fabric top section configured to be reciprocated between a folded position and an unfolded position along an entire roof portion and a rear frame portion of an existing vehicle;
a plurality of guide rails statically affixed to the existing vehicle; and
a power-actuated displacement mechanism operably coupled to said guide rails and supported by the rear frame portion of the existing vehicle;
wherein said fabric top section is configured to have a substantially horizontal travel path along an anterior portion of said guide rails and thereby does not pivot up and away from said guide rails along the entire roof portion and the rear frame portion of the existing vehicle;
wherein said fabric top section is operably coupled to said guide rails and is responsive to an operating mode of said power-actuated displacement mechanism;
wherein the folded position of said fabric top section is piled together at the existing tailgate portion of the existing vehicle when retracted to the folded position;
wherein said fabric top section includes
a fabric body spanning across an entire width of the entire roof portion and having a plurality of transparent windows portions,
a plurality of flexible cords connected to said fabric body and contiguously positioned along a longitudinal length of each said guide rails, respectively, and
a header coupled to said fabric body and configured to extend along a major width of said fabric body;
wherein said flexible cords are selectively egressed and ingressed from a posterior portion of said guide rails, respectively, when said fabric body is displaced between the folded position and the unfolded position, respectively.

16. A method of utilizing a power-actuated fabric top for a vehicle, said method comprising the steps of:
providing an existing vehicle;
providing a fabric top section configured to be reciprocated between a folded position and an unfolded position along an entire roof portion and a rear frame portion of an existing vehicle;

providing and statically affixing a plurality of guide rails to the existing vehicle;

providing and operably coupling a power-actuated displacement mechanism to said guide rails such that said power-actuated displacement mechanism is supported by the rear frame portion of the existing vehicle;

operably coupling said fabric top section to said guide rails so that said fabric top section is responsive to an operating mode of said power-actuated displacement mechanism;

reciprocating said fabric top section between a folded position and an unfolded position along the entire roof portion and the rear frame portion of the existing vehicle such that said fabric top section is reciprocated along a substantially horizontal travel path along an anterior portion of said guide rails and thereby does not pivot up and away from said guide rails along the entire roof portion and the rear frame portion of the existing vehicle; and retracting said fabric top section to the folded position and thereby piling together the folded position of said fabric top section at the existing tailgate portion of the existing vehicle;

wherein said fabric top section includes
- a fabric body spanning across an entire width of the entire roof portion and having a plurality of transparent windows portions,
- a plurality of flexible cords connected to said fabric body and contiguously positioned along a longitudinal length of each said guide rails, respectively, and
- a header coupled to said fabric body and configured to extend along a major width of said fabric body;

wherein said flexible cords are selectively egressed and ingressed from a posterior portion of said guide rails, respectively, when said fabric body is displaced between the folded position and the unfolded position, respectively.

* * * * *